United States Patent
Fujita et al.

(10) Patent No.: US 9,376,044 B2
(45) Date of Patent: Jun. 28, 2016

(54) VEHICLE SEAT

(71) Applicant: Delta Tooling Co., Ltd., Hiroshima-shi (JP)

(72) Inventors: Etsunori Fujita, Higashihiroshima (JP); Yumi Ogura, Higashihiroshima (JP); Seiji Kawasaki, Higashihiroshima (JP); Katsuhiro Inoue, Hiroshima (JP); Eiji Sugimoto, Higashihiroshima (JP); Minoru Nakamura, Hiroshima (JP); Ryuji Kuwano, Hiroshima (JP); Shuji Kasama, Hiroshima (JP); Toshiya Kushiyama, Hiroshima (JP); Masahiro Kuromoto, Aki-gun (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 0 days.

(21) Appl. No.: 14/413,566

(22) PCT Filed: Aug. 9, 2013

(86) PCT No.: PCT/JP2013/071728
§ 371 (c)(1),
(2) Date: Jan. 8, 2015

(87) PCT Pub. No.: WO2014/027627
PCT Pub. Date: Feb. 20, 2014

(65) Prior Publication Data
US 2015/0203011 A1 Jul. 23, 2015

(30) Foreign Application Priority Data

Aug. 14, 2012 (JP) ................................. 2012-179976
Dec. 14, 2012 (JP) ................................. 2012-274137

(51) Int. Cl.
*B60N 2/06* (2006.01)
*B60N 2/12* (2006.01)
(Continued)

(52) U.S. Cl.
CPC ................ *B60N 2/68* (2013.01); *B60N 2/0284* (2013.01); *B60N 2/071* (2013.01); *B60N 2/0715* (2013.01);
(Continued)

(58) Field of Classification Search
CPC ........ B60N 2/1615; B60N 2/165; B60N 2/68; B60N 2/22
USPC ............. 297/344.13, 344.15, 344.16, 344.17, 297/216.1–216.18; 248/421
See application file for complete search history.

(56) References Cited

U.S. PATENT DOCUMENTS 4,648,578 A * 3/1987 Sakamoto .............. B60N 2/502 248/421 X
4,650,148 A * 3/1987 Sakamoto .............. B60N 2/502 248/421

(Continued)

FOREIGN PATENT DOCUMENTS

FR 2 806 675 A1 9/2001
JP 2009-285044 A 12/2009

(Continued)

OTHER PUBLICATIONS

International Search Report issued Oct. 22, 2013 in PCT/JP2013/071728 Filed Aug. 9, 2013.

(Continued)

*Primary Examiner* — Rodney B White
(74) *Attorney, Agent, or Firm* — Oblon, McClelland, Maier & Neustadt, L.L.P.

(57) ABSTRACT

A vehicle seat suitable for weight reduction. A left and right side frames constituting a cushion frame unit are constituted of plate-shaped frames which are long in a forward and backward direction and formed of a thin material made of metal with a predetermined thickness or less, a plurality of beams are bridged across the side frames, and moreover, one or both of the side frames is or are supported on a seat slide device via a truss support part. In other words, the side frames disposed in a direction substantially orthogonal to the plurality of beams serve the role of stringers, and as a result, rigidity in the forward and backward direction of the side frames in particular is high rigidity of a predetermined value or more even if they are made of a thin material, and they can be reduced in weight.

19 Claims, 67 Drawing Sheets

(51) Int. Cl.
*B60N 2/68* (2006.01)
*B60N 2/02* (2006.01)
*B60N 2/07* (2006.01)
*B60N 2/16* (2006.01)
*B60N 2/235* (2006.01)
*B60N 2/22* (2006.01)
*B60N 2/48* (2006.01)

(52) U.S. Cl.
CPC ............. *B60N 2/165* (2013.01); *B60N 2/1615* (2013.01); *B60N 2/22* (2013.01); *B60N 2/2356* (2013.01); *B60N 2/4805* (2013.01); *B60N 2/4811* (2013.01); *B60N 2/682* (2013.01); *B60N 2205/30* (2013.01)

(56) References Cited

U.S. PATENT DOCUMENTS

| | | | | |
|---|---|---|---|---|
| 4,993,678 A * | 2/1991 | Easter | B60N 2/1615 | 297/344.15 X |
| 5,709,364 A * | 1/1998 | Araki | B60N 2/0232 | 297/344.15 X |
| 6,089,665 A * | 7/2000 | Andrigo | B60N 2/06 | 297/216.15 X |
| 6,264,275 B1 * | 7/2001 | Frohnhaus | B60N 2/165 | 297/344.15 X |
| 6,309,019 B1 * | 10/2001 | Downey | B60N 2/0224 | 297/344.17 X |
| 6,361,109 B1 * | 3/2002 | Tokarz | B60N 2/0232 | 297/344.15 X |
| 6,502,798 B1 * | 1/2003 | Frohnhaus | B60N 2/1615 | 297/344.15 X |
| 6,773,069 B1 * | 8/2004 | Kaneko | B60N 2/1615 | 297/344.15 |
| 6,957,796 B2 * | 10/2005 | Hensley | B60N 2/06 | 297/344.15 X |
| 7,654,615 B2 * | 2/2010 | Ventura | B60N 2/06 | 297/344.15 |
| 7,775,592 B2 * | 8/2010 | Becker | B60N 2/0232 | 297/344.17 X |
| 7,780,235 B2 * | 8/2010 | Teufel | B60N 2/1842 | 297/344.15 |
| 8,146,991 B2 * | 4/2012 | Stanz | B60N 2/0232 | 297/344.17 X |
| 8,585,148 B2 * | 11/2013 | Yamada | B60N 2/1615 | 297/344.15 X |
| 8,690,114 B2 * | 4/2014 | Boyarski | A01D 67/04 | 297/344.15 X |
| 9,027,993 B2 * | 5/2015 | Munemura | B60N 2/42754 | 297/216.1 X |
| 2002/0047296 A1 | 4/2002 | Houston et al. | | |
| 2002/0060488 A1 * | 5/2002 | Delmas | B60N 2/0224 | 297/344.16 |
| 2005/0006937 A1 * | 1/2005 | Takata | B60N 2/1615 | 297/344.15 |
| 2007/0194613 A1 * | 8/2007 | Kojima | B60N 2/0705 | 297/344.15 |
| 2009/0218868 A1 * | 9/2009 | Koga | B60N 2/1864 | 297/344.17 |
| 2010/0171356 A1 | 7/2010 | Gross et al. | | |
| 2010/0176628 A1 * | 7/2010 | Pywell | F16F 9/5165 | 297/216.1 |
| 2010/0219674 A1 | 9/2010 | Sakkinen et al. | | |
| 2011/0169317 A1 | 7/2011 | Fujita et al. | | |
| 2011/0210586 A1 * | 9/2011 | Masutani | B60N 2/42763 | 297/216.1 |
| 2012/0187735 A1 * | 7/2012 | Foelster | B60N 2/1615 | 297/344.17 |
| 2012/0217775 A1 | 8/2012 | Fujita et al. | | |
| 2013/0161989 A1 * | 6/2013 | Ito | B60N 2/1615 | 297/344.15 X |
| 2014/0183918 A1 * | 7/2014 | Kaku | B60N 2/002 | 297/344.15 |
| 2014/0339873 A1 * | 11/2014 | Cerruti | B60N 2/1615 | 297/344.15 X |
| 2015/0097404 A1 * | 4/2015 | Furuta | B60N 2/68 | 297/344.15 |
| 2015/0151653 A1 * | 6/2015 | Furuta | B60N 2/68 | 297/344.15 |
| 2015/0231994 A1 * | 8/2015 | Benjamin | B60N 2/165 | 297/344.15 |
| 2015/0239370 A1 * | 8/2015 | Hoshi | B60N 2/682 | 297/344.15 |
| 2015/0246624 A1 * | 9/2015 | Furuta | B60N 2/72 | 297/344.15 |

FOREIGN PATENT DOCUMENTS

| | | |
|---|---|---|
| JP | 2010-507520 A | 3/2010 |
| JP | 2011-042302 A | 3/2011 |
| WO | WO 2006/053863 A1 | 5/2006 |

OTHER PUBLICATIONS

Extended Search Report issued Mar. 18, 2016 in European Patent Application No. 13879475.5.

* cited by examiner

SEC.A-A

Fig. 65
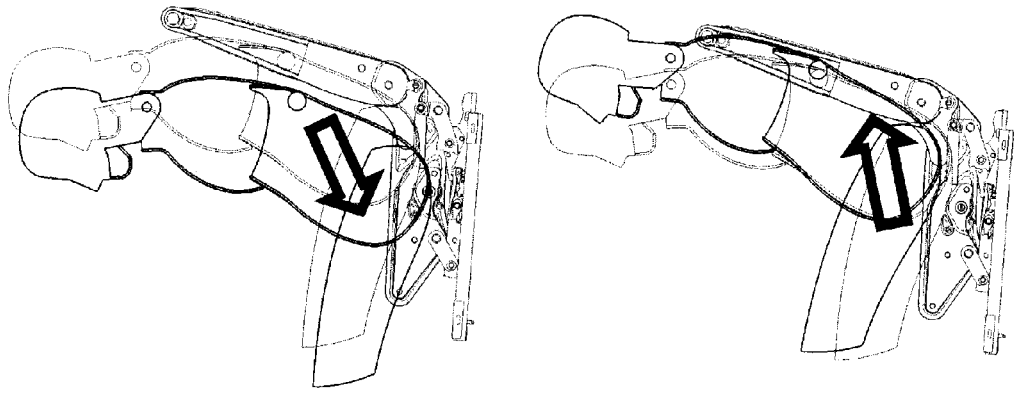
(a)
<BELT ANCHOR LOAD>
LOAD APPLIED SIMULTANEOUSLY TO SHOULDER AND LAP
<BELT ANCHOR LOAD>
LOAD APPLIED SIMULTANEOUSLY TO SHOULDER AND LAP
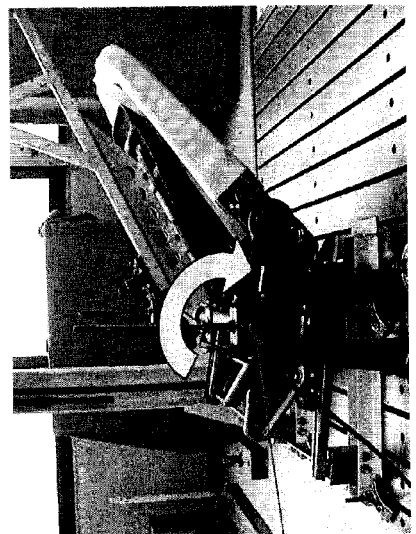
(b)
APPLIED USING BACK PAN AROUND R POINT
R POINT (SEATING REFERENCE POINT)

Fig. 69

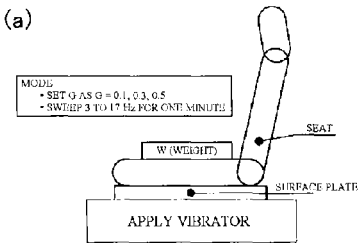

(a)

(b)

| SLIDE ANGLE θ(°) | FREQUENCY WHEN LOCKED VERTICAL VIBRATION APPLIED MODE (SWEEP OF 3 TO 17 Hz BY ONE MINUTE) | | | | | | | | | | | | WHETHER TO LOCK NORMAL SEATING | | |
|---|---|---|---|---|---|---|---|---|---|---|---|---|---|---|---|
| | G=0.1 | | | | G=0.3 | | | | G=0.5 | | | | | | |
| | WEIGHT W (kg) | | | | | | | | | | | | UNDER BUTTOCKS =50 mm | UNDER BUTTOCKS =100 mm | UNDER BUTTOCKS =150 mm |
| | 0 | 20 | 40 | 60 | 0 | 20 | 40 | 60 | 0 | 20 | 40 | 60 | | | |
| 0 | | | | | | 4 | 3 | 3.1 | | 3.3 | 3.2 | 3.1 | LOCKED | LOCKED | LOCKED |
| 3 | | | 4 | 3.8 | | 3.8 | 3 | 3.2 | | 3.2 | 3.3 | 3 | LOCKED | LOCKED | LOCKED |
| 6 | | 4.1 | NONE | NONE | | 5.3 | NONE | NONE | | 3.4 | NONE | NONE | LOCKED | LOCKED | LOCKED |

(c)

| SLIDE ANGLE θ(°) | FREQUENCY WHEN LOCKED VERTICAL VIBRATION APPLIED MODE (SWEEP OF 3 TO 17 Hz BY ONE MINUTE) | | | | | | | | | | | | WHETHER TO LOCK NORMAL SEATING | | |
|---|---|---|---|---|---|---|---|---|---|---|---|---|---|---|---|
| | G=0.1 | | | | G=0.3 | | | | G=0.5 | | | | | | |
| | WEIGHT W (kg) | | | | | | | | | | | | UNDER BUTTOCKS =50 mm | UNDER BUTTOCKS =100 mm | UNDER BUTTOCKS =150 mm |
| | 0 | 20 | 40 | 60 | 0 | 20 | 40 | 60 | 0 | 20 | 40 | 60 | | | |
| 0 | | | | | | 4.2 | 3.3 | 3 | | 3.5 | 3.2 | 3.1 | LOCKED | LOCKED | LOCKED |
| 3 | | | 4.3 | 3.3 | | 3.5 | 3.1 | 3.4 | | 3.6 | 3.3 | 3 | LOCKED | LOCKED | LOCKED |
| 6 | | 5 | NONE | NONE | | 4.7 | NONE | NONE | | 3.1 | NONE | NONE | LOCKED | LOCKED | LOCKED |

(d)

| SLIDE ANGLE θ(°) | FREQUENCY WHEN LOCKED VERTICAL VIBRATION APPLIED MODE (SWEEP OF 3 TO 17 Hz BY ONE MINUTE) | | | | | | | | | | | | WHETHER TO LOCK NORMAL SEATING | | |
|---|---|---|---|---|---|---|---|---|---|---|---|---|---|---|---|
| | G=0.1 | | | | G=0.3 | | | | G=0.5 | | | | | | |
| | WEIGHT W (kg) | | | | | | | | | | | | UNDER BUTTOCKS =50 mm | UNDER BUTTOCKS =100 mm | UNDER BUTTOCKS =150 mm |
| | 0 | 20 | 40 | 60 | 0 | 20 | 40 | 60 | 0 | 20 | 40 | 60 | | | |
| 0 | | | | | | 4.3 | 3.1 | 3 | | 3.6 | 3.1 | 3 | LOCKED | LOCKED | LOCKED |
| 3 | | | 4.1 | 3.2 | | 3.6 | 3.2 | 3 | | 3.4 | 3.2 | 3 | LOCKED | LOCKED | LOCKED |
| 6 | | 4.8 | 3 | NONE | | 3.8 | NONE | NONE | | 3.6 | NONE | NONE | LOCKED | LOCKED | LOCKED |

(e)

| SLIDE ANGLE θ(°) | FREQUENCY WHEN LOCKED VERTICAL VIBRATION APPLIED MODE (SWEEP OF 3 TO 17 Hz BY ONE MINUTE) | | | | | | | | | | | | WHETHER TO LOCK NORMAL SEATING | | |
|---|---|---|---|---|---|---|---|---|---|---|---|---|---|---|---|
| | G=0.1 | | | | G=0.3 | | | | G=0.5 | | | | | | |
| | WEIGHT W (kg) | | | | | | | | | | | | UNDER BUTTOCKS =50 mm | UNDER BUTTOCKS =100 mm | UNDER BUTTOCKS =150 mm |
| | 0 | 20 | 40 | 60 | 0 | 20 | 40 | 60 | 0 | 20 | 40 | 60 | | | |
| 0 | | | | | | | | | | | | 4.5 | NOT LOCKED | NOT LOCKED | LOCKED |
| 3 | | | 7.9 | 6.1 | | | 6.1 | 4.5 | | | 5.2 | 5.1 | LOCKED | LOCKED | LOCKED |
| 6 | | | 7.1 | 6.2 | | | 3.4 | NONE | | | 3 | NONE | LOCKED | LOCKED | LOCKED |

Fig. 70

| WEIGHT (kg) | SLIDE ANGLE θ | ACCELERATION G | PSEUDO-LOCK ⇒ LOCKED O (NOT LOCKED X) | |
|---|---|---|---|---|
| | | | $AD^2$ (EMBODIMENT) | SIDE BALL TYPE (COMPARATIVE EXAMPLE 1) |
| 20 | 0° | 0.1 | × | × |
| | | 0.3 | O | × |
| | | 0.5 | O | × |
| | 3° | 0.1 | × | × |
| | | 0.3 | O | × |
| | | 0.5 | O | × |
| | 6° | 0.1 | O | × |
| | | 0.3 | O | × |
| | | 0.5 | O | × |
| 40 | 0° | 0.1 | × | × |
| | | 0.3 | O | × |
| | | 0.5 | O | × |
| | 3° | 0.1 | O | × |
| | | 0.3 | O | × |
| | | 0.5 | O | × |
| | 6° | 0.1 | O | × |
| | | 0.3 | O | O |
| | | 0.5 | O | O |
| 60 | 0° | 0.1 | × | × |
| | | 0.3 | O | × |
| | | 0.5 | O | × |
| | 3° | 0.1 | O | × |
| | | 0.3 | O | × |
| | | 0.5 | O | × |
| | 6° | 0.1 | O | × |
| | | 0.3 | O | O |
| | | 0.5 | O | O |

VEHICLE SEAT

TECHNICAL FIELD

The present invention relates to a vehicle seat for automobiles, aircrafts, trains, boats and ships, buses, and the like, and particularly relates to a vehicle seat suitable as a driver's seat or a passenger's seat of an automobile.

BACKGROUND ART

Vehicle seats are constantly demanded to have a light weight for fuel consumption improvement in view of energy conservation. The present applicant has hitherto made various proposals on technology related to weight reduction of vehicle seats. As one means among them, the applicant proposed one having a structure in which a three-dimensional knitted fabric is strained as respective cushion members of a seat back part and a seat cushion part (see Patent Document 1), instead of urethane materials which are generally used widely. By use of the strained three-dimensional knitted fabric, sufficient cushioning characteristics (vibration absorbency, impact energy absorbency, and the like) can be obtained despite its thinness, and thus weight reduction of the entire seat can be achieved. Further, as described likewise in Patent Literature 1, the applicant also proposed a contrivance of weight reduction by using a thin material as a frame, with a thickness of 1.0 mm or less in the case of iron-based material, or a thickness of 1.6 mm or less in the case of aluminum.

PRIOR ART DOCUMENTS

Patent Document

Patent Document 1: Japanese Patent Application Laid-open No. 2011-42302

DISCLOSURE OF THE INVENTION

Problems to be Solved by the Invention

Because of having a structure using the strained three-dimensional knitted fabric as a cushion member, the above-described vehicle seat must have a frame structure suitable for straining the three-dimensional knitted fabric, inevitably resulting in a dedicated product. Thus it has a problem in an attempt to reduce costs. In particular, in the seat cushion part, contrivances are needed in structure of spring members such as a torsion bar and a coil spring for elastically supporting the tensioned three-dimensional knitted fabric, which tends to be of high costs. However, when the cushion member of the seat cushion part is made as what is called a laid structure type which is disposed by supporting a lower surface thereof, a generally used urethane member can be used, which allows cost reduction. Of course, even when the cushion member of laid structure type such as a urethane member is used, it is desired to allow weight reduction as compared to a seat using a cushion member of the conventional laid structure type.

The present invention has been made in view of the above problems, and it is an object thereof to provide a vehicle seat which is structured so that the laid structure type can be applied as the cushion member of a seat cushion part, and which has predetermined rigidity and strength while using a thin metal material, is suitable for weight reduction, and allows cost reduction. Further, it is another object to provide a vehicle seat which can contribute to further cost reduction by making a structure dividing a seat frame into plural parts and unitizing them so as to allow production adjustment of every unit, and is suitable for weight reduction even by the unitized structure.

Means for Solving the Problem

In order to achieve the above objects, a vehicle seat of the present invention is a vehicle seat including a seat cushion part and a seat back part, wherein the seat cushion part has a cushion frame unit supporting a cushion member for the seat cushion part and the seat back part has a back frame unit supporting a cushion member for the seat back part, a left and right side frames constituting the cushion frame unit are coupled to and supported by a left and right sliders, respectively, constituting a seat slide device, and are each constituted of one or a plurality of plate-shaped frames long in a forward and backward direction and formed of a thin material made of metal with a predetermined thickness or less, a plurality of beams are bridged across the left and right side frames of the cushion frame unit, and at least one of the left and right side frames is supported on the seat slide device via a truss support part receiving a force in the forward and backward direction, the truss support part being formed of a coupling support part with respect to the slider, the beams bridged across the left and right side frames, and an inter-node connecting part coupling the coupling support part and the beams in a direction substantially orthogonal to a disposition direction of the beams.

Preferably, the left and right side frames constituting the cushion frame unit are each constituted of a combination of the plurality of plate-shaped frames disposed in parallel on an outside and an inside, and the beams bridged across a range in which the inner and outer plate-shaped frames are overlapped with each other when seen from a side are provided so that vicinities of their ends penetrate the inner and outer plate-shaped frames, so as to support the inner and outer plate-shaped frames by the both ends.

Preferably, coupling support parts for the left and right side frames and the left and right sliders are provided between a substantially center part and a rear edge in the forward and backward direction of the side frames, and the left and right coupling support parts are coupled by a shaft member, and the truss support part is formed of the shaft member, two beams out of the plural beams disposed between the substantially center part and the rear edge in the forward and backward direction of the side frames, and inter-node connecting parts respectively connecting vicinities of respective ends of the two beams, and vicinities of ends of the shaft member and the vicinities of respective ends of the two beams.

Preferably, the inter-node connecting parts constituting the truss support part are formed so that rigidity in the forward and backward direction is high compared to a material state of the plurality of plate-shaped frames constituting the one of the side frames. Preferably, in the inter-node connecting part between the two beams, a reinforcing link is layered on one of the plate-shaped frames constituting the one of the side frames, forming the inter-node connecting part with relatively high rigidity by the reinforcing link.

Preferably, there are included rear links having one end pivotally supported on the shaft member disposed to be close to a rear side of the left and right sliders, and there is included a left and right front links having one end pivotally supported on a shaft member disposed to be closer to a front side than the shaft member, wherein respective other ends of the left and right front links are pivotally supported on a front beam out of the beams, the front beam being bridged to be close to the front side across the left and right side frames of the cushion frame unit, respective other ends of the left and right rear links are pivotally supported on a rear beam out of the two beams, the rear beam disposed to be closer to the rear side, a sub-link is provided on a side of at least one of the side frames, the sub-link having one end pivotally supported on the shaft member on which one end of the rear beam is pivotally supported, and another end pivotally supported on the other beam out of the two beams, the other beam being located closer to the front side than the rear beam, and the rear link and the sub-link are inter-node connecting parts respectively connecting vicinities of ends of the shaft member and the vicinities of respective ends of the two beams, thereby forming the truss support part.

Preferably, on a side of one of the left and right side frames, a belt anchor part of a seat belt is supported on an end of a rear beam out of the two beams, the rear beam disposed closer to the rear side. Preferably, a side of one side frame out of the left and right side frames is supported on the seat slide device by the truss support part, and a side of the other side frame is supported by a quadric crank chain mechanism constituted of the front link and the rear link, the slider on which respective one ends thereof are pivotally supported, and the other side frame on which respective other ends thereof which are rotating free ends thereof are pivotally supported.

Preferably, on a side of the other side frame facing the one of the side frames on which the belt anchor part is attached, a clutch part of a lifter mechanism part for transmitting an operating force of an operating unit to the links is disposed, and a driving link with high rigidity compared to a material state of the plate-shaped frames constituting the side frames is disposed between the rear link and the clutch part which are disposed on the side of the other side frame.

Preferably, the back frame unit is coupled via a reclining mechanism part to the respective pluralities of plate-shaped frames constituting the left and right side frames of the cushion frame unit. Preferably, the back frame unit is coupled via the reclining mechanism part to one of the respective pluralities of plate-shaped frames constituting the side frames of the cushion frame unit, and the vehicle seat is structured such that a force applied to the seat cushion part and the seat back part is dispersed to a transmission path through which the force passes one of the respective pluralities of plate-shaped frames constituting the side frames of the cushion frame unit from the back frame unit via the reclining mechanism part to thereby reach the seat slide device, and to a transmission path through which the force passes the other of the respective pluralities of plate-shaped frames constituting the side frames of the cushion frame unit to thereby reach the seat slide device. Preferably, there is included a reclining unit having a cushion bracket retaining the reclining mechanism part and coupled to the plate-shaped frames constituting the side frames of the cushion frame unit and a back bracket coupled to side frames of the back frame unit. Preferably, the plate-shaped frames constituting each of the side frames of the cushion frame unit and the cushion bracket are partially overlapped and coupled by joining with bolts, and the side frames of the back frame unit and the back bracket are partially overlapped and coupled by joining with bolts. Preferably, the vehicle seat is structured such that the reclining mechanism part having the cushion bracket coupled to the plate-shaped frames constituting the side frames of the cushion frame unit is retained by the side frames of the back frame unit. Preferably, the plate-shaped frames constituting the side frames of the cushion frame unit and the cushion bracket are partially overlapped and coupled by joining with bolts.

Preferably, in the side frames of the back frame unit, a portion higher than the reclining mechanism part is an easy deformation portion. Preferably, at least a portion of the side frames of the cushion frame unit, the side frames of the back frame unit, the cushion bracket of the reclining unit, and the back bracket of the reclining unit is formed to have a closed cross-sectional shape. Preferably, at least a portion of the side frames of the cushion frame unit and the side frames of the back frame unit is formed to have a closed cross-sectional shape. Preferably, the vehicle seat is structured such that a portion from a substantially center part in a length direction of the side frames of the back frame unit to a disposition position of the reclining mechanism part forms the portion having the closed cross-sectional shape.

Preferably, in an upper frame structure part located between upper parts of the side frames of the back frame unit, guide holes penetrating in an upward and downward direction are formed, and an adjusting mechanism for adjusting a height of head rest poles of a head rest inserted through the guide holes is provided, the adjusting mechanism has a lock plate which is provided to project forward on a rear surface in an inner surface of the guide holes and engages with plural engaging trenches formed at predetermined intervals in a longitudinal direction in the head rest poles, and an elastic member biasing the head rest poles in a direction to engage with the lock plate, the guide holes are formed to have an inner diameter larger than a diameter of the head rest poles, and the adjusting mechanism is structure such that when the head rest poles are displaced forward from a lock state in which the head rest poles are biased by the elastic member in a direction to the lock plate and the engaging trench is engaged with the lock plate, engagement of the lock plate and the engaging trench is released against elasticity of the elastic member, making it possible to perform a height adjustment.

Preferably, the upper frame structure part located between upper portions of the side frames of the back frame unit has an upper pipe and an upper fitting frame to be engaged with the upper pipe, the back frame unit has a back support member coupled to the upper fitting frame and located between the pair of side frames, and when the back support member is pressed backward by pressing of the cushion member of the seat back part by a pressure of a predetermined value or more, the upper fitting frame has a structure to pivot forward about the upper pipe, displacing the head rest supported by the upper frame structure forward.

Preferably, the back support part is constituted of a spring member, and an upper part thereof is disposed to be located on a front side and a rear side of the head rest poles, and the back support part is provided so that backward pivoting of a lower side of the head rest poles accompanying a forward displacement of the head rest generated by pressing the back support part backward or backward pivoting of the lower side of the head rest poles generated by directly pressing the head rest forward from a rear side is restricted while being buffered by an elastic force of an upper part of the spring member constituting the back support part.

Preferably, when a force to pivot the lower side of the head rest poles backward is a predetermined value or more, the spring member is structured such that an upper part of the spring member constituting the back support part engages with the engaging trenches formed in the head rest poles.

Preferably, for at least a part of members constituting the cushion frame unit and the back frame unit, a thin material made of metal having a thickness of 1.8 mm or less is used. Preferably, a material with tensile strength in a range of 400 to 590 MPa is used as the thin material made of metal. Preferably, rigidity enhancement by a heat treatment is performed on at least a part of the members constituting the cushion frame unit and the back frame unit.

Preferably, the lifter mechanism unit is provided so that an attaching part of a base part of the clutch unit is fixed to the plate-shaped frame located inside on a side of the other side frame facing the one side frame to which the belt anchor part of the cushion frame unit is attached, and a main body part thereof projects on an outer surface side thereof from a through hole formed in the plate-shaped frame located outside.

Preferably, each of the sliders constituting the seat slide device is structured to have a lower rail, an upper rail which slides relative to the lower rail and to which the cushion frame unit is coupled, and a lock mechanism which locks the upper rail at an appropriate slide position with respect to the lower rail, and the lock mechanism is structured such that it has an elastic lock member formed of an elastic member which is supported on each of the upper rails and has lock claws engaging with engaged parts formed in the lower rails, and the elastic lock member becomes an elastic fulcrum and elasticity of the elastic lock member operates on the lower rails and the upper rails.

Preferably, each of the sliders constituting the seat slide device is structured to have a lower rail, an upper rail which slides relative to the lower rail and to which the cushion frame unit is coupled and a lock mechanism which locks the upper rail at an appropriate slide position with respect to the lower rail, the lower rails and the upper rails are formed to be substantially symmetrical bilaterally with respect to a center in a cross-sectional shape orthogonal to a longitudinal direction, and the lock mechanism is provided on both sides of the upper rails and structured to be capable of engaging with and locking the lower rails, respectively. Preferably, each of the sliders is structured to have a lower rail and an upper rail which slides relative to the lower rail and to which the cushion frame unit is coupled, and an easy deformation portion is set in the lower rails, the easy deformation portion deforming without disengaging the upper rails when a predetermined force or more operates in a direction to disengage the upper rails which are coupled to the cushion frame unit from the lower rails. A structure in which the lower rails are formed of a spring steel is also possible. Preferably, in the lower rails, bottom wall parts have a portion having an R-shaped cross-section in a corner on both ends in a width direction, an inside part thereof is a stepped portion projecting upward, and moreover the lower rails are formed into a shape in which a tensile force operates to make a substantially center part in the width direction have a shape expanding upward. Preferably, the vehicle seat is structured such that a Coulomb force between the lower rails and the upper rails decreases accompanying increase in load mass. Moreover, preferably, the lower rails and the upper rails are structured so that by an input of an impact force a section modulus in a vertical direction increases and strength and rigidity improve.

Preferably, the cushion member disposed in the seat cushion part is structured to have an external cushion member having a pair of side support parts and a rear support part, and an internal cushion member which is supported by a beam bridged across the side frames of the cushion frame unit, has a shape which is disposable in a range surrounded by the external cushion member, has a shape such that a front edge projects more forward than a beam disposed on a most front side, and is relatively movable with respect to the external cushion member. Preferably, there is further included a two-dimensional or three-dimensional woven fabric member supported by a beam bridged across the side frames of the cushion frame unit, wherein the internal cushion member is disposed on the woven fabric member. Preferably, an outer layer member covers the external cushion member and the internal cushion member and is pulled into a gap between the external cushion member and the internal cushion member in a boundary therebetween, and the pulled-in portion is coupled to the woven fabric member. Preferably, in a closed cross-sectional space formed in advance by coupling the outer layer member and the woven fabric member in an outside and an inside across the boundary, the external cushion member and the internal cushion member are inserted and disposed. Preferably, the outer layer member and the woven fabric member are coupled by sewing or by using a hook-and-loop fastener without using a metal fitting.

Effects of the Invention

In a vehicle seat of the present invention, a left and right side frames constituting a cushion frame unit are constituted of plate-shaped frames which are long in a forward and backward direction and formed of a thin material made of metal with a predetermined thickness or less, a plurality of beams are bridged across the side frames, and moreover, one or both of the side frames is or are supported on a seat slide device via a truss support part. Alternatively, one of them is supported via the truss support part, and the other of them is supported via a quadric crank chain mechanism made up of a front link and a rear link. In other words, the side frames disposed in a direction substantially orthogonal to the plurality of beams serve the role of stringers, and as a result, in particular, rigidity in a forward and backward direction of the side frames becomes high rigidity of a predetermined value or more even when it is a thin material. Then, by having such a structure, on at least one of the side frames, the truss support part is formed of a coupling support part with a slider of the seat slide device, beams bridged across the left and right side frames, and inter-node connecting parts coupling them in a direction substantially orthogonal to a disposition direction of the beams. At least a part of the inter-node connecting parts is formed in the forward and backward direction or oblique direction, thereby more enhancing rigidity in the forward and backward direction of the side frames and operating high drag against a force in the forward and backward direction inputted to the cushion frame unit. That is, this is a structure in which a force applied in the forward and backward direction is received by the side frame whose rigidity is enhanced by combining with the beams and moreover is received as a drag by the truss support part or the quadric crank chain mechanism, and also a force in a perpendicular direction is received by a cross section of the slider of the seat slide device via the truss support part or the quadric crank chain mechanism. Therefore, when the front link and the rear link, and so on constituting the truss support part or the quadric crank chain mechanism is constituted of a thick plate with a predetermined thickness, the inter-node connecting part is constituted to have a predetermined thickness, a reinforcing link is layered on the inter-node connecting part, or the inter-node connecting part is heat treated to form it with high rigidity of a predetermined value or more, it is possible to endure a predetermined force inputted in the perpendicular direction and the forward and backward direction even when the other members (side frames and so on of the cushion frame unit) are formed of the thin material, and weight reduction can thus be achieved.

Further, the side frames of the cushion frame unit are each constituted of a plurality of plate-shaped frames and the plate-shaped frames are structured to be supported by a both-end support in the vicinities of ends of the beams, and thereby rigidity of the entire cushion frame unit can be enhanced even when a thinner material is used as the plate-shaped frames.

Further, by using the plurality of plate-shaped frames, a transmission path of force can be dispersed easily to the plate-shaped frames, and is also dispersed to the front and rear by the above-described truss support part and quadric crank chain mechanism, and thus also this point contributes to forming component members of the thin material.

Further, when the respective side frames of the back frame unit and the cushion frame unit are coupled, or an independent reclining unit is provided and the respective side frames of the cushion frame unit and the back frame unit are coupled to cushion brackets and back brackets thereof, by a structure in which they are partially overlapped with each other and the overlapped ranges are coupled by joining with bolts, strength of these portions can be enhanced even when the thin material is used.

Further, in each of the side frames of the back frame unit, by providing overlaps of members with each other and/or a closed cross-sectional shape, that is, by providing a portion where a section modulus suddenly changes, an upper portion thereof is relatively low in rigidity and becomes an easy deformation portion. Thus, when a predetermined impact force or more is applied, upper portions of the side frames can deform quickly to absorb a moment applied to an upper part of the back frame unit, thereby contributing to reduction of damage to a human body by the impact force. Further, when an upper frame structure part is constituted of an upper pipe and an upper fitting frame, and a back support part coupled to the upper fitting frame are provided, the upper fitting frame pivots and a head rest attached to the upper frame structure part displaces forward when a predetermined impact force or more is applied and the back support member is pushed in, and hence this structure also contributes to reduction of head injury.

On the other hand, since it is a structure to be produced in units such as the back frame unit, the cushion frame unit, and so on, and they are coupled with bolts, an input can be dispersed easily, and when a lock mechanism of the seat slide device is constituted of a material having relatively low strength, the entire seat can be structured to have high strength. Further, since it can be produced in units, by performing a production adjustment in every unit, reduction of production costs can be achieved.

Further, by making the structure in which the plurality of beams are bridged across the side frames of the cushion frame unit, rigidity of the plate-shaped frames constituting the side frames to be the transmission path of force as described above can be enhanced, and a cushion member can be disposed by laying on the beams. Therefore, a general-purpose urethane member can be used as a cushion member which can contribute to cost reduction, and since it is a structure to support a lower face of the cushion member by the beams instead of a cushion pan despite that it is a laid structure, weight reduction can be achieved as compared to a typical structure using a cushion pan. Further, by using ones divided into plural pieces as the cushion member, a relative displacement of the both operates as a restoring force, and thus it leads to improvement in vibration absorbing function. Further, by using an elastic lock member as the lock mechanism of the seat slide device, or by constituting the lower frame from an elastic member, an absorption function of energy due to vibration or impact force by them can be enhanced more. That is, the impact force and vibration absorbing function of the cushion member and the seat slide device substitutes for metal springs or the like provided conventionally in the cushion frame unit or the like, and also in this point weight reduction due to decrease in number of members can be achieved.

BRIEF DESCRIPTION OF DRAWINGS

FIG. 1 is a perspective view seen from an oblique right front side illustrating an appearance of a vehicle seat according to one embodiment of the present invention.

FIG. 2 is a perspective view seen from an oblique left front side illustrating an appearance of the vehicle seat according to the embodiment.

FIG. 3 is a left side view illustrating an appearance of the vehicle seat according to the embodiment.

FIG. 4 is a right side view illustrating an appearance of the vehicle seat according to the embodiment.

FIG. 6 is an exploded perspective view of FIG. 1.

FIG. 7 is a perspective view of a seat frame and a seat slide device of the vehicle seat according to the embodiment seen from an oblique right front side.

FIG. 8 is a perspective view of the seat frame and the seat slide device of the vehicle seat according to the embodiment seen from an oblique left front side.

FIG. 9 is a perspective view seen from a rear side illustrating a back frame unit, a cushion frame unit, and so on of the vehicle seat according to the embodiment.

FIG. 10 is a plan view of FIG. 9.

FIG. 11 is a right side view of FIG. 9.

FIG. 12 is a left side view of FIG. 9.

FIG. 13 is a perspective view seen from an oblique right front side illustrating the cushion frame unit of the vehicle seat according to the embodiment.

FIG. 14 is a perspective view seeing the cushion frame unit of FIG. 13 from an oblique left front side.

FIG. 15 is a plan view of the cushion frame unit of FIG. 13.

FIG. 16 is an exploded perspective view of the cushion frame unit of FIG. 13.

FIG. 17 is an exploded perspective view of a state of assembling part of the cushion frame unit of FIG. 13.

FIG. 19 is a perspective view seen from an oblique right front side illustrating the cushion frame unit in which a reinforcing link is disposed on a side frame of one side.

FIG. 20 is a perspective view seeing the cushion frame unit of FIG. 19 from an oblique left front side.

FIG. 21 is a perspective view seen from an oblique right front side illustrating the cushion frame unit in which a sub-link and a reinforcing link are disposed on the side frames of both sides.

FIG. 22 is a perspective view seeing the cushion frame unit of FIG. 21 from an oblique left front side.

FIG. 23 is a perspective view seen from a front side illustrating a reclining unit of the vehicle seat according to the embodiment.

FIG. 24 is a perspective view seeing the reclining unit of FIG. 23 from a rear side.

FIG. 25 is an exploded perspective view of the reclining unit of FIG. 23.

FIG. 26 is a perspective view seen from a front side illustrating the back frame unit of the vehicle seat according to the embodiment.

FIG. 27 is a perspective view seeing the back frame unit of FIG. 26 from a rear side.

FIG. 28 is an exploded perspective view of the back frame unit of FIG. 26.

FIG. 30 is a C-C cross-sectional view of FIG. 29($a$).

FIG. 31 is a perspective view seeing the seat slide device of the vehicle seat according to the embodiment seen from an oblique right front side.

FIG. 32 is a perspective view of the seat slide device of the vehicle seat according to the embodiment seen from an oblique left front side.

FIG. 33 is a side view of the seat slide device of the vehicle seat according to the embodiment.

FIG. 34 is a plan view of the seat slide device of the vehicle seat according to the embodiment.

FIG. 35 is a front view of the seat slide device of the vehicle seat according to the embodiment.

FIG. 36 is a rear view of the seat slide device of the vehicle seat according to the embodiment.

FIG. 37 is an exploded perspective view of the seat slide device of the vehicle seat according to the embodiment.

FIG. 41 is a rear view of a seat slide device according to a mode of FIG. 40.

FIG. 42 is a perspective view illustrating a cushion member used in the seat cushion part of the vehicle seat according to the embodiment.

FIG. 43 is a perspective view illustrating an external cushion member constituting the cushion member of FIG. 42.

FIG. 44 is a perspective view illustrating an internal cushion member constituting the cushion member of FIG. 42.

FIG. 45 is an exploded perspective view illustrating a vehicle seat according to another embodiment of the present invention.

FIG. 46 is a perspective view seen from an oblique right front side illustrating a back frame unit, a cushion frame unit, and so on of the vehicle seat according to the other embodiment.

FIG. 47 is a perspective view seen from an oblique left front side illustrating the back frame unit, the cushion frame unit, and so on of FIG. 46.

FIG. 48 is a perspective view seen from an oblique left front side illustrating the back frame unit of FIG. 46.

FIG. 49 is a perspective view seen from an oblique right front side illustrating the back frame unit of FIG. 46.

FIG. 50 is a perspective view seen from an oblique right front side illustrating a back frame unit, a cushion frame unit, and so on of the vehicle seat according to still another embodiment of the present invention.

FIG. 51 is a perspective view seen from an oblique left front side illustrating the back frame unit, the cushion frame unit, and so on of FIG. 50.

FIG. 53 is a view for explaining manufacturing of the vehicle seat according to the embodiment illustrated in FIG. 50 to FIG. 52.

FIG. 54 is a perspective view illustrating a back frame unit, a cushion frame unit, and so on of the vehicle seat according to yet another embodiment of the present invention.

FIG. 56 is a perspective view of the back frame unit of FIG. 55 seen from a rear side.

FIG. 57(A) is an exploded perspective view of FIG. 56, FIG. 57($b$) is an A-A cross-sectional view of FIG. 57($a$), FIG. 57($c$) is a B-B cross-sectional view of FIG. 57($a$), and FIG. 57($d$) is a C-C cross-sectional view of FIG. 57($a$).

FIG. 58 is a view for explaining operation of the vehicle seat according to the embodiment illustrated in FIG. 54 to FIG. 57.

FIG. 59 is a perspective view seen from an oblique right front side illustrating a back frame unit, a cushion frame unit, and so on of the vehicle seat according to yet another embodiment of the present invention.

FIG. 60 is a perspective view seen from an oblique left front side illustrating the back frame unit, the cushion frame unit, and so on of FIG. 59.

FIG. 61 is a perspective view seen from a rear side illustrating the back frame unit, the cushion frame unit, and so on of FIG. 59.

FIG. 63 is a diagram illustrating slide forces of sliders of FIG. 62.

[FIG. 65] FIG. 65($a$) is a diagram for explaining an experiment simulating a front collision, and FIG. 65($b$) is a diagram for explaining an experiment simulating a rear collision.

FIG. 66 is a diagram illustrating results of the experiment simulating a front collision.

FIG. 67 is a diagram illustrating results of the experiment simulating a rear collision.

FIG. 68 is a view illustrating cross-sectional shapes of a slider when the experiment simulating the front collision was performed.

[FIG. 69] FIG. 69(a) is a diagram for explaining a test method for comparing easiness of locking of the seat slide device according to the embodiment and the seat slide devices according to the comparative examples, (b) to (d) illustrate test results of the seat slide devices according to the embodiments, and (e) illustrate test results of the seat slide device according to a comparative example.

[FIG. 70] FIG. 70 is a diagram illustrating whether pseudo-lock occurred or not in the test results of FIG. 69 by summarizing.

BEST MODE FOR CARRYING OUT THE INVENTION

Figure 1:
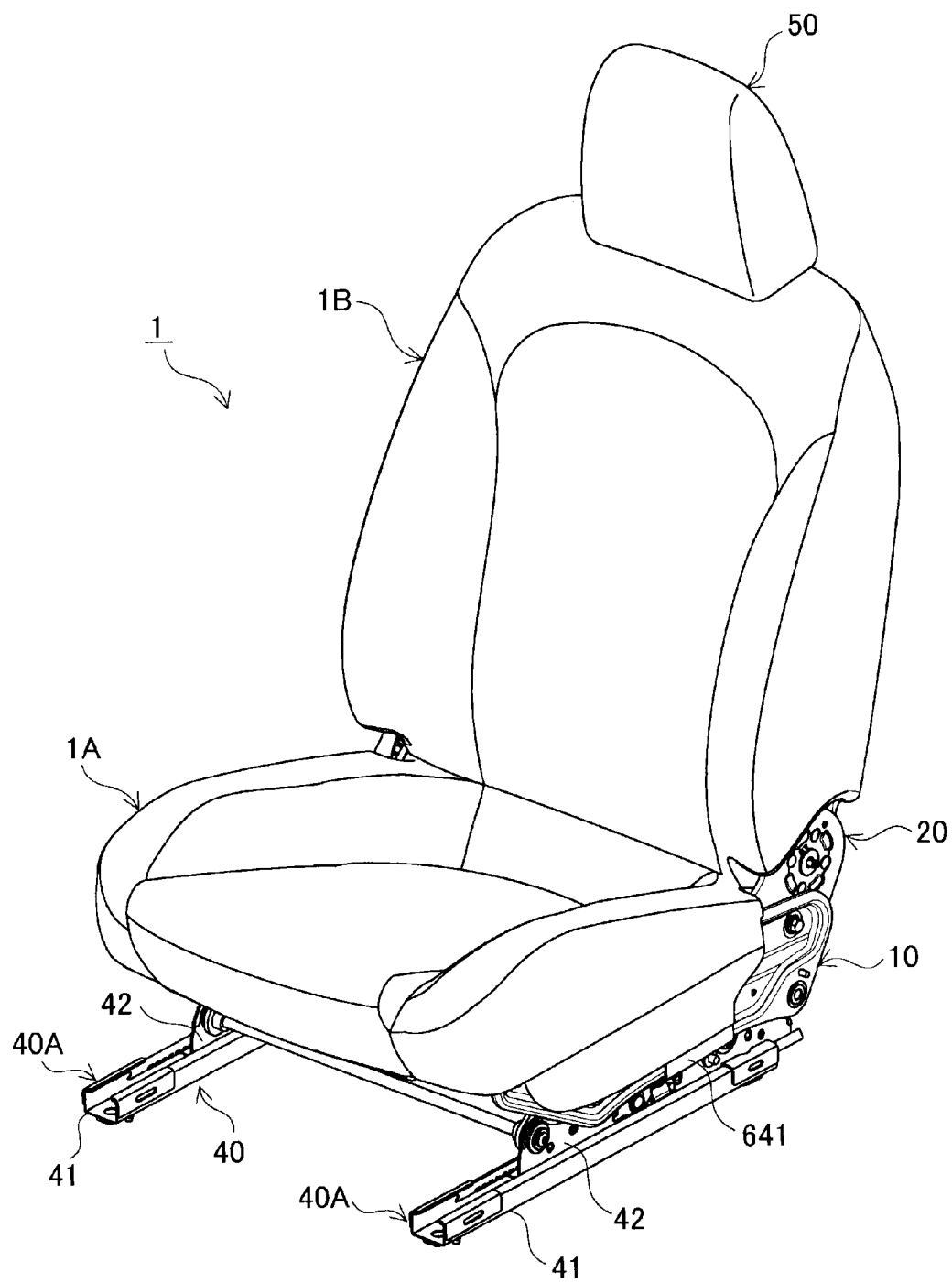
[FIG. 1]
Figure 2:
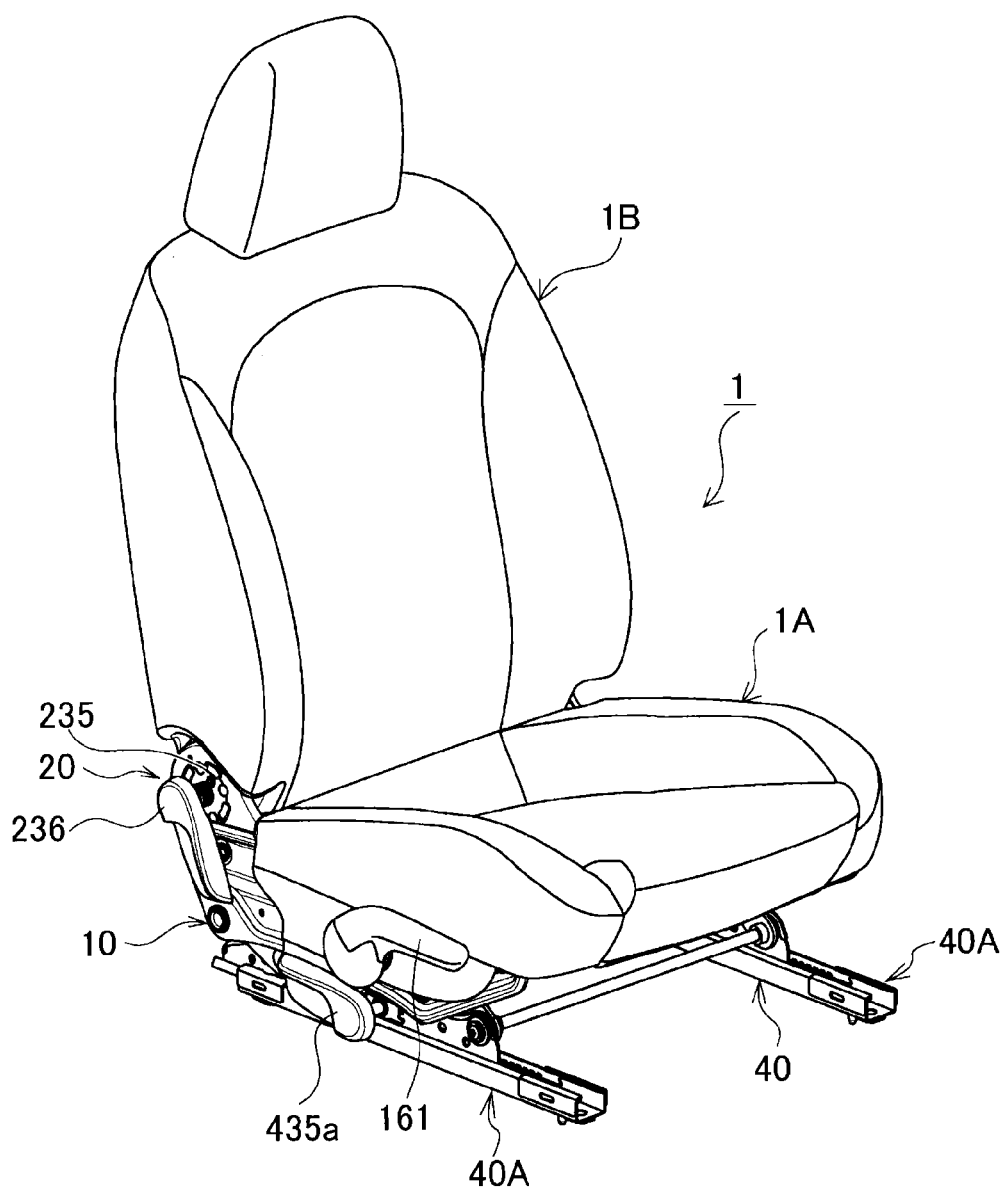
[FIG. 2]
Figure 3:
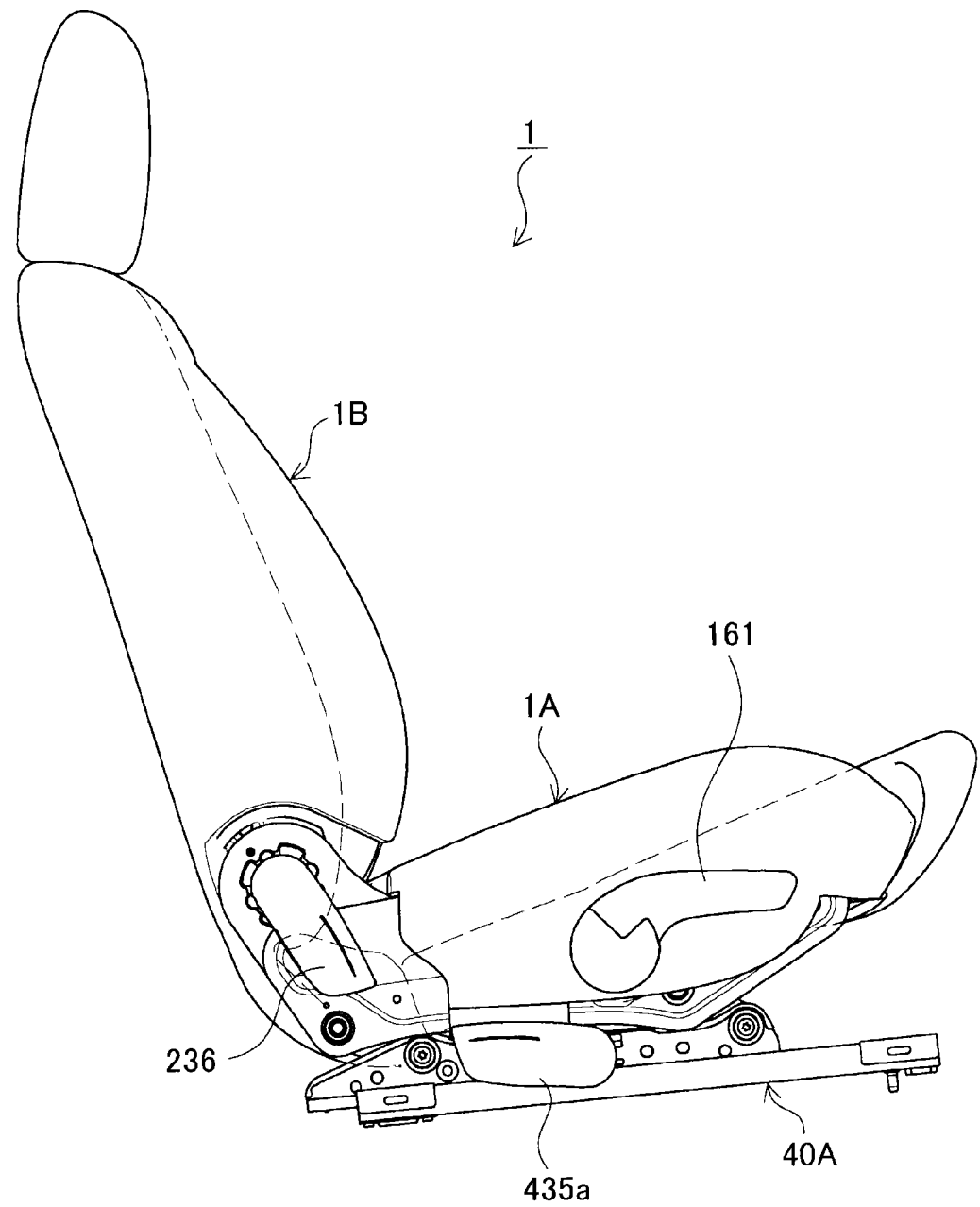
[FIG. 3]
Figure 4:
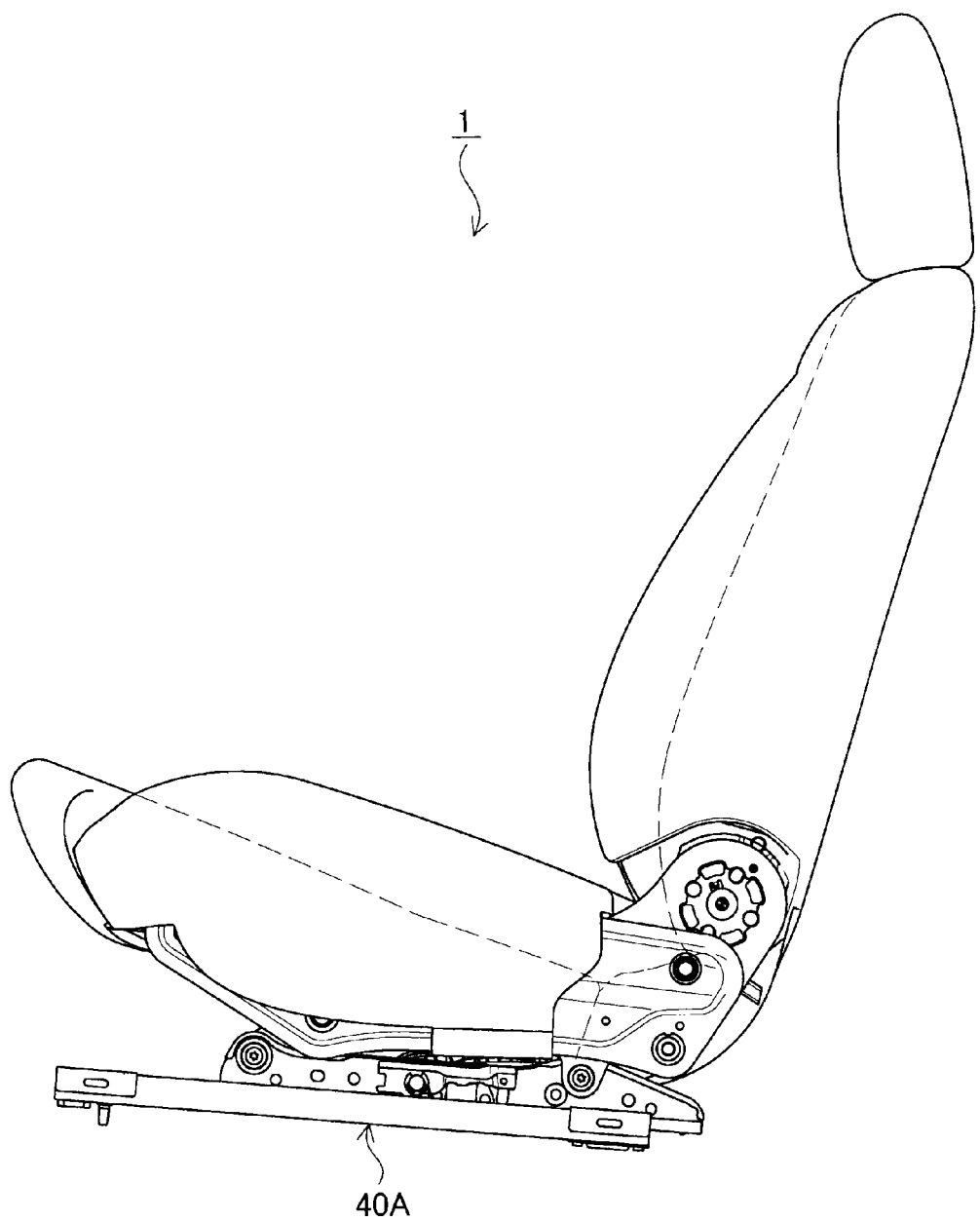
[FIG. 4]

Hereinafter, the present invention will be described in more detail based on embodiments illustrated in drawings. FIG. 1 to FIG. 5 are views illustrating an appearance of a vehicle seat 1 according to one embodiment of the present invention, and FIG. 6 is an exploded perspective view thereof. FIG. 7 to FIG. 44 are views illustrating detailed structures of a cushion frame unit 10, a reclining unit 20, a back frame unit 30, a seat slide device 40, and so on.

As illustrated in FIG. 1 to FIG. 6, the vehicle seat 1 of this embodiment has a cushion frame unit 10 forming a seat cushion part 1A, and a back frame unit 30 forming a seat back part 1B, and they are coupled by the reclining unit 20.

The cushion frame unit 10 is structured to have two side frames 11, 11 supported respectively by upper frames 42, 42 disposed to the left and right of the seat slide device 40 as illustrated in FIG. 7 to FIG. 17. The respective side frames 11, 11 are structured to have two internal and external plate-shaped frames, outer plate-shaped frames 111, 111 and inner plate-shaped frames 112, 112. The outer plate-shaped frames 111, 111 are formed using a plate-shaped member having a predetermined length and width, and disposed so that its length direction is along a forward and backward direction and its width direction is along an upward and downward direction. The inner plate-shaped frames 112, 112 are formed using a plate-shaped member shorter in both length and width than the outer plate-shaped frames 111, 111, and are disposed close to front edges of the outer plate-shaped frames 111, 111 in their entirety.

In a range where the outer plate-shaped frames 111, 111 and the inner plate-shaped frames 112, 112 overlap when seen from a side, plural beams 121 to 124 are bridged over. Specifically, there are disposed, by bridging over, a first beam 121 close to front portions of the inner plate-shaped frames 112, 112 and close to upper portions thereof, a second beam 122 in the vicinity of substantially centers in the forward and backward direction of the inner plate-shaped frames 112, 112 and slightly closer to the upper portions thereof than substantially centers in the upward and downward direction, a third beam 123 in the vicinity of rear portions in the forward and backward direction of the inner plate-shaped frames 112, 112 and close to lower portions in the upward and downward direction, and a fourth beam 124 in the vicinity of the substantially centers in the forward and backward direction of the inner plate-shaped frames 112, 112 and closer to the lower portions than the second beam 122.

In these beams 121 to 124, the vicinities of ends in a longitudinal direction are fixed by penetrating the inner plate-shaped frames 112, 112 and further penetrating the outer plate-shaped frames 111, 111 in the thickness direction. Therefore, both the pairs of the inner plate-shaped frames 112, 112 and the outer plate-shaped frames 111, 111 (side frames 11, 11) which are disposed to the left and right respectively are structured to be supported by both ends between portions in the beams 121 to 124 penetrating the inner plate-shaped frames 112, 112 and the outer plate-shaped frames 111, 111. Thus, a force applied by impact and vibration is transmitted in a manner dispersed in a good balance to the inner plate-shaped frames 112, 112 and the outer plate-shaped frames 111, 111 on the left and right.

Since the outer plate-shaped frames 111, 111 and the inner plate-shaped frames 112, 112 are of such a both end support structure, the range in which the both overlap when seen from a side becomes a part of high rigidity in the forward and backward direction as compared to material states of the outer plate-shaped frames 111, 111 or the inner plate-shaped frames 112, 112, and thus has high strength. Further, the vicinities of the ends of the respective beams 121 to 124 providing the both end support also become a high-rigidity part having relatively high rigidity compared to center parts thereof. Note that, in order to maintain high rigidity of the parts of the outer plate-shaped frames 111, 111 and the inner plate-shaped frames 112, 112 in such a range where they overlap with each other, preferably, at least two beams are disposed in this range at well balanced positions with predetermined gaps in front and rear, or more preferably, four beams 121 to 124 are disposed as in this embodiment.

Rear portions of the outer plate-shaped frames 111, 111 do not overlap with the inner plate-shaped frames 112, 112 when seen from a side, but a fifth beam 125 is bridged across the opposing rear portions of the outer plate-shaped frames 111, 111. The fifth beam 125 is fixed by penetrating rear links 152, 152 which will be described later, and thereafter fixed by penetrating the rear portions of the outer plate-shaped frames 111, 111. Therefore, also the vicinities of ends of the fifth beam 125 provide a both end support structure supporting the rear links 152, 152 and the outer plate-shaped frames 111, 111, and this part also is a high-rigidity part having relatively high rigidity.

Here, preferably, an end of the fifth beam 125 which is exposed on an outer surface of the outer plate-shaped frames 111, 111 is an anchor attaching part 125a supporting a belt anchor part of a seat belt. When the anchor attaching part for a seat belt is provided on the seat slide device 40, the degree of fastening of the seat belt changes when the cushion frame unit 10 moves upward or downward by a lifter mechanism part 15. However, as in this embodiment, when the anchor attaching part 125a of the seat belt is the end of the fifth beam 125, the degree of fastening of the seat belt becomes constant irrespective of upward or downward movement of the cushion frame unit 10. Note that although the anchor attaching part 125a of the seat belt may be any high rigidity part in the vicinity of a rear part of the cushion frame unit 10 and is not limited to an end of the fifth beam 125, it is desired to use the fifth beam 125 in the structure of this embodiment.

The cushion frame unit 10 is disposed by coupling to upper rails 42, 42 of the seat slide device 40 attached to the left and right at a predetermined interval on a floor. Specifically, the cushion frame unit has front and rear links 151, 151, 152, 152 on the left and right respectively corresponding to the left and right side frames 11, 11, has a driving link 153, which will be described later, on a side of one side frame 11 and has a sub-link 154, which will be described later, on a side of the other side frame 11. Other ends (rotating free ends) of the front links 151, 151 are pivotally supported inside of respective coupling positions to the inner plate-shaped frames 112, 112 on the fourth beam 124.

One ends (lower ends) of the left and right rear links 152, 152 are pivotally supported on respective ends of a shaft member (a first shaft member) 152a bridged over close to rear sides of the upper rails 42, 42 of the seat slide device 40. Other ends (rotating free ends) of the rear links 152, 152 are pivotally supported inside of respective coupling positions to the inner plate-shaped frames 112, 112 on the fifth beam 125, as described above.

The rear link 152 disposed on one of the left and right sides (right side in this embodiment) has an extending portion 152b extending further upward of the coupling position to the fifth beam 125, and the driving link 153 is pivotally supported to this extending portion 152b.

Here, on one side frame 11 (right side one in this embodiment), a clutch part 160 of the lifter mechanism part is provided at a position slightly closer to a front side than a center part in the forward and backward direction. Specifically, an attaching part 160a constituted of a flange projecting outward on a base part of the clutch part 160 is fixed to the inner plate-shaped frame 112, and a main body part 160b is disposed to project outward from a through hole 111a formed in the adjacent outer plate-shaped frame 111 (see FIG. 16 and FIG. 17). An operating part 161 is connected to the main body part 160b projecting outward from the through hole 111a (see FIG. 2 and FIG. 3), and when the operating part 161 is operated, an output gear 160c of the clutch part 160 located between the outer plate-shaped frame 111 and the inner plate-shaped frame 112 rotates. A sector gear 160d is disposed so as to mesh with the output gear 160c between the outer plate-shaped frame 111 and the inner plate-shaped frame 112. A distal end (rotating free end) of the driving link 153 is pivotally supported on the sector gear 160d, the driving link 153 displaces corresponding to rotation of the sector gear 160, and this driving force is transmitted to the rear links 152, 152 which displace together with the front links 151, 51, displacing the entire cushion frame unit 10 upward or downward. Further, symbol 160f denotes a spiral spring, an inner end thereof is engaged with a rotation shaft 160e of the sector gear 160d, and an outer end is engaged with a pin 160h disposed to stand on an end of the sector gear 160d. The spiral spring 160f biases the sector gear 160d in a direction to raise the cushion frame unit 10. Note that when the cushion frame unit 10 is lowered, this biasing force functions to buffer this movement.

Further, as illustrated in FIG. 14, FIG. 16 to FIG. 18, one ends of the rear links 152, 152 are pivotally supported close to the rear sides of the upper rails 42, 42 and inside the upper rails 42, 42 on the shaft member 152a, but in a portion of the shaft member 152a which projects on an outside of the left upper rail 41, a sub-link slider side member 1541 constituting the sub-link 154 is pivotally supported. This sub-link slider side member 1541 has a substantially V-shape about a pivotal support position of the shaft member 152a, and when a lower side portion 1541a abuts on a stopper 156 projecting on the outside of the upper rail 41, a rising position is restricted (FIG. 18(a)). On an upper side portion 1541b of the sub-link slider side member 1541, one end of a sub-link cushion side member 1542 constituting the sub-link 154 together with the sub-link slider side member 1541 is pivotally supported, and another end (rotating free end) of the sub-link cushion side member 1542 is engaged with an end of the third beam 123. Therefore, when the operating part 161 is operated and the front links 151, 151 and the rear links 152, 152 stand up by driving of the clutch part 160, the side frames 11, 11 rise in the order of FIG. 18(c), FIG. 18(b) and FIG. 18(a), and at this time, the sub-link cushion side member 1542 stands up gradually, and thus the sub-link slider side member 1541 pivots about the pivotal support position with the shaft member 152a, the lower side portion 1541a abuts on the stopper 156, and upward movement beyond that is stopped.

As the outer plate-shaped frames 111, 111 and the inner plate-shaped frames 112, 112 constituting the side frames 11, 11 of the cushion frame unit 10, for weight reduction, a thin plate-shaped member, for example, one with a plate thickness of 1.8 mm or less, preferably one with a plate thickness in the range of 0.6 to 1.6 mm, more preferably one with a plate thickness in the range of 0.6 to 1.2 mm, furthermore preferably one with a plate thickness in the range of 0.6 to 1.0 mm can be used. Further, use of one with tensile strength in the range of 400 to 590 MPa is preferred in terms of costs and workability improvement.

From the above, in one of the side frames 11, 11, that is, the left side frame 11 in the cushion frame unit 10 of this embodiment, the shaft member 152a on which one end of the rear link 152, which is a coupling support part with respect to the upper rail 42 of the left slider 40A, and the sub-link slider side member 1541 of the sub-link 154 are pivotally supported, the fifth beam 125 on which the other end of the rear link 152 is pivotally supported, and the third beam 123 on which the other end of the sub-link cushion side member 1542 constituting the sub-link 154 is pivotally supported become nodes, and these nodes and inter-node connecting parts connecting the nodes consequently form a truss support part. The node connecting parts in this case are such that the inter-node connecting part between the shaft member 152a and the fifth beam 125 is the rear link 152 on the left side, the inter-node connecting part between the shaft member 152a and the third beam 123 is the sub-link 154 constituted of the sub-link slider side member 1541 and the sub-link cushion side member 1542 disposed on the left side, and the inter-node connecting part between the third beam 123 and the fifth beam 125 is a portion of the left side frame 11 (outer plate-shaped frame 111 and inner plate-shaped frame 112) which is located between the both.

Figure 19:
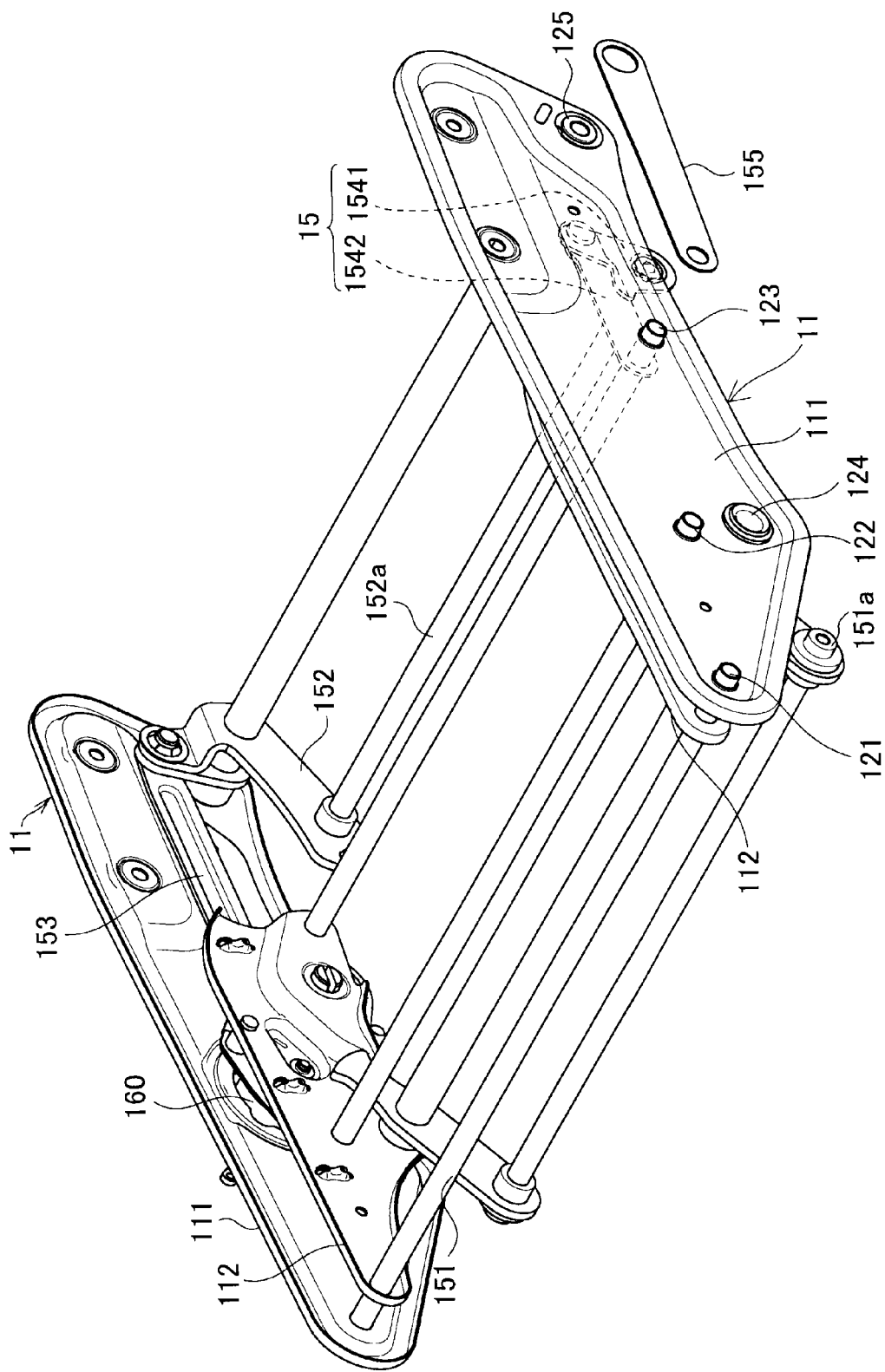
[FIG. 19]
Figure 20:
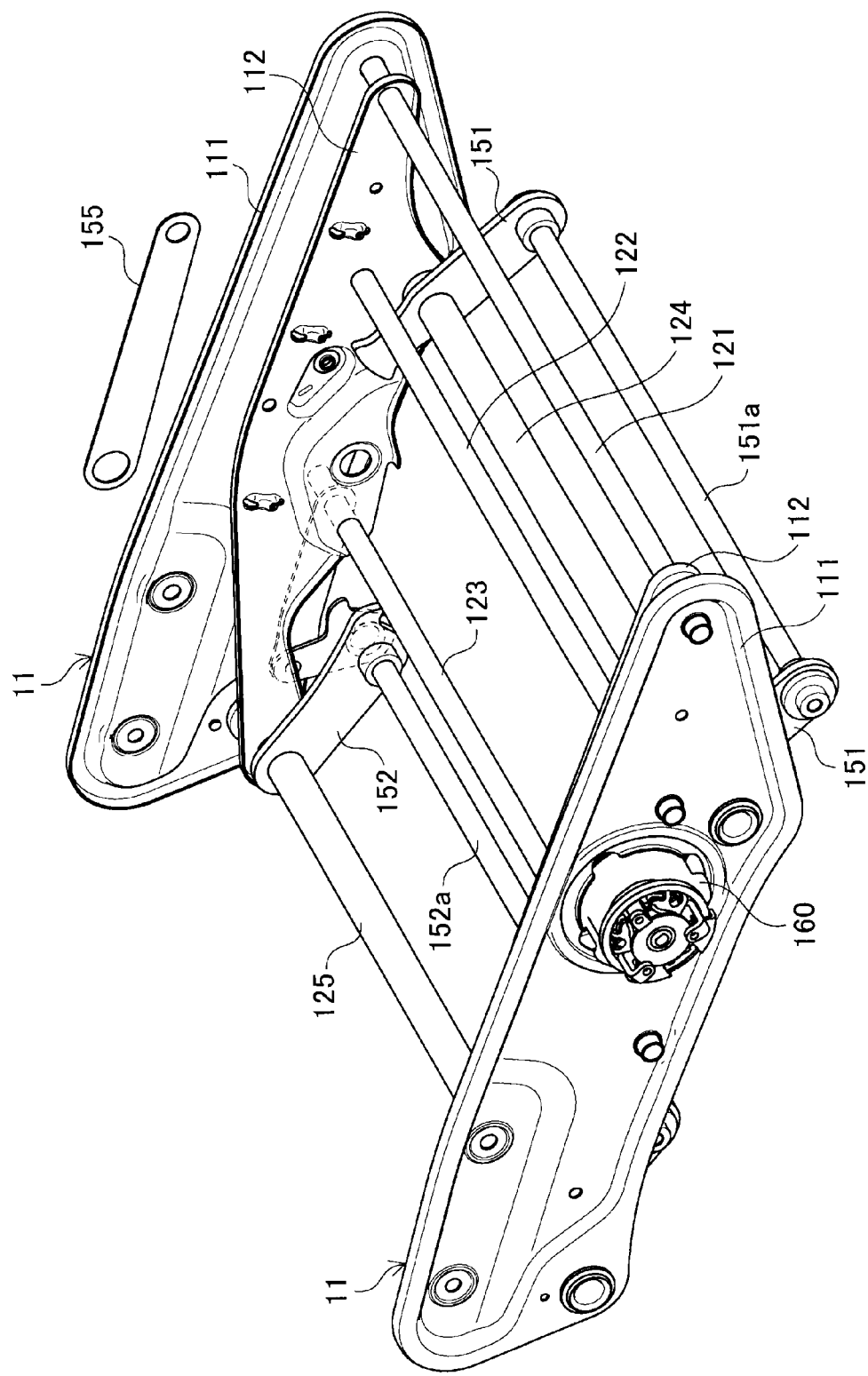
[FIG. 20]

The rear link 152 and the sub-link 154 constituting the inter-node connecting part are both constituted of a metal plate with a predetermined thickness (for example, thickness of 2.0 mm to 3.0 mm) which is thicker than the outer plate-shaped frame 111 and the inner plate-shaped frame 11 constituted of a thin material and has high rigidity. Further, for the inter-node connecting part between the third beam 123 and the fifth beam 125, the side frame 11 itself exhibits the function thereof, but since the gap between the third beam 123 and the fifth beam 125 is about a half the length in the forward and backward direction of the side frame 11 or less, rigidity of the portion located between the both is higher in the forward and backward direction than other portions. However, in order to further increase the rigidity in the forward and backward direction of the inter-node connecting part between the third beam 123 and the fifth beam 125, as illustrated in FIG. 19 and FIG. 20, preferably, a reinforcing link 155 is bridged across the third beam 123 and the fifth beam 125, and this is disposed so as to be layered on an outer surface of the outer plate-shaped frame 111 for example as illustrated in the drawings. Note that the reinforcing link 155 can also be disposed on an inner surface side of the side frame 11. The inter-node connecting part between the third beam 123 and the fifth beam 125 on the side frame 11, particularly the outer plate-shaped frame 111 can also be enhanced in rigidity by a heat treatment. After the heat treatment is performed, it is also possible to further layer the reinforcing link 155.

On the other hand, in this embodiment, the right side frame 11 is supported via a quadric crank chain mechanism by a combination of the front link 151 and the rear link 152 described above as well as the upper frame 42 of the right side slider 40A on which respective one ends of the front link 151 and the rear link 152 are pivotally supported, and the right side frame 11 where the other ends which are rotating free ends of the front link 151 and the rear link 152 are pivotally supported. Note that the other end of the rear link 151 is pivotally supported on the driving link 153. The driving link 153 is formed to have approximately the same thickness as the front link 151 and the rear link 152 and is coupled to the clutch part 160 of the lifter mechanism part, and thus has high rigidity. That is, the right side frame 11 also has high rigidity in the forward and backward direction.

To the vehicle seat, in broad categories, a force in the forward and backward direction inputted via the belt anchor part of the seat belt and a force in a perpendicular direction accompanying irregularities of the road are inputted. Conventionally, since the belt anchor part of the seat belt is coupled and supported onto the seat slide device, a lock mechanism which can fix the upper rail to the lower rail with high rigidity is provided, and this lock mechanism mainly receives the force in the forward and backward direction. However, in this embodiment, the coupling support part of the belt anchor part is provided on the fifth beam 125 of the cushion frame unit 10 as described above. Therefore, in the case of this embodiment, the cushion frame unit 10 has to receive the force in the forward and backward direction.

In such cases, as described above, the left side frame 11 is supported by the truss support part formed of the nodes of the shaft member 152a, the fifth beam 125, and the third beam 123, the rear link 152 and the sub-link 154 which are inter-node connecting parts for them, and the inter-node connecting part (particularly, the reinforcing link 155) between the third beam 123 and the fifth beam 125. The rear link 152 and the sub-link 154 are disposed obliquely, or the sub-link cushion side member 1542 is disposed substantially in the forward and backward direction. Further, the reinforcing link 155 is disposed along the forward and backward direction. Therefore, this truss support part is particularly responsible for a function to enhance rigidity in the forward and backward direction. On the other hand, the right side frame 11 is supported by the quadric crank chain mechanism formed of the front link 151, the rear link 152, the upper frame 42 of the slider 40A, the right side frame 11 itself, and the driving link 153 as described above. Also in this case, these component members are responsible for the function of enhancing rigidity in the forward and backward direction of the right side frame 11. That is, despite that the side frames 11, 11 and so on are formed of the thin material, this embodiment is characterized in that rigidity and strength which allow to sufficiently endure a force in the forward and backward direction are provided by the truss support part and the quadric crank chain mechanism. Further, a force inputted in the perpendicular direction is, as will be described later, received by a cross section in a vertical direction of the upper frame 42 and the lower rail 41 of the seat slide device 40, and further an easy deformation portion is set in the lower rail 41, and the force is absorbed by this easy deformation portion.

Further, a force inputted to a seat back part 1B can be absorbed by a deformation in a higher part than reclining mechanism parts 23, 23 or by a forward and backward movement of a head rest 50, as will be described later.

Further, one ends (lower ends) of the left and right front links 151, 151 are pivotally supported on respective ends of a shaft member (a second shaft member) 151a bridged over close to front sides of the upper rails 42, 42 of sliders 40A, 40A of the seat slide device 40. Further, the cushion frame unit 10 is structured so that a force is transmitted to the upper rails 42, 42 of the seat slide device 40 via the front links 151, 151 and the rear links 152, 152, and the cushion frame unit 10 is formed to be substantially symmetrical bilaterally with reference to a width direction center, and moreover, the lower rails 41, 41 and the upper rails 42, 42 constituting the seat slide device 40 have a bilaterally symmetrical shape in a cross-sectional direction, as will be described later. Accordingly, a force applied to the cushion frame unit 10 is dispersed evenly to the left and right, and moreover, a force transmitted to the upper rails 42, 42 operates substantially evenly to the left and right of the upper rails 42, 42. In other words, it is a structure in which a bending moment applied to the upper rails 42, 42 becomes small, and a force is received with a shear force. Further, it is supported via the front and rear links 151, 152 and the other links (driving link 153, sub-link 154, reinforcing link 155), and they are coupled via plural shafts. Therefore, a force applied to the cushion frame unit 10 is received in a manner dispersed to the plural links, and energy is absorbed by a rolling frictional force among the plural shafts. From these facts, the cushion frame unit 10 is a structure retaining predetermined rigidity, and a force applied to the seat cushion part 1A can be received sufficiently even when component materials of respective plate-shaped frames and so on are thin.

Figure 21:
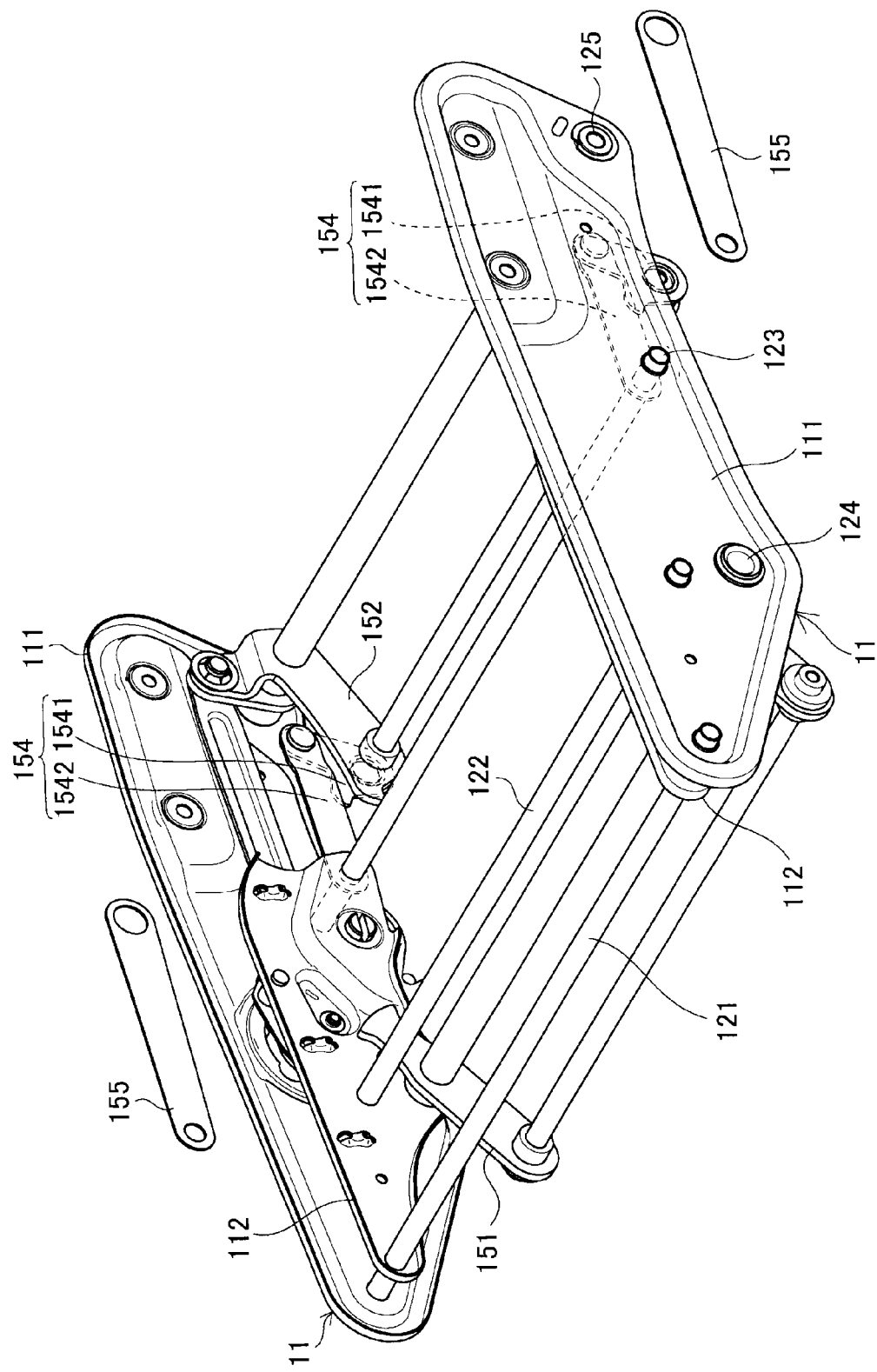
[FIG. 21]
Figure 22:
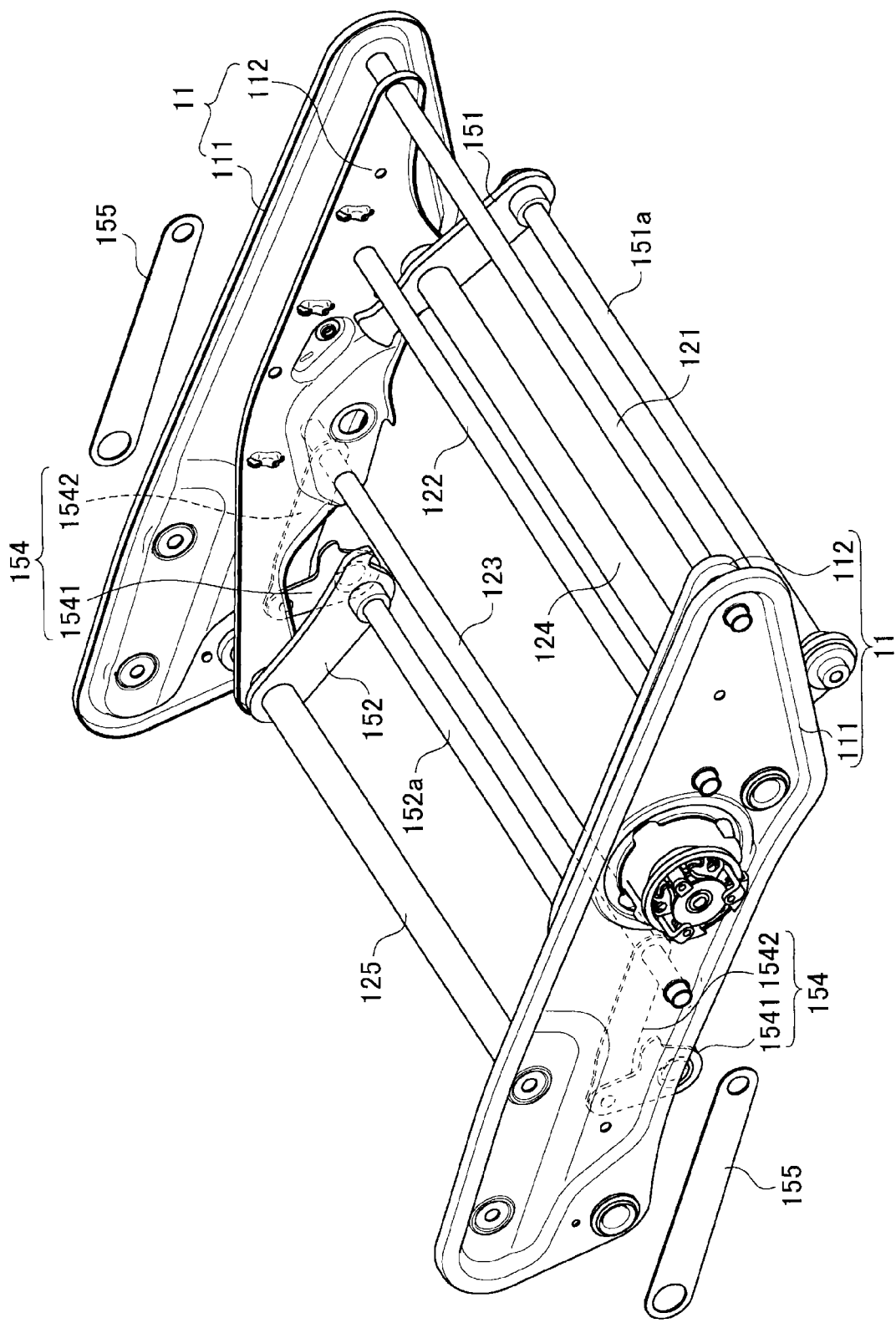
[FIG. 22]

Note that in FIG. 19 and FIG. 20, the sub-link 154 is just disposed on the side of the left side frame 11, but as illustrated in FIG. 21 and FIG. 22, it may be structured such that, on the side of the right side frame 11, one end is pivotally supported on the shaft member 152a and the other end is pivotally supported on the third beam 123, thereby providing the sub-link 154. Further, it may also be structured such that the reinforcing link 155 similarly to the above is layered on an outer surface of the outer plate-shaped frame 111 constituting the right side frame 11. Thus, the truss support part is formed not only on the left side but also on the right side, and a force in the forward and backward direction applied to the cushion frame unit 10 can be received more securely to further enhance the strength, despite that they are formed of the thin material.

Further, for example, it is possible to further enhance strength of necessary positions by heat treating appropriate portions of the outer plate-shaped frames 111, 111 and the inner plate-shaped frames 112, 112 constituting the side frames 11, 11, for example, heat treating a peripheral portion, heat treating in a truss shape along a surface, or the like. Further, flanges project inward on peripheral portions of the outer plate-shaped frames 111, 111 and the inner plate-shaped frames 112, 112, where strength of the thin material can further be enhanced by hemming peripheral edges of the flanges parts.

Figure 23:
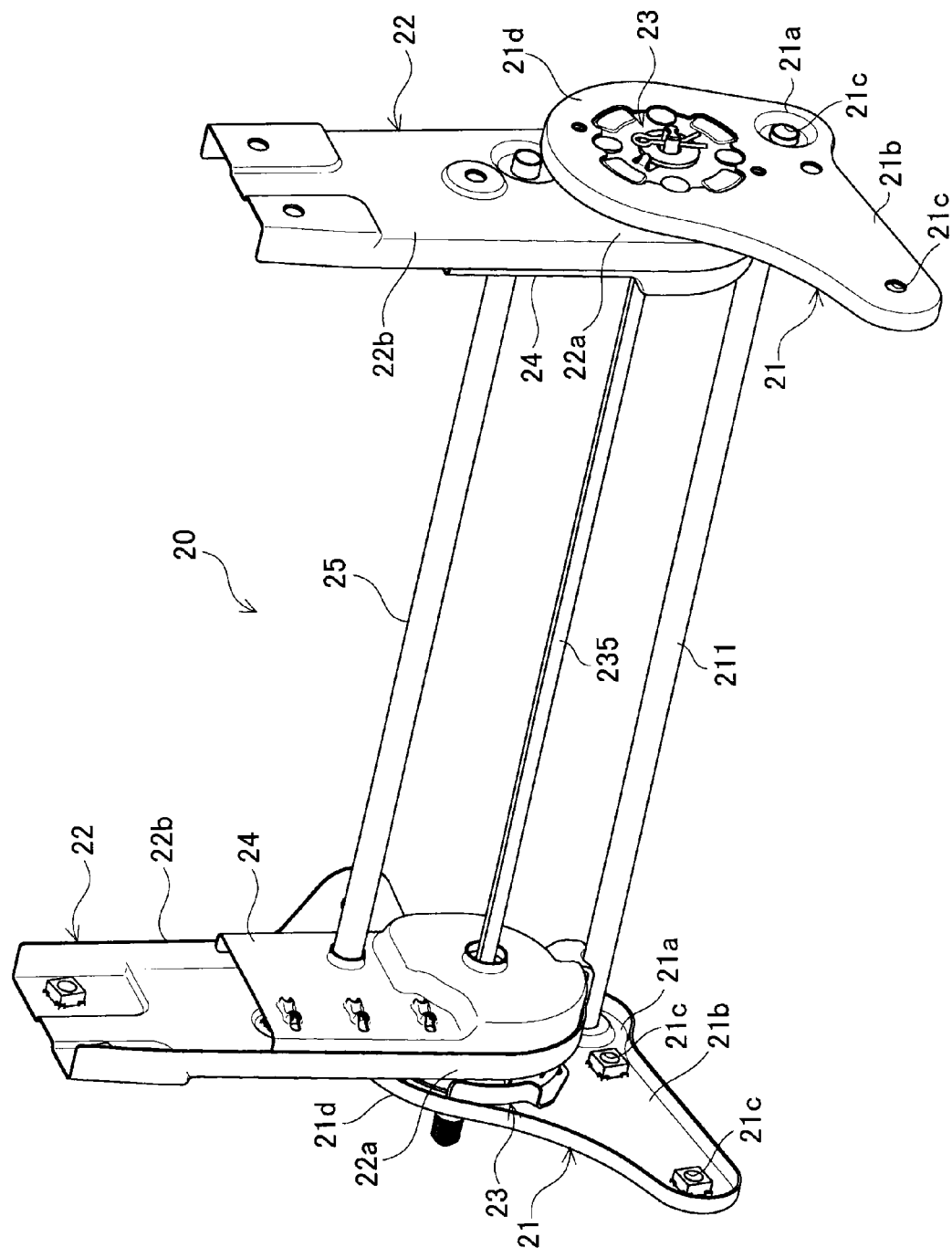
[FIG. 23]
Figure 24:
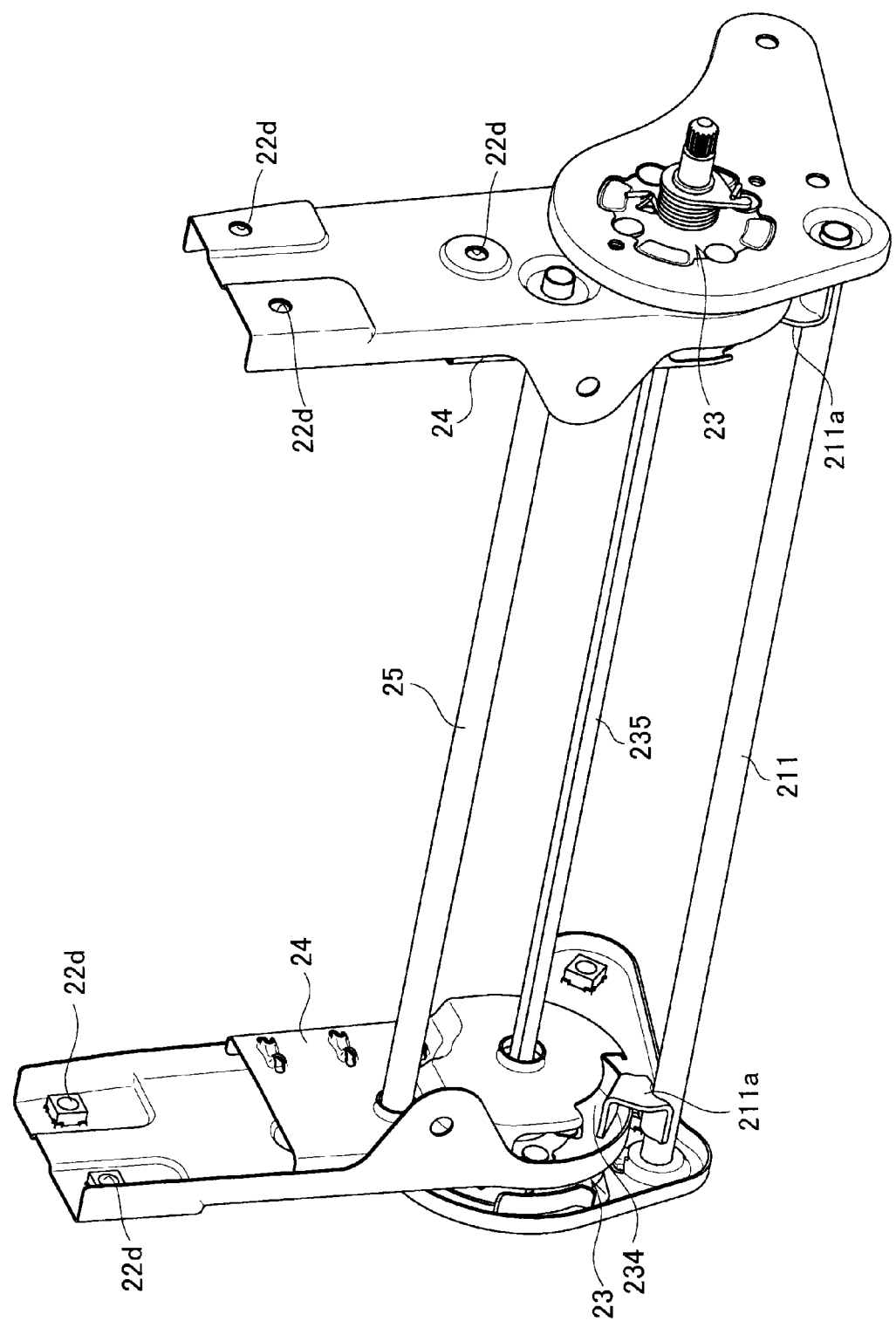
[FIG. 24]
Figure 25:
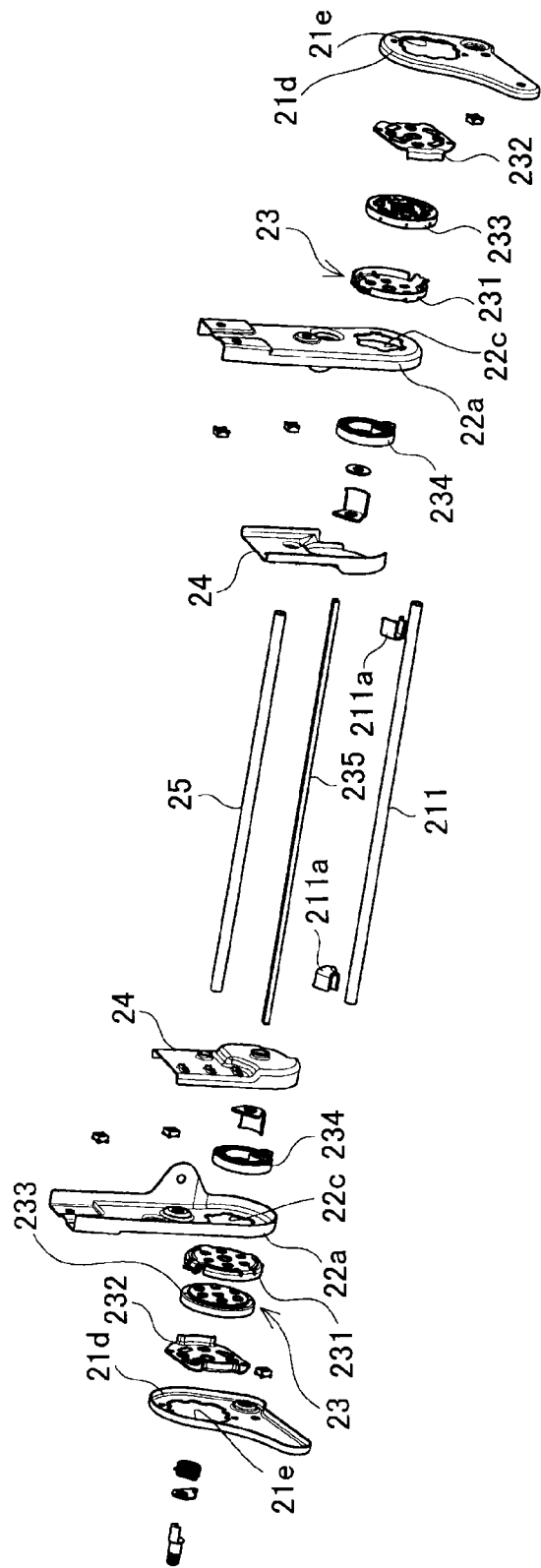
[FIG. 25]

The reclining unit 20 is constituted by having, as illustrated in FIG. 23 to FIG. 25, a pair of cushion brackets 21, 21 and a pair of back brackets 22, 22 which are disposed to the left and right to oppose each other. They are all constituted of a thin plate-shaped member similar to the outer plate-shaped frame 111 and the inner plate-shaped frame 112 of the cushion frame unit 10 described above. The cushion brackets 21, 21 are formed in a substantially L shape projecting forward and upward when seen from a side face, a sixth beam 211 is bridged over between corner portions 21a, 21a opposing each other, unitizing the left and right cushion brackets 21, 21. Front portions 21b, 21b in front of the corner portions 21a, 21a are overlapped with insides of the rear portions of the outer plate-shaped frames 111, 111 of the side frames 11, 11 in the cushion frame unit 10, bolt through holes 21c, 21c are formed at two positions at a certain interval in front and rear of the front portions 21b, 21b, and are fastened with bolts 212 with bolt through holes 111c, 111c formed correspondingly close to upper portions of rear portions of the outer plate-shaped frames 111, 111 (FIG. 11 to FIG. 13, FIG. 16).

Since the range in which the front portions 21b, 21b are overlapped with the outer plate-shaped frames 111, 111 has two overlapped plates, it has relatively high rigidity and functions as a transmission path of force. Further, it is said that joining with bolts generally increases material costs and leads to increase in weight due to an overlap of joined parts. However, in this embodiment, the thin material is used as described above, and cost increase or large weight increase would not occur by just overlaps of bolt joined parts. Conversely, it contributes to increase in rigidity of the thin material by providing the overlaps between necessary portions, and moreover, by a relative position adjustment between the bolts 212 and the bolt through holes 21c, 111c at a time of fastening, or the like, a dispersion in part dimensions to some degree can be absorbed, and there is an advantage of contribution to reduction in the entire manufacturing cost by making parts easy to produce. Further, at a time of absorbing impact, an energy absorbing operation also functions by the bolts 212 deforming the bolt through holes 21c, 111c.

The back brackets 22, 22 have a predetermined width and length, and lower portions 22a, 22a lower than a substantially center part in a length direction overlap with upper portions 21d, 21d projecting upward in the cushion brackets 21, 21, and upper portions 22b, 22b higher than the substantially center part in the length direction of the back brackets 22, 22 are disposed to overlap with respective side frames 31, 31 of the back frame unit 30, which will be described later.

Between the cushion brackets 21, 21 and the back brackets 22, 22, reclining mechanism parts 23, 23 are attached. The reclining mechanism parts 23, 23 have, as illustrated in FIG. 25, back side attaching members 231, 231 and cushion side attaching members 232, 232, and has reclining main parts 233, 233 disposed therebetween, incorporating a gear, a cam, and so on. The back side attaching members 231, 231 are attached via attaching holes 22c, 22c formed in the lower portions 22a, 22a of the back brackets 22, 22, and the cushion side attaching members 232, 232 are attached via attaching holes 21e, 21e formed in the upper portions 21d, 21d of the cushion brackets 21, 21. When it is attempted to rotate the back brackets 22, 22 relative to the cushion brackets 21, 21, an operating unit 236 (see FIG. 2 and FIG. 3) for reclining is operated to release an engaging state of the gear, cam, and so on incorporated in the reclining main parts 233, 233. Accordingly, it becomes possible to move the seat back part forward and backward, and those supported by the back side attaching members 231, 231 and those supported by the cushion side attaching members 232, 232 relatively move in a rotating direction. When the operating unit 236 returns to its original state, an engaging operation or the like of gears occurs at a desired position, fixing a tilting angle.

The back brackets 22, 22 have a flange formed by bending a peripheral portion inward, and returning springs 234, 234 of the reclining mechanism parts 23, 23 are disposed inside the flange. The returning springs 234, 234 are constituted of a spiral spring, outer peripheral side ends thereof are engaged with engaging brackets 211a, 211a attached to the above-described sixth beam 211, and inner peripheral side ends are engaged with the back side attaching members 231, 231 via the attaching holes 22c, 22c. Thus, the back brackets 22, 22 to which the back side attaching members 231, 231 are attached are constantly biased in a forward standing direction.

Normally, the returning springs 234, 234 are attached to outsides of the cushion brackets 21, 21, which influences an exterior design, but in this embodiment, the returning springs 234, 234 are disposed inside the back brackets 22, 22, and thus the influence by the returning springs 234, 234 on the exterior design no longer exists.

On inner surface sides of the back brackets 22, 22, in ranges close to lower portions from the vicinities of substantially center parts in a length direction (upward and downward direction) of the back brackets 22, 22, reinforcing brackets 24, 24 constituted of a thin plate-shaped member similar to above ones and having a flange which is a peripheral edge bent outward are disposed so that flange sides face respective inner surfaces of the back brackets 22, 22. Thus, the ranges close to the lower portions from the vicinities of the substantially center parts in the length direction of the back brackets 22, 22 consequently form a closed cross-sectional shape with the reinforcing brackets 24, 24. Therefore, rigidity of the ranges where this closed cross-sectional shape is formed becomes high. Note that the above returning springs 234, 234 are disposed in the space surrounded by the back brackets 22, 22 and the reinforcing brackets 24, 24 to become the closed cross-sectional shape, but when driving of reclining is electrically powered, this space can also be used for disposing a power unit and so on thereof.

The left and right reclining mechanism parts 23, 23 are coupled with each other by a coupling shaft 235. More specifically, from the inner surface sides of the left and right reinforcing brackets 24, 24, the coupling shaft 235 passes through a center space of the returning springs 234, 234, and further through the back brackets 22, 22, the back side attaching members 231, 231, the reclining main parts 233, 233, the cushion side attaching members 232, 232, and the cushion brackets 21, 21, and its respective ends project outward therefrom. Among them, the above-described operating unit 236 is coupled to one of the ends. Since the left and right reclining mechanism parts 23, 23 are coupled by the coupling shaft 235, a lock release operation and a returning movement are performed in synchronization.

Between portions slightly higher than the portions where the reclining mechanism parts 23, 23 are provided in the back brackets 22, 22 and the reinforcing brackets 24, 24, a seventh beam 25 is bridged over, enhancing the rigidity of the reclining unit 20 together with the above-described sixth beam 211, 211.

Figure 26:
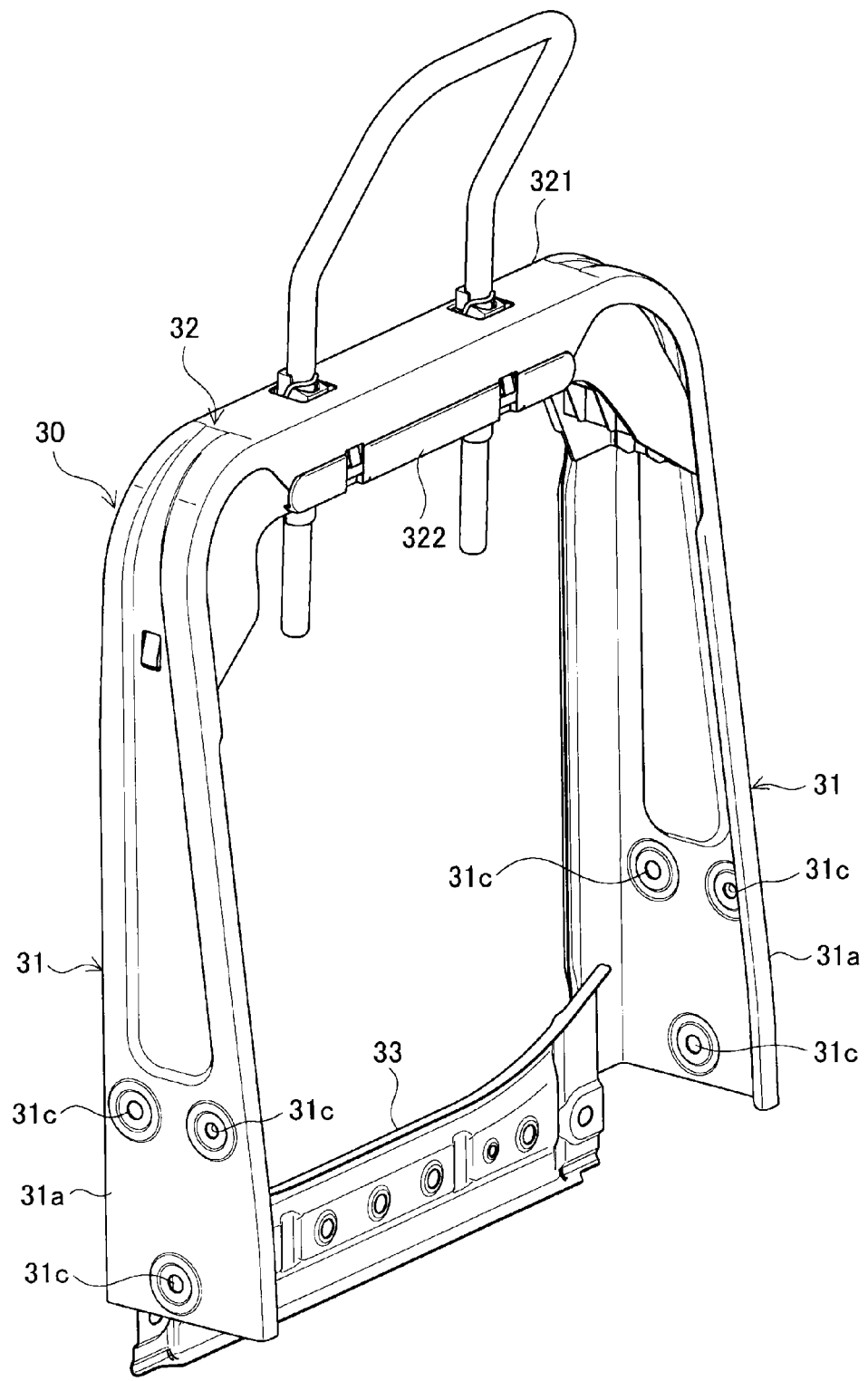
[FIG. 26]
Figure 27:
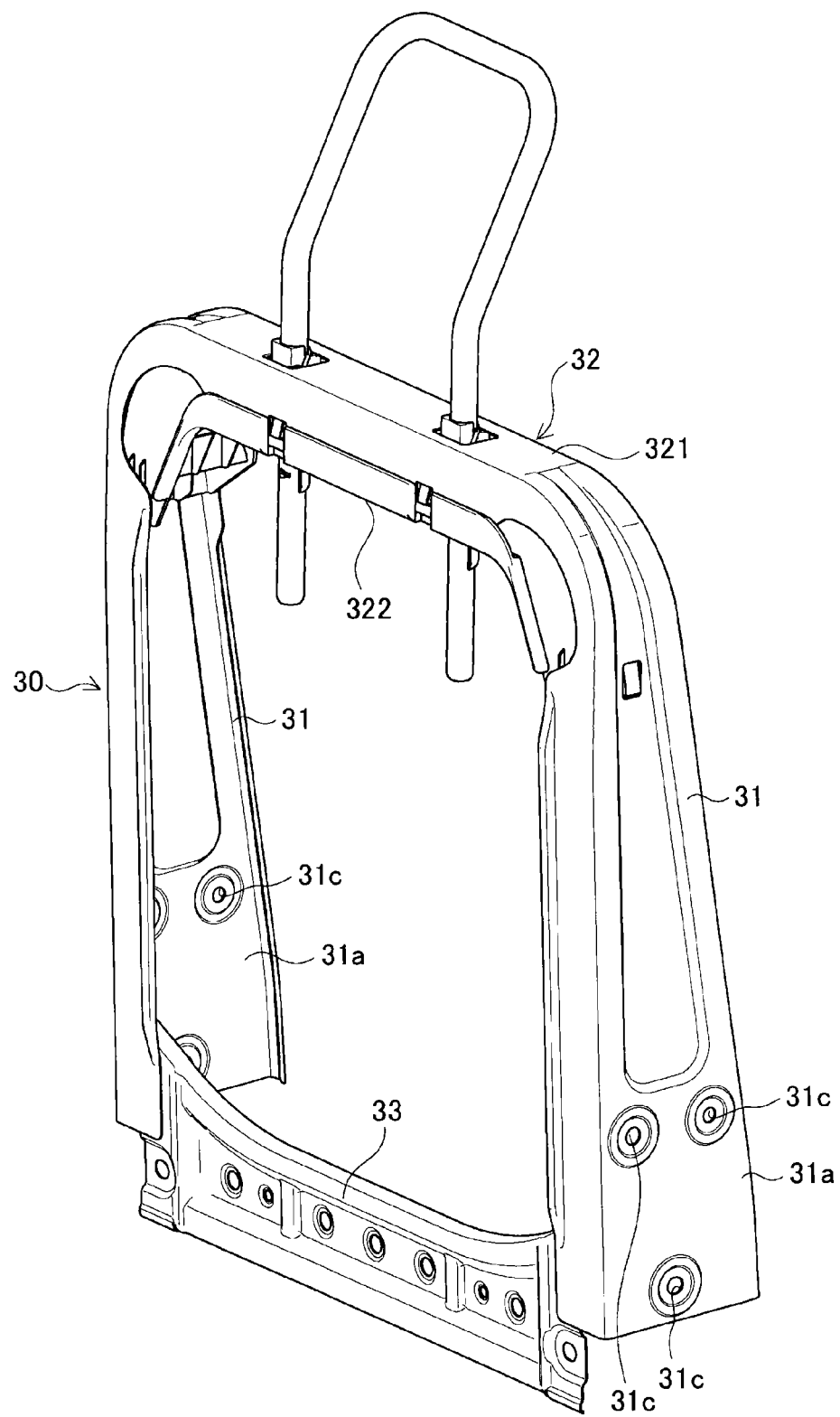
[FIG. 27]
Figure 28:
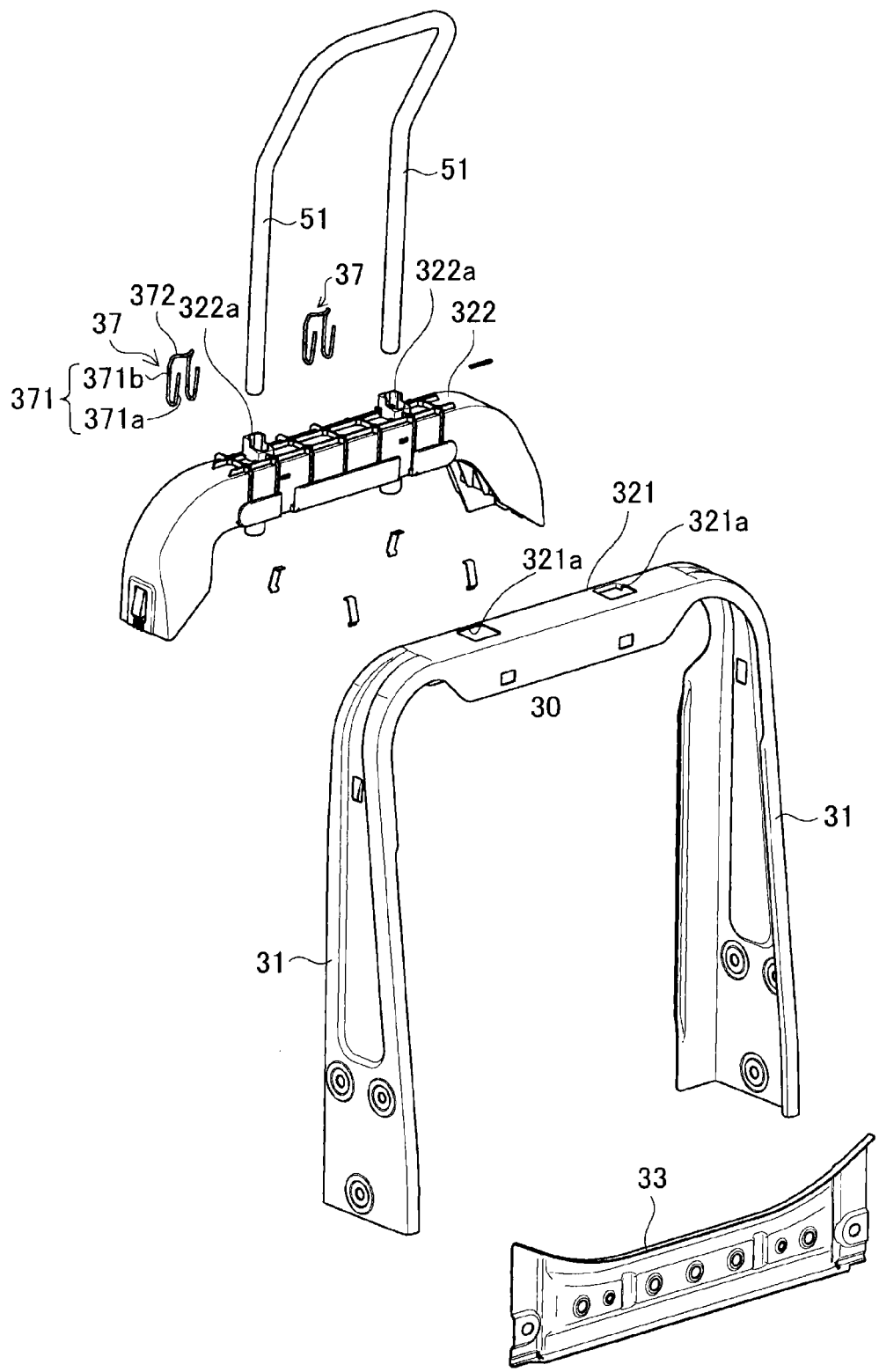
[FIG. 28]

The back frame unit 30 is formed by having, as illustrated in FIG. 26 to FIG. 28, a pair of side frames 31, 31 disposed at a predetermined interval, an upper frame structure part 32 located between upper portions of the side frames 31, 31, and a lower frame 33 disposed between lower portions of the side frames 31, 31.

In this embodiment, a coupling frame part 321 is formed integrally, which constitutes the side frames 31, 31 and the upper frame structure part 32. That is, a thin plate-shaped member having a predetermined length and width is bent in a substantially U shape, in which a portion corresponding to a pair of opposing sides among three sides is the pair of side frames 31, 31, and a portion corresponding to a coupling side between these side frames 31, 31 is the coupling frame part 321. As the thin plate-shaped member, it is possible to use a material similar to the outer plate-shaped frame 111 and the inner plate-shaped frame 112 of the cushion frame unit 10. Further, a peripheral portion along a length direction has a flange bent so as to project inward. The lower frame 33 is likewise constituted of a thin plate-shaped member, and is attached by welding between rear peripheral edges of lower portions of the side frames 31, 31.

Portions 31a, 31a closer to lower sides than the vicinity of substantially center parts in the length direction of the side frames 31, 31 are disposed by overlapping on an exterior surface of the upper portions 22b, 22b of the respective back brackets 22, 22 of the above-described reclining unit 20. Then, in this overlapped portion, bolt through holes 31 c are opened in a substantially V shape at three positions in total, two in an upper part and one in a lower part in this embodiment. Also in the upper portions 22*b*, 22*b* of the respective back brackets 22, 22, bolt through holes 22*d* are opened at corresponding positions, and bolts 222 (see FIG. 11 and FIG. 12) are inserted through and fastened in the respective bolt through holes 31*c*, 22*d*. By joining with the bolts 222, rigidity in these portions becomes high. Further, by making it a bolt joined structure, a dispersion in part dimensions can be absorbed, and when an impact force is applied, it exhibits an operation to absorb the impact force by deformation of the bolt through holes 31*c*, 22*d* through which the bolts 222 are inserted, which is similar to the case of the bolts 212 coupling the cushion frame unit 10 and the reclining unit 20.

In the back frame unit 30, by having such a structure, in the side frames 31, 31, a difference in rigidity occurs between the portions 31*a*, 31*a* close to the lower sides and joined to the back brackets 22, 22 of the reclining unit 20 with the bolts 222 and portions 31*b*, 31*b* closer to upper sides than them, and the portions 31*b*, 31*b* closer to the upper sides become an easy deformation portion which deforms relatively easily. Therefore, when an impact force is applied, the portions 31*b*, 31*b* closer to the upper sides absorbs it by deforming from the vicinity of a boundary with the portions 31*a*, 31*a* close to the lower sides, thereby contributing to reduction of damage to a human body. Further, more specifically, portions closer to the upper sides than the positions where the reclining mechanism parts 23, 23 of the reclining unit 20 are provided more easily deform than the positions where the reclining mechanism parts 23, 23 are disposed. Therefore, when an impact force is applied, a deformation occurs in the vicinity of upper portions of the positions where the reclining mechanism parts 23, 23 are provided, and moreover, the portions 31*b*, 31*b* closer to the upper side of the side frames 31, 31 deform, thereby absorbing the impact force.

Further, by the above-described structure, a force by a load of the back of a person applied to the back frame unit 30 located in the seat back part 1B is mainly transmitted to the back brackets 22, 22 and the cushion brackets 21, 21 of the reclining unit 20 from the side frames 31, 31. The cushion brackets 21, 21 are joined with bolts only to the outer plate-shaped frames 111, 111 in the side frames 11, 11 of the cushion frame unit 10. Therefore, from the cushion brackets 21, 21 a force by a load from the waist to the back is transmitted to the outer plate-shaped frames 111, 111, further the force thereof is transmitted to the upper rails 42, 42 via the fifth beam 125 coupled between the opposing rear portions of the outer plate-shaped frames 111, 111, and further via the rear links 152, 152 and the shaft member 152*a* of the lifter mechanism part 15, and is received by the seat slide device 40. Note that the force via the waist to the back is not applied to the clutch part 160 since its base is fixed to the inner plate-shaped frames 112, 112 and it merely penetrates the outer plate-shaped frames 111, 111.

On the other hand, a load from the buttocks to the thighs of the person applied to the cushion frame unit 20 located at the seat cushion part 1A is mainly added to the first to fourth beams 121 to 124 and the inner plate-shaped frames 112, 112, transmitted to the upper rails 42, 42 by the above-described truss support part and quadric crank chain mechanism via the front links 151, 151, the shaft member 151*a*, and/or the like, and is received by the seat slide device 40.

Thus, according to this embodiment, a force inputted to the back frame unit 30 through the waist to the back and the force inputted to the cushion frame unit 10 through the buttocks to the thighs are both transmitted finally to the seat slide device 40, but transmission paths thereof are distinguished. Further, the force inputted in the forward and backward direction is mainly handled by the side frames 11, 11 of the cushion frame unit 10 as well as the above-described truss support part and the quadric crank chain mechanism, and is dispersed in the forward and backward direction by them, and is further dispersed to the left and right by the respective beams 121 to 124, the outer plate-shaped frames 111, 111 and the inner plate-shaped frames 112, 112 which are disposed to the left and right in a good balance. Further, a force inputted in the upward and downward direction is mainly handled by respective cross-sections in a vertical direction of the upper rails 42 and the lower rails 41 of the seat slide device 40 while it is similarly dispersed in a good balance to the front, back, left and right. Thus, a support load handled by the clutch part 160 constituting the lifter mechanism part becomes relatively small and it may be provided only on one side as in this embodiment, and also this point largely contributes to weight reduction and cost reduction.

The same also applies to the reclining unit 20, and since it is a structure in which loads inputted in the forward and backward direction and the upward and downward direction are easily dispersed, the support load handled by the reclining unit 20 is smaller than in conventional ones, and respective members constituting the reclining unit 20 can be constituted of thinner ones, so as to allow weight reduction.

A resin member 322 for reinforcement is fitted inside the coupling frame part 321 constituting the upper frame structure part 32 of the back frame unit 30 and between the pair of flanges projecting inward separately in the width direction in boundary portions between the pair of side frames 31, 31 and the coupling frame part 321, which are adjacent to the coupling frame part 321, enhancing rigidity in the vicinity of the coupling frame part 321. Note that in this embodiment, the upper frame structure part 32 is formed by combining the coupling frame part 321 and the resin member 322 for reinforcement.

A pair of through holes 321*a*, 321*a* are formed in the coupling frame part 321 (see FIG. 30), and in the resin member 322 at positions corresponding to the through holes 321*a*, 321*a*, a pair of guide holes 322*a*, 322*a* are formed to penetrate in the upward and downward direction, through which a pair of head rest poles 51, 51 of the head rest 50 are inserted.

Figure 29:
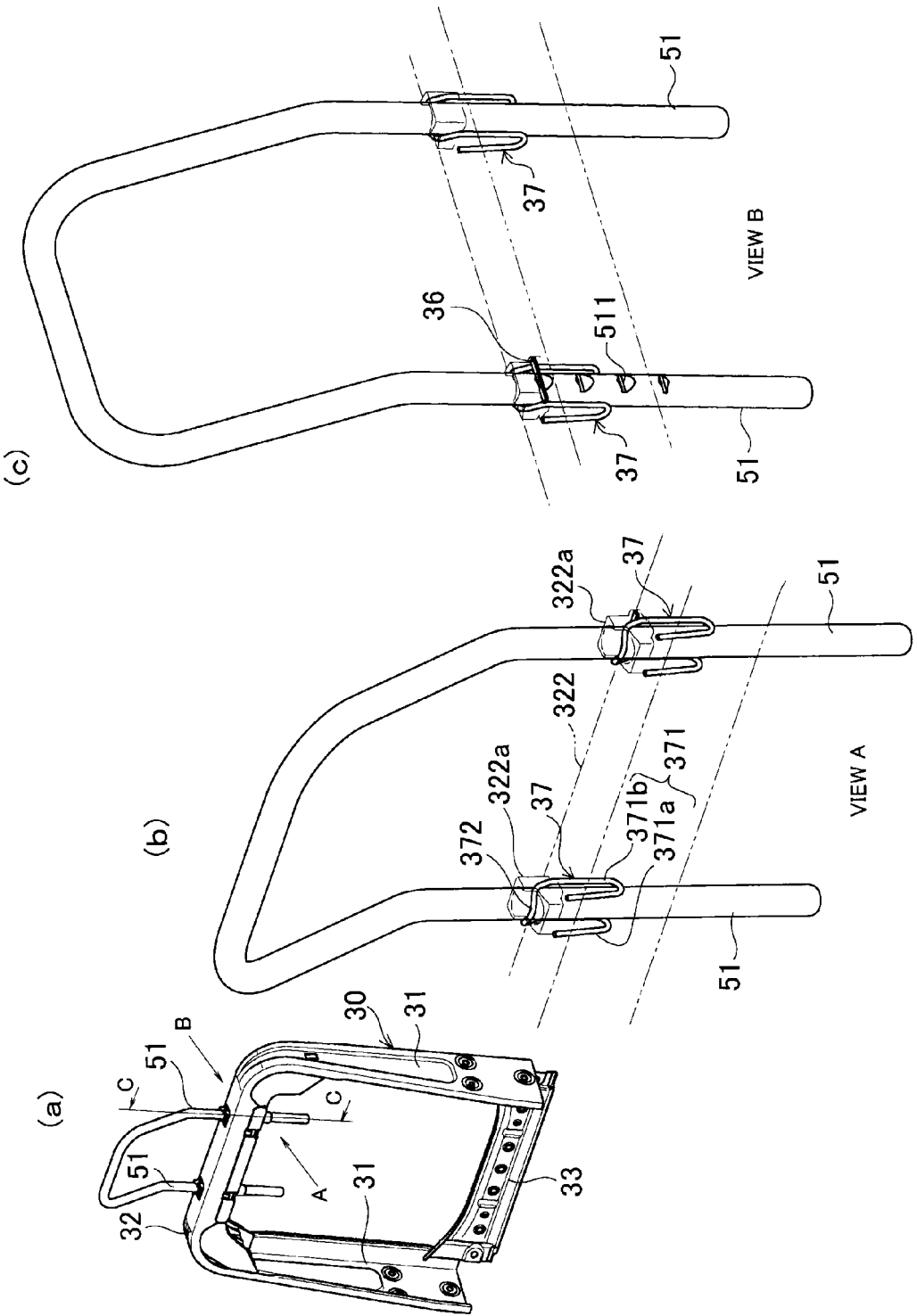
[FIG. 29] FIG. 29($a$) is a perspective view of the back frame unit of FIG. 26, FIG. 29($b$) is an arrow-A view of FIG. 29($a$), FIG. 29($c$) is an arrow-B view of FIG. 29($a$).
Figure 30:
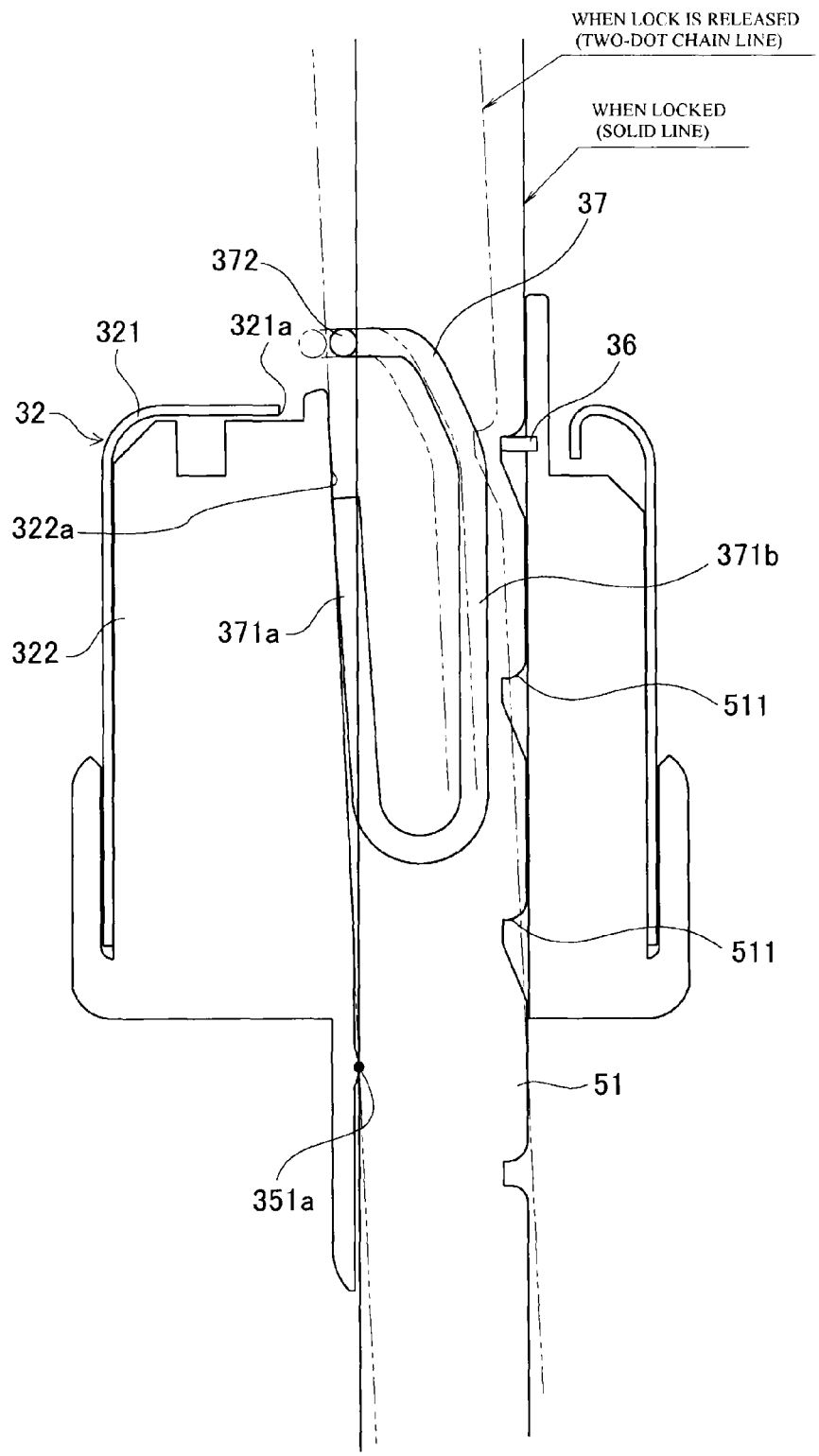
[FIG. 30]

In the guide holes 322*a*, 322*a*, an adjusting mechanism for performing height adjustment of the head rest poles 51, 51 is provided. The adjusting mechanism is constituted by having a lock plate 36 and an elastic member 37 as illustrated in FIG. 28 to FIG. 30. The lock plate 36 is provided to project forward on rear surfaces in the inner surfaces of the guide holes 322*a*, 322*a* and upper portion of the guide holes 322*a*, 322*a*. The elastic member 37 is formed by, as illustrated in FIG. 28 to FIG. 30, a wire member for spring to be a substantially U shape when seen from a front side, and a pair of opposing sides 371, 371 is formed in a substantially U shape which opens slightly wider toward an upper portion when seen from a side. That is, the opposing sides 371, 371 have a shape having front side parts 371*a*, 371*a* and rear side parts 371*b*, 371*b*, and upper ends of the rear side parts 371*b*, 371*b* are coupled by a coupling side 372. The coupling side 372 has a shape whose center expands forward.

The elastic member 37 is disposed so that the front side parts 371*a*, 371*a* can abut on a front surface in an inner surface of the guide holes 322*a*, 322*a* and that the coupling side 372 is exposed to the outside from upper portions of the guide holes 322*a*, 322*a*. Since the front side parts 371*a*, 371*a* and the rear side parts 371*b*, 371*b* are formed to open slightly wider toward the upper portion as described above, when they are disposed in the guide holes 322a, 322a, they consequently bias the coupling side 372 backward (solid line position of FIG. 30). Since the coupling side 372 has the shape whose center part expands forward, they penetrate the guide holes 322a, 322a so that the coupling side 372 abuts on the front side of the head rest poles 51, 51. Thus, consequently, the coupling side 372 is constantly biased backward, and the head rest poles 51, 51 are pressed by this and constantly biased backward. Note that the adjusting mechanism having the lock plate 36 and the elastic member 37 is preferably provided in both the head rest poles 51, 51 as in this embodiment. Energy absorbing performance at a time of impact increases as compared to when the lock exists only in one side.

Here, the guide holes 322a, 322a are formed to have an inside diameter slightly larger than diameters of the head rest poles 51, 51, and are formed so that the inside diameter becomes larger toward an upper portion. Further, projections 351a, 351a are provided in lower parts of front surface sides in internal surfaces of the guide holes 322a, 322a. On the other hand, plural engaging trenches 511, 511 are formed at predetermined intervals in a longitudinal direction in a rear surface side of the head rest poles 51, 51.

Therefore, the head rest poles 51, 51 are biased backward by the coupling side 372 of the elastic member 37, and thus when the engaging trenches 511, 511 are engaged with the lock plate 36, this state is retained (solid line position of FIG. 30). When height adjustment is performed, a force to slightly tilt the head rest poles 51, 51 forward is applied. Then, since the guide holes 322a, 322a have an inside diameter larger than the diameters of the head rest poles 51, 51 as described above and also larger toward the upper portion, the head rest poles 51, 51 tilt forward with the projections 351a, 351a being a fulcrum, taking a posture of two-dot chain lines of FIG. 30, releasing the engaging state of the engaging trenches 511, 511 and the lock plates 36, 36. In this state, the head rest poles 51, 51 are moved up and down to adjust the position of the engaging trenches 511, 511 engaged with the lock plates 36, 36 and remove the force to tilt forward, they are biased backward again by the coupling side 372 of the elastic member 37, the engaging trenches 511, 511 and the lock plates 36, 36 engage, taking a posture of solid lines of FIG. 30 to be locked. Thus, according to this embodiment, the height adjustment can be performed by just performing an operation to tilt the head rest poles 51, 51 slightly forward and moving them up and down as they are. Conventionally, an operating unit to release the lock of the head rest poles is normally provided, but this head rest height adjusting mechanism does not need such a member, has a simple structure, and is suitable particularly for the vehicle seat of this embodiment aiming at cost reduction and weight reduction. Further, since the height adjustment can thus be performed quite easily, it is also possible to perform the height adjustment by one hand by providing a handle having an opening at an appropriate portion such as an upper portion or side portion of the head rest 50, a handle with fabric end parts attached by sewing, or the like.

The seat slide device 40 is structured to have, as illustrated in FIG. 31 to FIG. 38, a pair of lower rails 41, 41 attached at a predetermined interval in a width direction from each other on the floor of a vehicle, and a pair of sliders 40A, 40A having a pair of upper rails 42, 42 provided slidably on the respective lower rails 41, 41.

The lower rails 41, 41 are formed to be substantially symmetrical bilaterally with a substantially C-shaped cross section, having a bottom wall part 411, a pair of side wall parts 412, 412 standing up from both sides of the bottom wall part 411 and opposing each other, and a pair of upper wall parts 413, 413 both bent inward from upper edges of the respective side wall parts 412, 412 with opposing edges separated from each other by a predetermined gap.

Figure 37:
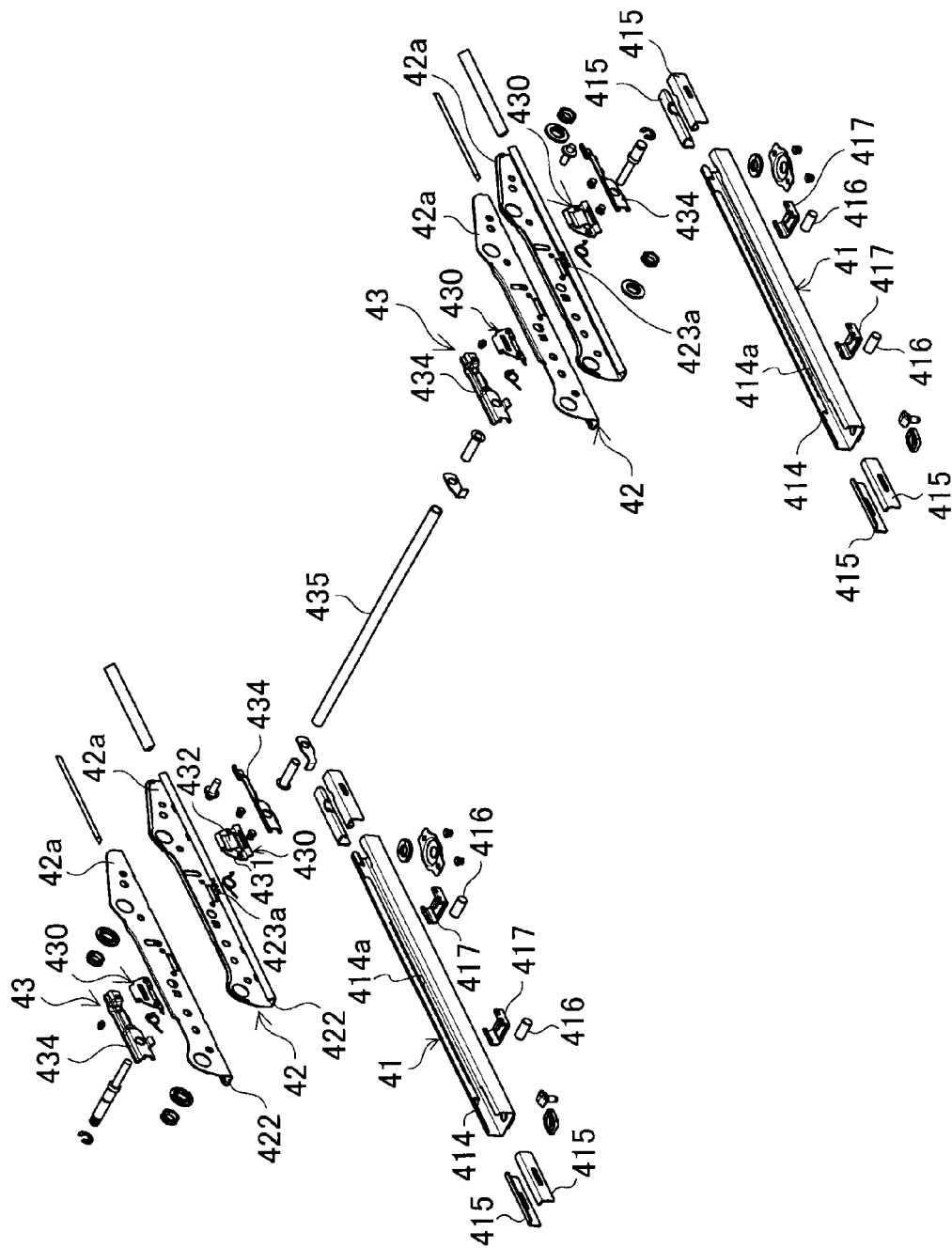
[FIG. 37]

The upper rails 42, 42 are such that members 42a, 42a, whose cross-sectional shape in a direction orthogonal to the longitudinal direction is a substantially L shape, are put together back-to-back and integrated, and their cross-sectional shape in the integrated state is substantially reverse T shape and hence is substantially symmetrical bilaterally about a center (see FIG. 37). Attaching holes 421a, 421b are formed by penetrating close to the front sides and the rear sides, respectively, of the upper rails 42, 42, and between the attaching holes 421a, 421a close to the front sides, the respective ends of the shaft member 151a supporting one ends (lower ends) of the above-described left and right links 151, 151 are attached and supported (see FIG. 7, FIG. 8, and the like). Between the attaching holes 421b, 421b close to the rear sides, the respective ends of the shaft member 152a supporting one ends (lower ends) of the above-described left and right links 152, 152 are attached and supported (see FIG. 5, FIG. 7, and the like).

The lower rails 41, 41 and the upper rails 42, 42 are formed to be substantially symmetrical bilaterally across a center line in the longitudinal direction of the respective members (line passing through a center in a cross-sectional shape orthogonal to the longitudinal direction). Thus, a force transmitted via the front links 151, 151 and the shaft member 151a and a force transmitted via the rear links 152, 152 and the shaft member 152a both operate substantially evenly left and right to the respective members. That is, although these forces are mainly in the upward and downward direction, it is a structure which does not receive this force in the upward and downward direction in a biased manner but is able to receive it substantially evenly on the left and right. As a result, as a material constituting the lower rails 41, 41 and the upper rails 42, 42, one thinner than conventional ones, for example, one with a plate thickness of 1.8 mm or less, preferably one with a plate thickness in the range of 0.6 to 1.6 mm, more preferably one with a plate thickness in the range of 0.6 to 1.2 mm, furthermore preferably one with a plate thickness in the range of 0.6 to 1.0 mm is used. Note that as the material constituting them, preferably, one with tensile strength in the range of 400 to 590 MPa is preferred. This is because a small energy amount is needed for processing, and shaping can be done with a relatively small press machine, which can contribute to demands of energy saving and help to reduce manufacturing costs. There is also an advantage that, since it is a general material which can be easily obtained, material procurement is possible in many countries of the world, contributing to increasing countries of production and production bases, consequently helping to reduce overall costs of the seat slide device of the present invention and vehicle seats using this. Further, the lower rails 41, 41 are formed substantially symmetrically in front and rear in the longitudinal direction with a center part in the longitudinal direction being a boundary. The upper rails 42, 42 both have a shape such that the attaching holes 421a, 421a close to the front sides and the attaching holes 421b, 421b close to the rear sides both expand upward, and are formed so that the front and rear in the longitudinal direction are substantially symmetrical as much as possible. Thus, a load related to the longitudinal direction can easily be dispersed in the entire longitudinal direction, which is suitable for applying the thin material.

When the lower rails 41, 41 and the upper rails 42, 42 are constituted of the thin material, a contrivance is needed such that a deformation due to an impact force in the upward and downward direction becomes closer to a deformation which is substantially even left and right, and that the upper rails 42, 42 do not disengage from the lower rails 41, 41 by an impact force in a predetermined range.

Figure 31:
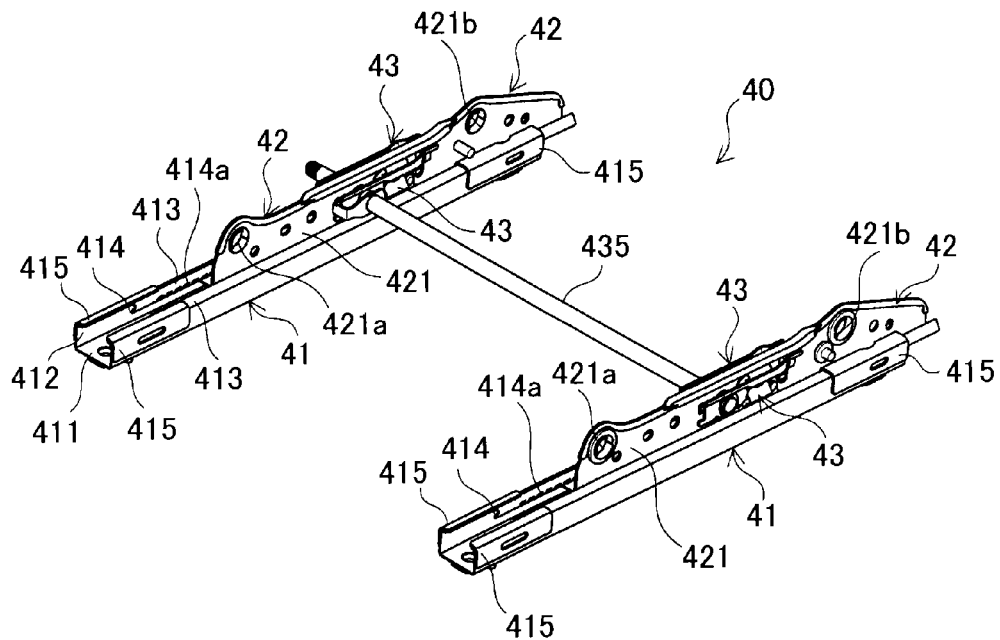
[FIG. 31]
Figure 32:
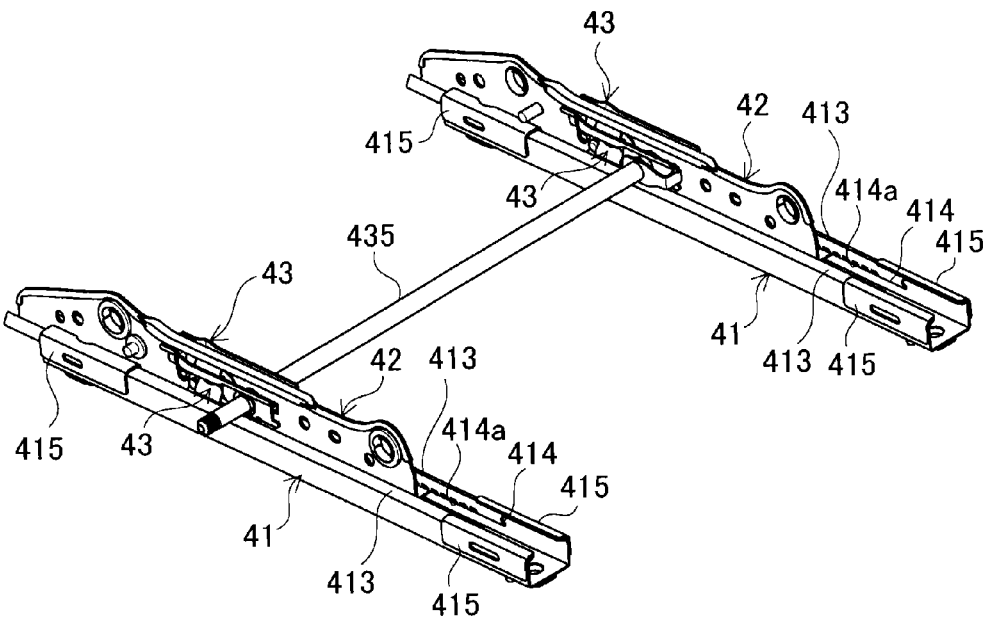
[FIG. 32]
Figure 33:
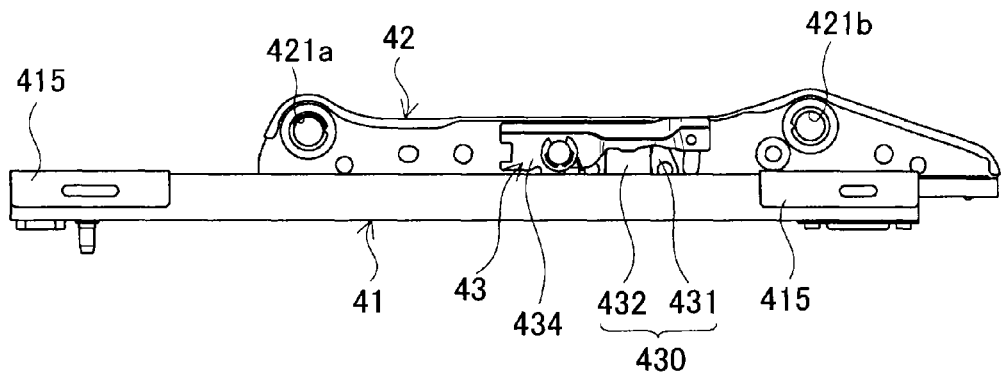
[FIG. 33]
Figure 34:
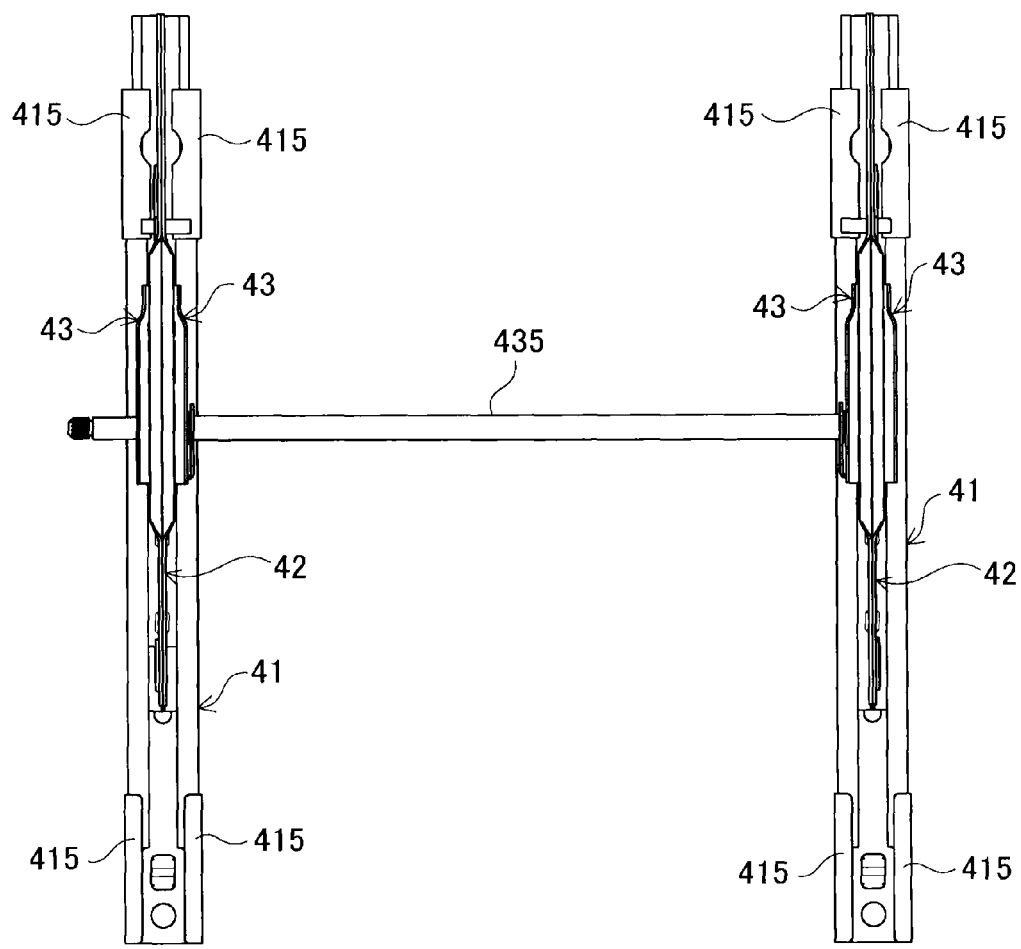
[FIG. 34]
Figure 35:
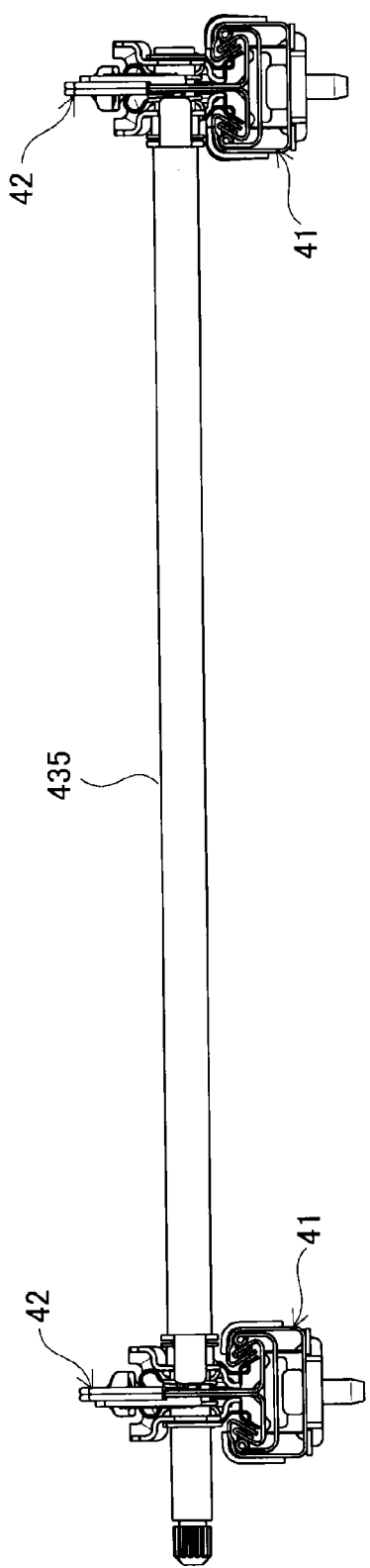
[FIG. 35]
Figure 36:
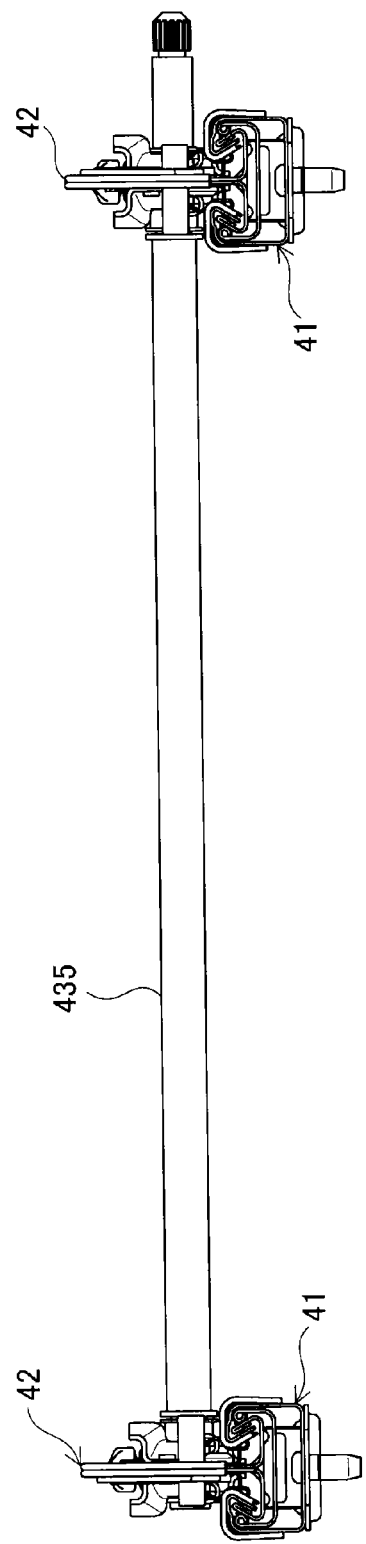
[FIG. 36]

Accordingly, in this embodiment, a lock mechanism 43 which fixes a relative position of the upper rails 42, 42 to the lower rails 41, 41 is provided on both sides of vertical wall parts 421, 421 of the upper rails 42, 42, as illustrated in FIG. 31 and FIG. 32. Thus, lock claws 433 of the lock mechanisms 43, 43 at symmetrical positions across the vertical wall parts 421, 421 of the respective upper rails 42, 42 consequently engage with engaged parts of the upper wall parts 413, 413 of the lower rails 41, 41. In other words, the posture and the operating direction of an engaging force in a state that the lock claws 433 are engaged at a time of locking are also substantially symmetrical bilaterally, and thus a biased load does not easily occur at a time of locking.

Figure 38:
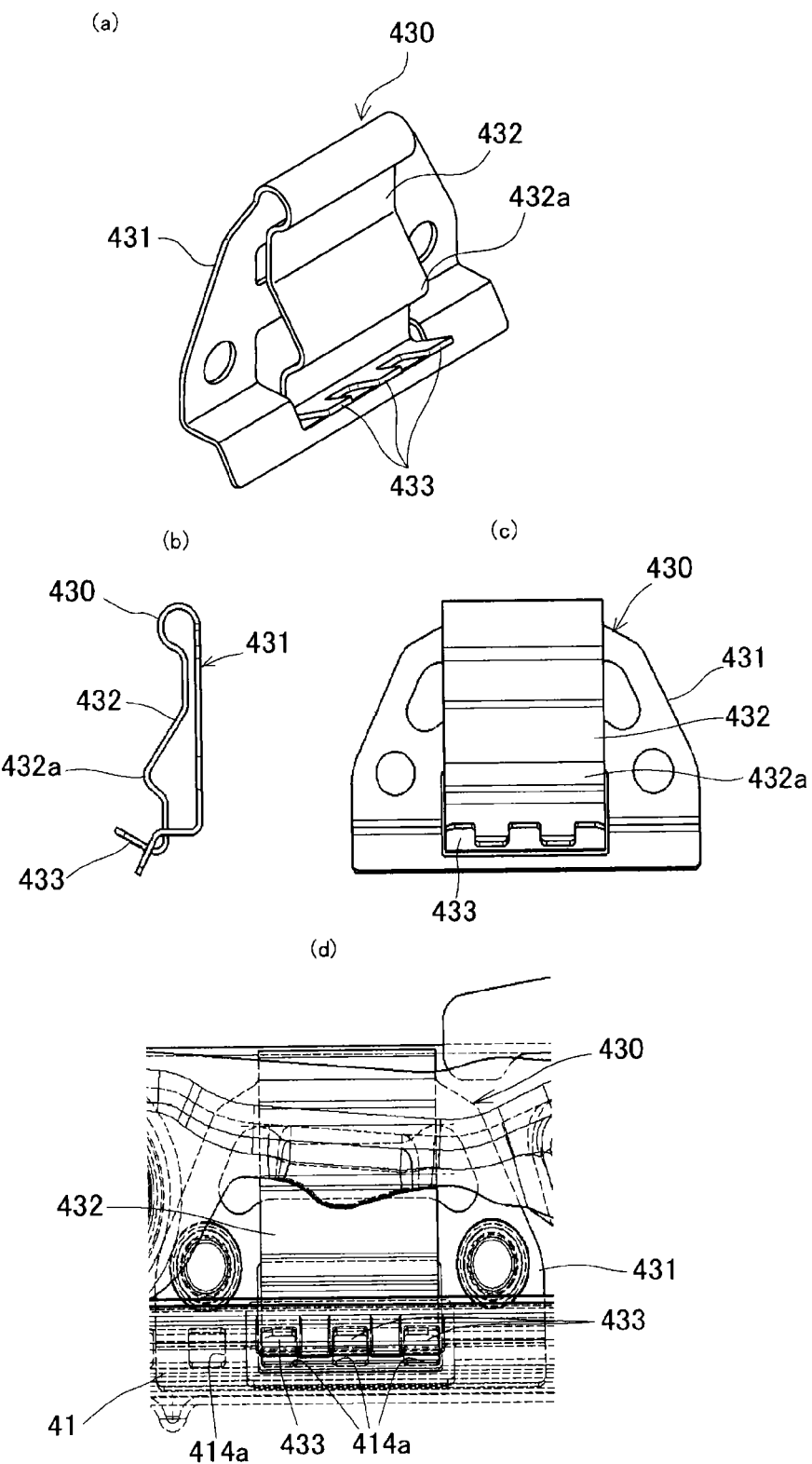
[FIG. 38] FIG. 38 are views illustrating structures of an attaching plate part of an elastic lock member, an operating plate part, and lock claws constituting the lock mechanism, FIG. 38($a$) is a perspective view, FIG. 38($b$) is a side view, FIG. 38($c$) is a front view, and FIG. 38($d$) is a view illustrating an engaging state of the lock claws and engaged parts formed in a lower rail.

Specifically, as illustrated in FIG. 37 and FIG. 38, the lock mechanism 43 is structured to have an elastic lock member 430 and a lock release member 434. The elastic lock member 430 is formed of an elastic member, typically a spring steel (leaf spring), and is structured to have an attaching plate part 431 fixed to the upper rails 42, 42, and an operating plate part 432 which is supported by the attaching plate part 431, has an elastic force to be constantly biased in a direction to depart from the vertical wall parts 421, 421 of the upper rails 42, 42, and has plural lock claws 433 projecting in a direction to depart from the vertical wall parts 421, 421 and engaging with engaged parts formed along the longitudinal direction in opposing portions in the respective lower rails 41, 41. The lock release member 434 displaces this operating plate part 432 in a direction of the vertical wall parts 421, 421 of the upper rails 42, 42 against the elastic force of the operating plate part 432, so as to release the engaging state of the lock claws 433 and the engaged parts of the lower rails 41, 41. Here, the elastic lock member is preferred to be formed using a thin member with a thickness in the range of 0.6 to 1.2 mm. More preferably, it is with a thickness in the range of 0.6 to 1.2 mm, furthermore preferably a thickness in the range of 0.6 to 1.0 mm.

The attaching plate part 431 of the elastic lock member 430 has a shape along the vertical wall parts 421, 421 of the upper rails 42, 42, and is fixed by rivets or the like. The operating plate part 432 is integrated with the attaching plate part 431, and is bent on an opposite direction side of the vertical wall parts 421, 421 of the respective upper rails 42, 42 and downward from an upper edge of the attaching plate part 431, as illustrated in FIG. 38. Further, it has an expanding part 432*a* expanding in the direction to depart from the vertical wall parts 421, 421 of the respective upper rails 42, 42 in a middle portion. The lock claws 433 are formed in a comb shape by bending to project in a direction to depart from the vertical wall parts 421, 421 in the vicinity of a lower edge of the operating plate part 432 which is lower than the expanding part 432*a*. Note that preferably the attaching plate part 431 constituting the elastic lock member 430 is provided in a substantially center part in the longitudinal direction of the upper rails 42, 42. As will be described later, the elasticity of the elastic lock member 430 operates on the upper rails 42, 42 and the lower rails 41, 41 to make the lower rails 41, 41 and the upper rails 42, 42 be substantially deformable so as to give an absorbing function or the like of energy due to vibration or impact force, and the above position is for allowing this function to be effectively exhibited.

The lock release member 434 is provided so that another side pivots upward or downward about one side, and when it attempts to pivot along an outer surface of the operating plate part 432 and contacts the expanding part 432*a*, this expanding part 432*a* is consequently displaced in the direction of the vertical wall parts 421, 421. Thus, the lock claws 433 displace in the direction of the vertical wall parts 421, 421, and thus the engaging state is released. Respective one ends of the lock release members 434, that is, the four lock release members 434 in total are coupled by a coupling shaft 435 bridged across the left and right upper rails 42, 42. Therefore, by operating the operating part 435*a* coupled to either end of the coupling shaft 435 (see FIG. 2 and FIG. 3), the four lock release members operate in synchronization to release the lock.

Here, the respective upper wall parts 413, 413 of the lower rails 41, 41 have a shape such that downward oblique wall parts 414, 414 bent obliquely downward and toward the direction of the side wall parts 412, 412 extend from respective opposing edges, and the above-described engaged parts 414*a*, 414*a* of the respective lower rails 41, 41 are constituted of plural holes or trenches formed corresponding to intervals of adjacent claws of the comb-shaped lock claws 433 along the longitudinal direction in the downward oblique wall parts 414, 414 (see FIG. 31, FIG. 32, FIG. 38, FIG. 39).

The engaged parts 414*a*, 414*a* constituted of holes or trenches are formed with a length of several mm to several tens of mm along the longitudinal direction, and formed so that an interval of adjacent ones in the longitudinal direction is few mm to few tens of mm. Therefore, the comb-shaped lock claws 433 are formed with a length and at an interval corresponding to them (see FIG. 38(*d*)).

Here, a state that the lock claws 433 do not fully enter the corresponding engaged parts 414*a* and are stuck incompletely is called a pseudo-lock (or half lock) state, and in this embodiment, the thickness of the lock claws 433 are quite thin as described above. Thus, when the lock claws 433 attempt to stay in a region between the adjacent engaged parts 414*a*, 414*a*, staying in the region between the engaged parts 414*a*, 414*a* is rather a quite unstable state since the contact area of a front end surface of the lock claws 433 is quite small and hence has small frictional resistance, and they also easily bend by elasticity of the lock claws 433 and thus are easily led in a direction to enter the engaged parts 433*a* by a small body movement of the seated person, slight vibration from the floor, or the like. Further, there also operate the elasticity of the lower rails 41, 41 and the upper rails 42, 42 constituted of the above-described thin material as well as various characteristics including a rolling characteristic of rollers 416, 416*b* for sliding provided in the vicinity of the respective ends of the lower rails 41, 41, which will be described later, and thus by their synergistic operation, the seat slide device 1 of this embodiment has a characteristic that the pseudo-lock state does not easily occur. Note that this characteristic will be further described later.

Figure 39:
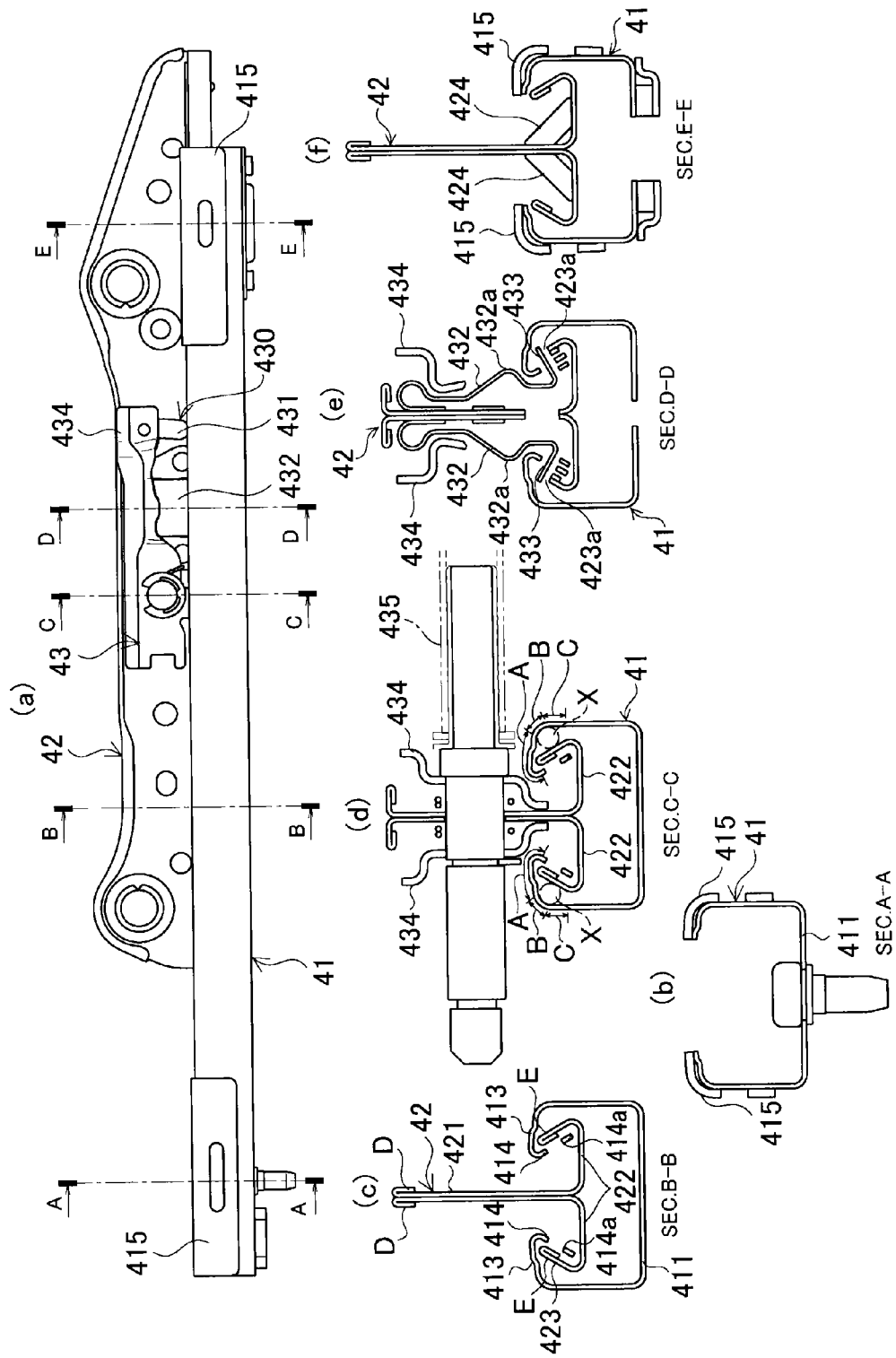
[FIG. 39] FIG. 39($a$) is a side view of the seat slide device of a vehicle seat according to the embodiment, FIG. 39($b$) is an A-A cross-sectional view of (a), FIG. 39($c$) is a B-B cross-sectional view of (a), FIG. 39($d$) is a C-C cross-sectional view of (a), FIG. 39($e$) is a D-D cross-sectional view of (a), and FIG. 39($f$) is an E-E cross-sectional view of (a).
Figure 40:
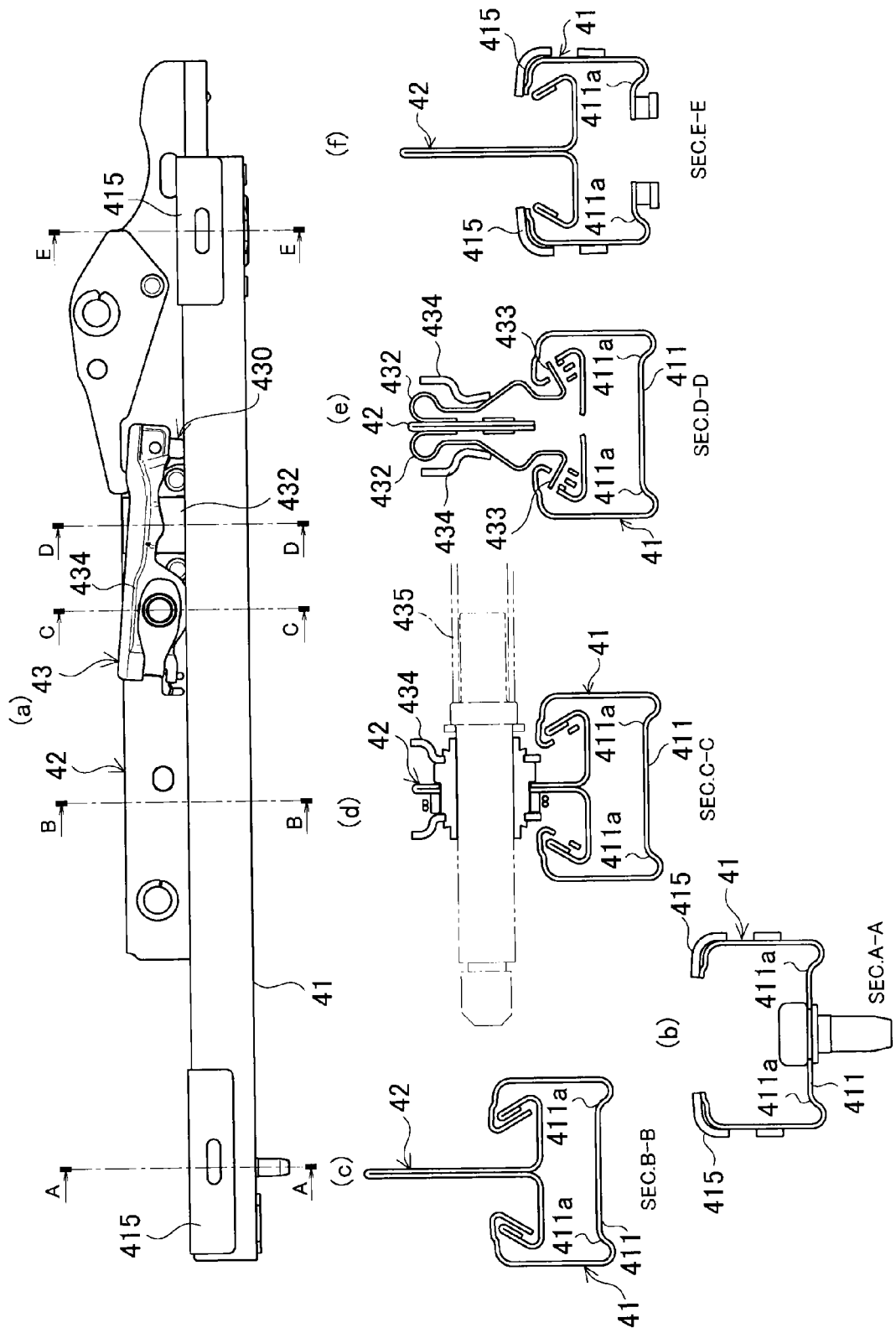
[FIG. 40] FIG. 40($a$) is a side view illustrating an example of a mode in which a shape of a bottom wall part of a lower rail of the seat slide device is changed, FIG. 40($b$) is an A-A cross-sectional view of (a), FIG. 40($c$) is a B-B cross-sectional view of (a), FIG. 40($d$) is a C-C cross-sectional view of (a), FIG. 40($e$) is a D-D cross-sectional view of (a), and FIG. 40($f$) is an E-E cross-sectional view of (a).

Further, as illustrated in FIG. 39(*c*), the respective upper rails 42, 42 have upward oblique wall parts 423, 423 standing up obliquely from respective outer edge parts of horizontal wall parts 422, 422 having a substantially T shape toward the vertical wall part 421, and these upward oblique wall parts 423, 423 are provided to be located outside the downward oblique wall parts 414, 414 of the respective lower rails 41, 41. Further, in the respective upward oblique wall parts 423, 423 of the upper rails 42, 42 corresponding to formation positions of the lock claws 433, auxiliary engaged parts 423*a*, 423*a* constituted of holes or trenches are formed (see FIG. 37 and FIG. 39(*e*)). The auxiliary engaged parts 423*a*, 423*a* retain the lock claws 433 stably in an engaged state by that the lock claws 433 penetrate the engaged parts 414*a*, 414*a* of the respective lower rails 41, 41 and then engage therewith at a time of locking. Therefore, also by this structure, a function to maintain a bilaterally substantially symmetrical stable mode at a time of locking is exhibited.

When the lower rails 41, 41 and the upper rails 42, 42 are formed of thin one, as a contrivance to prevent disengagement of the upper rails 42, 42 from the lower rails 41, 41 by an impact force in a predetermined range, in this embodiment, a predetermined portion is made as a high-rigidity part having higher rigidity than other portions.

Specifically, a range of a predetermined width (range indicated by symbol A in FIG. 39(*d*) (open cross section part)) of at least respective opposing edges of the upper wall parts 413, 413 of the lower rails 41, 41 is made as the high-rigidity part. Thus, when a predetermined force or more operates in a direction to disengage the upper rails 42, 42 from the respective lower rails 41, 41, opening of the gap between the opposing edges can be suppressed. As a result of forming high-rigidity parts in the upper wall parts 413, 413, the range from the vicinities of respective boundaries between the bottom wall part 411 and the side wall parts 412, 412 to parts excluding upper parts in the side wall parts 412, 412 in the lower rails 41, 41 is a portion of relatively lower rigidity than the high-rigidity parts of the upper wall parts 413, 413. Therefore, when a predetermined force or more is applied in a direction to disengage the upper rails 42, 42 from the respective lower rails 41, 41, a pressure is dispersed in the portions of high rigidity, the portions of relatively low rigidity become an easy deformation portion, the upper rails 42, 42 do not disengage from the lower rails 41, 41, and the easy deformation portions deform to elongate in the upward and downward direction. Thus, it is possible to exhibit an absorbing characteristic of high impact force. As means for forming the above-described high-rigidity parts, preferably, a heat treatment is employed. The rigidity can be increased without increasing the weight of the seat slide device 40.

Further, the high-rigidity part is, in addition to the range of a predetermined width of the respective opposing edges in the upper wall parts 413, 413 (range indicated by symbol A in FIG. 39(*d*)), preferably structured to be formed in a range which goes beyond the range of this predetermined width in the cross-sectional direction to reach upper parts of the side wall parts 412, 412 (ranges indicated by symbols B, C in FIG. 39(*d*)). However, in this case, in the vicinities of respective boundary portions between the upper wall parts 413, 413 and the side wall parts 412, 412 (ranges indicated by symbol B in FIG. 39(*d*)), balls X are disposed in spaces with the upper rails 42, 42 on inner surface sides thereof, and these balls X slide relatively on inner surfaces of the boundary portions. In order for the balls X to slide smoothly, the vicinities of the boundary portions desirably have flexibility of some degree. Therefore, preferably, the vicinities of the respective boundary portions between the upper wall parts 413, 413 and the side wall parts 412, 412 (the ranges indicated by symbol B in FIG. 39(*d*)) is not heat treated, or only outer surface sides in a thickness direction of the vicinities of the boundary portions are heat treated so that heat will not be transmitted to inner surface sides.

Further, in order to enhance rigidity, it is preferred to perform hemming of appropriate edges such as upper edges (parts indicated by symbol D in FIG. 39(*c*)) of the vertical wall parts 421, 421 of the upper rails 42, 42, outer edges (parts indicated by symbol E in FIG. 39(*c*)) of the upward oblique wall parts 423, 423, and/or the like.

Further, preferably, it is structured to be provided with retaining members 424, 424 having inclining surfaces between the vertical wall parts 421, 421 of the upper rails 42, 42 and portions located on both sides of the vertical wall parts 421, 421 in the horizontal wall parts 422, 422 (see FIG. 39(*e*)). Thus, when a force in a direction to disengage the upper rails 42, 42 from the respective lower rails 41, 41 operates, the inclining surfaces of the retaining members 424, 424 abut on the downward oblique wall parts 414, 414 of the respective lower rails 41, 41, and thus a deformation of the horizontal wall parts 422, 422 of the upper rails 42, 42 is suppressed, resulting in suppression of pulling off.

The vicinities of respective ends in the longitudinal direction of the lower rails 41, 41 are fixed to the floor via bolts or the like, and preferably, in the vicinities of at least one ends thereof, reinforcing plate-shaped members 415, 415 with a predetermined thickness are layered in at least one of the opposing pairs of side wall parts 412, 412 and upper wall parts 413, 413 (see FIG. 31 to FIG. 34, FIG. 37, FIG. 39). At the respective ends in the longitudinal direction, opposing edges of the upper wall parts 413, 413 easily open as compared to portions closer to the center than them, but by layering the reinforcing plate-shaped members 415, 415, a section modulus can be increased to make the opposing edges difficult to open. Further, preferably, the reinforcing plate-shaped members 415, 415 are provided in both ends in the longitudinal direction. Thus, the lower rails 41, 41 become substantially symmetrical also forward and backward with the substantially center part in the longitudinal direction being a boundary, allowing more efficient dispersion of a load applied to the lower rails 41, 41. However, when it is provided on either end, it is desired to be provided on the rear end side. The anchor attaching part of the seat belt is provided on the rear end side. Therefore, when the occupant is largely displaced in a direction to spring forward at a time of impact, a force to pull the rear end side forward is applied by the seat belt. Accordingly, it is necessary to suppress particularly opening of the opposing edges on the rear end side. Further, the above-described high-rigidity parts by the heat treatment are preferably set to portions on both ends where the reinforcing plate-shaped members 415, 415 are not disposed, which makes the entire vicinities of upper parts (open cross section parts) in the longitudinal direction of the upper wall parts 413, 413 and the side wall parts 412, 412 of the lower rails 41, 41 become portions of high rigidity, allowing the entire lower rails 41, 41 to receive and disperse a load. Further, accordingly, a deformation of the easy deformation portion excluding the vicinities of the upper parts (open cross section parts) of the respective side wall parts 412, 412 also occurs in the entire longitudinal direction, and absorption of energy due to impact force or vibration can be performed efficiently. In other words, the lower rails 41 and the upper rails 42 are structured to increase the section modulus in the vertical direction utilizing an input load in the upward and downward direction accompanying input of an impact force, thereby improving strength and rigidity. Thus, when an impact occurs and the person collides with the seat again, the weight of the person can be received with high rigidity, that is, the person can be received securely with structural members having a high section modulus in the vertical direction, improving protection performance for a person by the seat.

Figure 15:
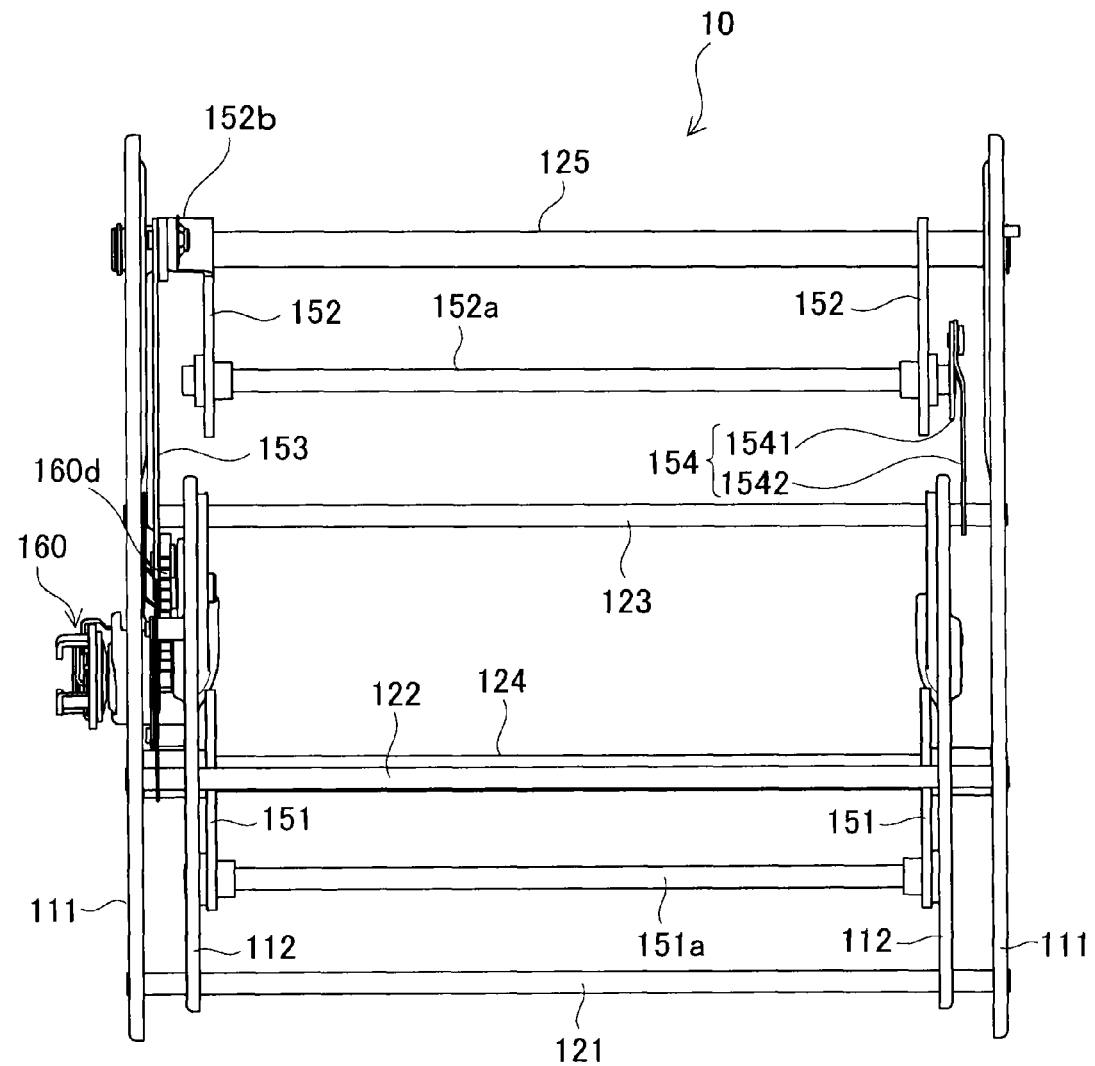
[FIG. 15]
Figure 16:
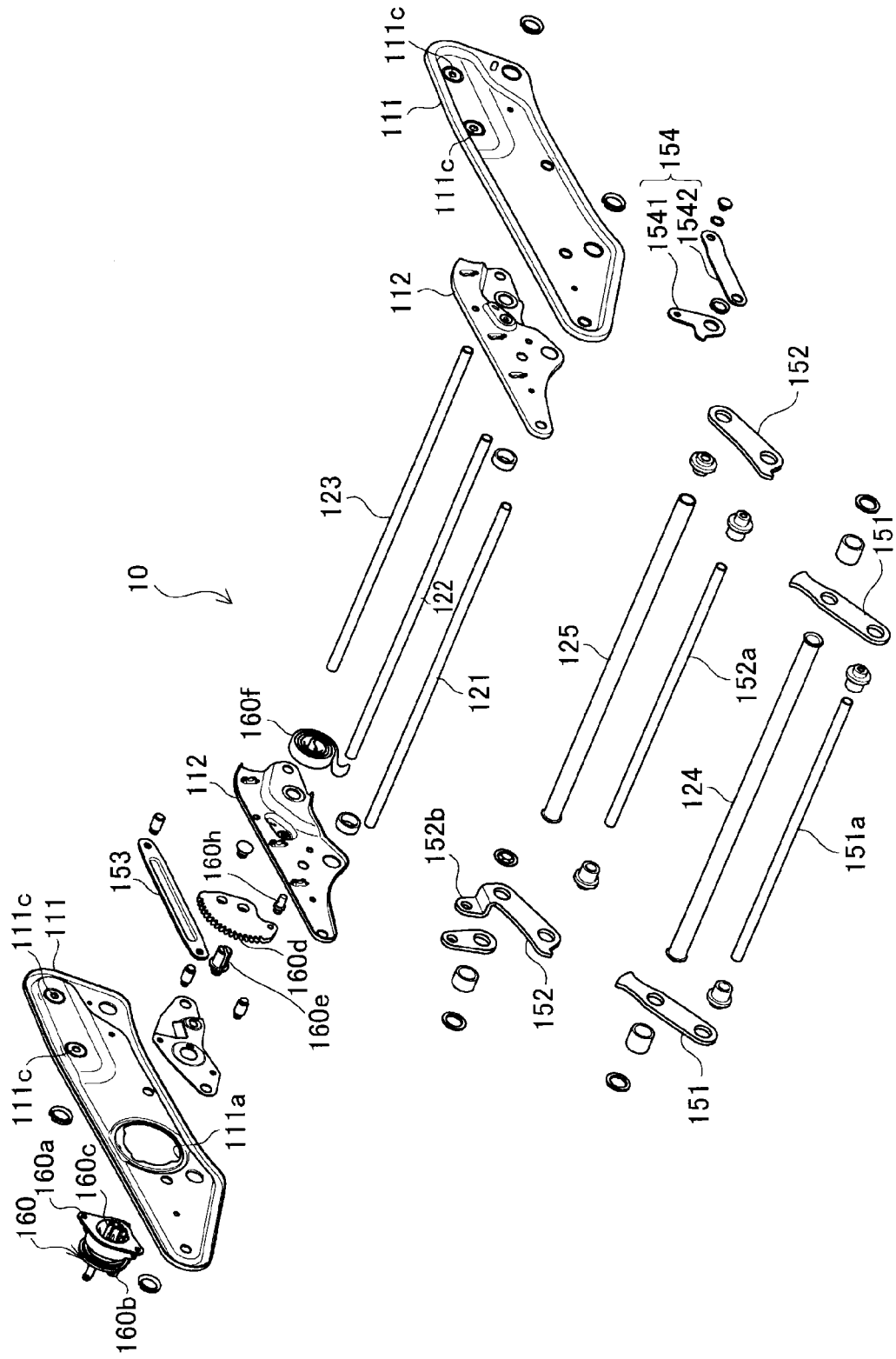
[FIG. 16]
Figure 17:
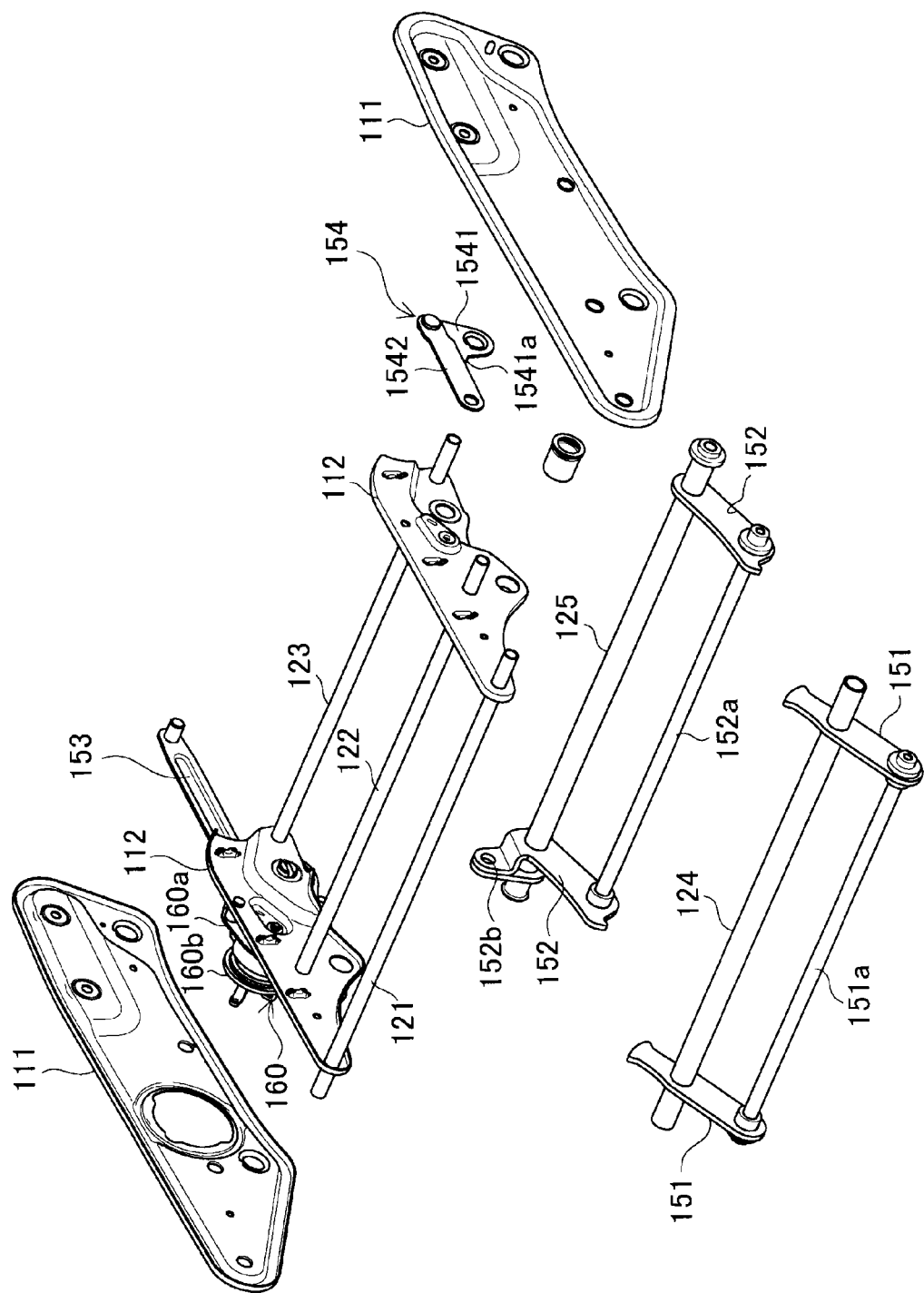
[FIG. 17]
Figure 18:
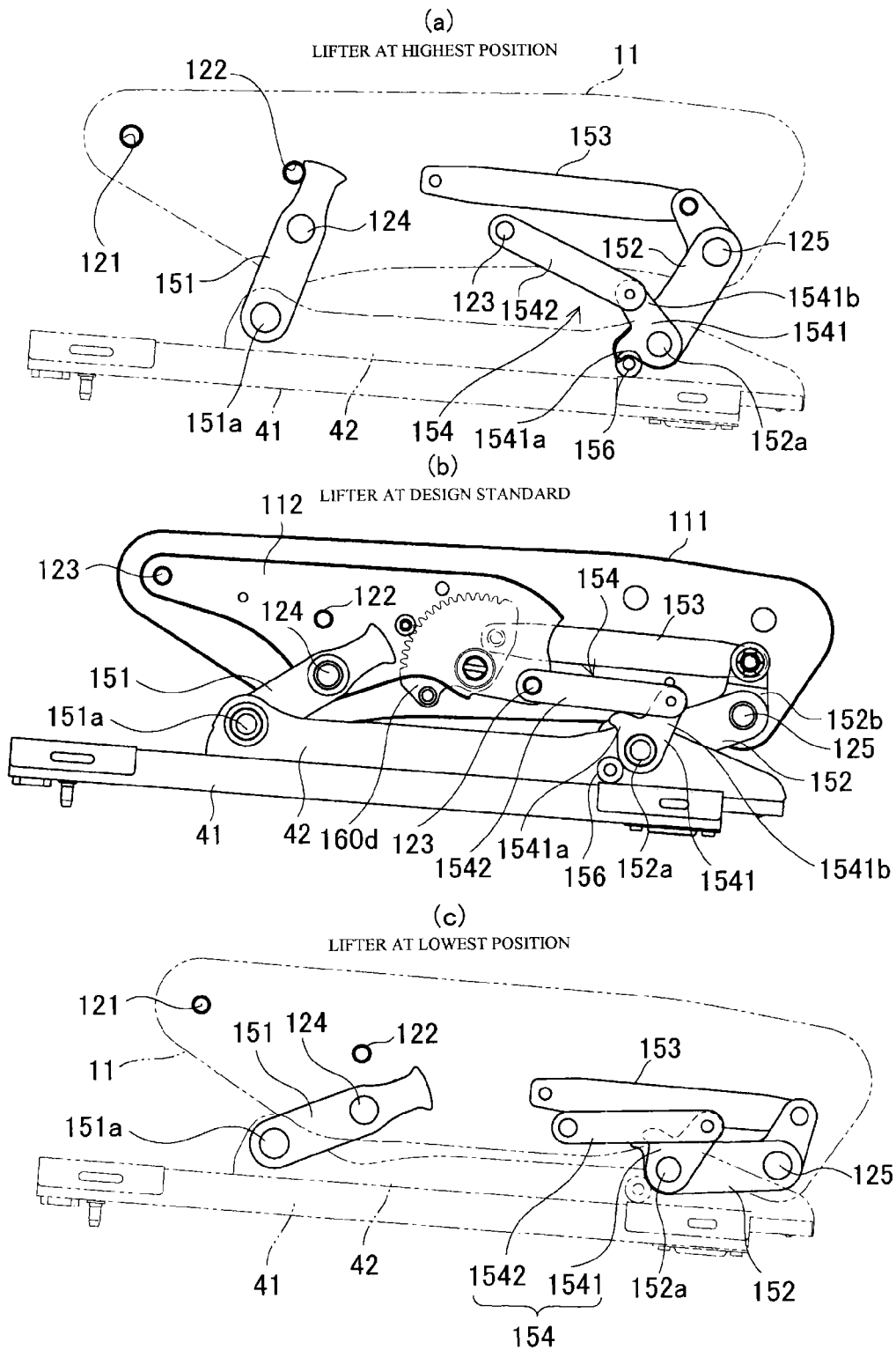
[FIG. 18] FIG. 18 are views for explaining an operation of a lifter mechanism part, in which (a) is a view illustrating an upper limit position, (b) is a view illustrating a position of a design standard, (c) is a view illustrating a lower limit position.
Figure 41:
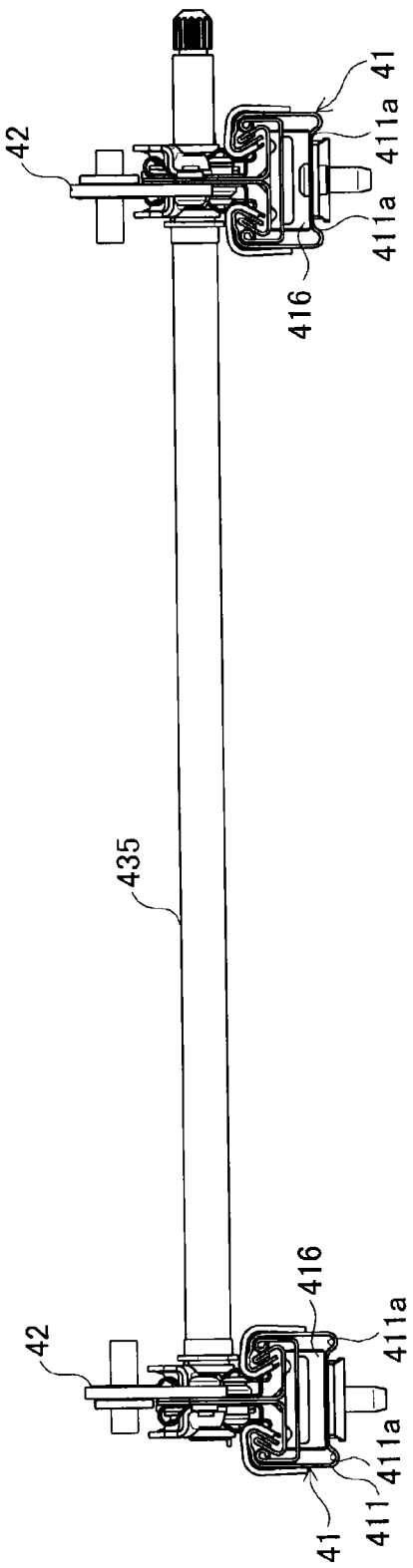
[FIG. 41]

In the vicinities of the respective ends of the lower rails 41, 41, rollers 416, 416 for sliding are supported. These rollers 416, 416 are disposed via retainers 417, 417 on bottom wall parts 411, 411 of the lower rails 41, 41. Here, since the bottom wall parts 411, 411 are formed of the thin material, when the bottom wall parts 411, 411 are flat surfaces, there is a concern that wear partially occurs relatively early due to insufficiency of surface pressure. Accordingly, as illustrated in FIG. 15, preferably, the bottom wall parts 411, 411 are structured to have stepped parts 411*a*, 411*a* such that, in a cross-sectional shape, a part protrudes upward with the vicinity of a corner on both ends in the width direction having an R-shaped cross-section. Thus, as illustrated in FIG. 41, the rollers 416, 416 are consequently supported on these stepped parts 411a, 411a. The rollers are consequently supported by portions inclined in an obliquely upward and downward direction when seen in a cross-section of the stepped parts 411a, 411a, and thus wear is difficult to occur. Note that such partial wear occurs by the rollers 416, 416 as described above, but in this embodiment, the lock mechanism 43 has the elastic lock member 430, which gives elasticity to the lower rails 41, 41 and the upper rails 42, 42. Therefore, even when the aforementioned partial wear occurs, the lower rails 41, 41 and the upper rails 42, 42 bend by an elastic deformation, and thus it is difficult for the seated person to feel rattling by this partial wear.

Figure 42:
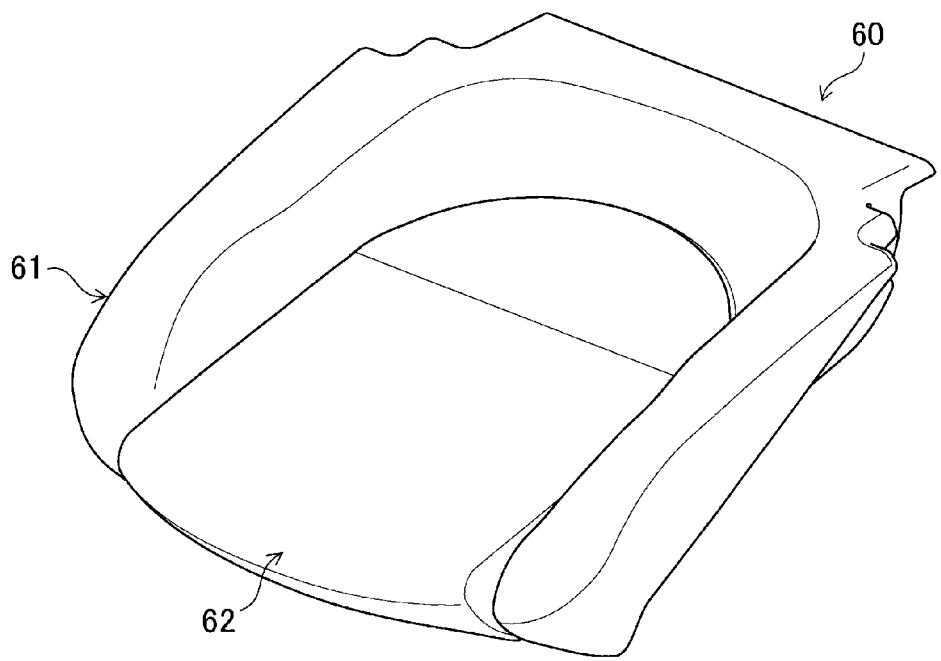
[FIG. 42]
Figure 43:
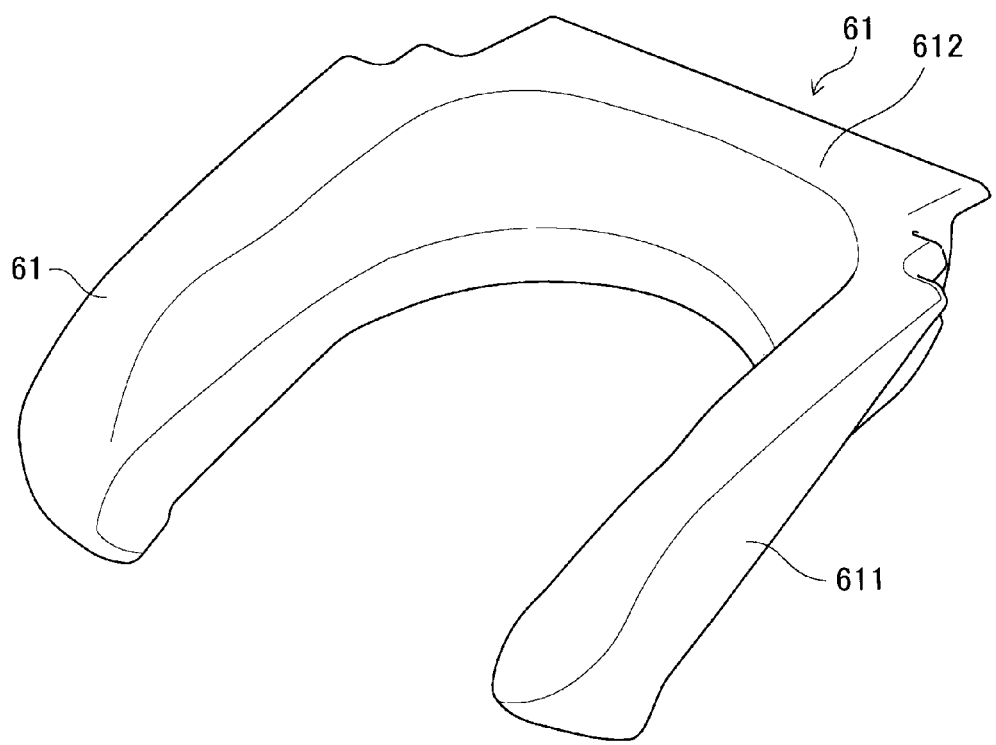
[FIG. 43]
Figure 44:
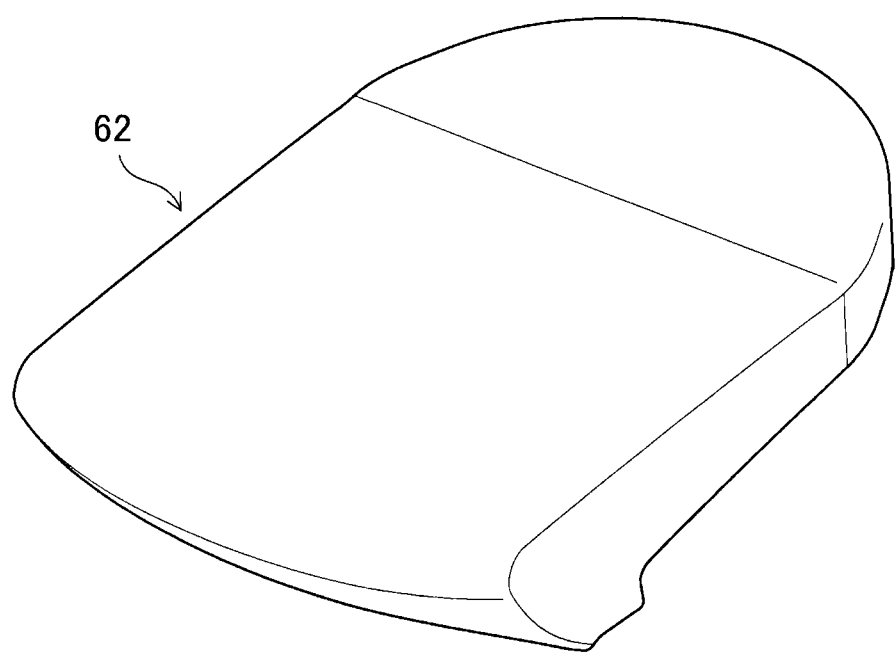
[FIG. 44]
Figure 45:
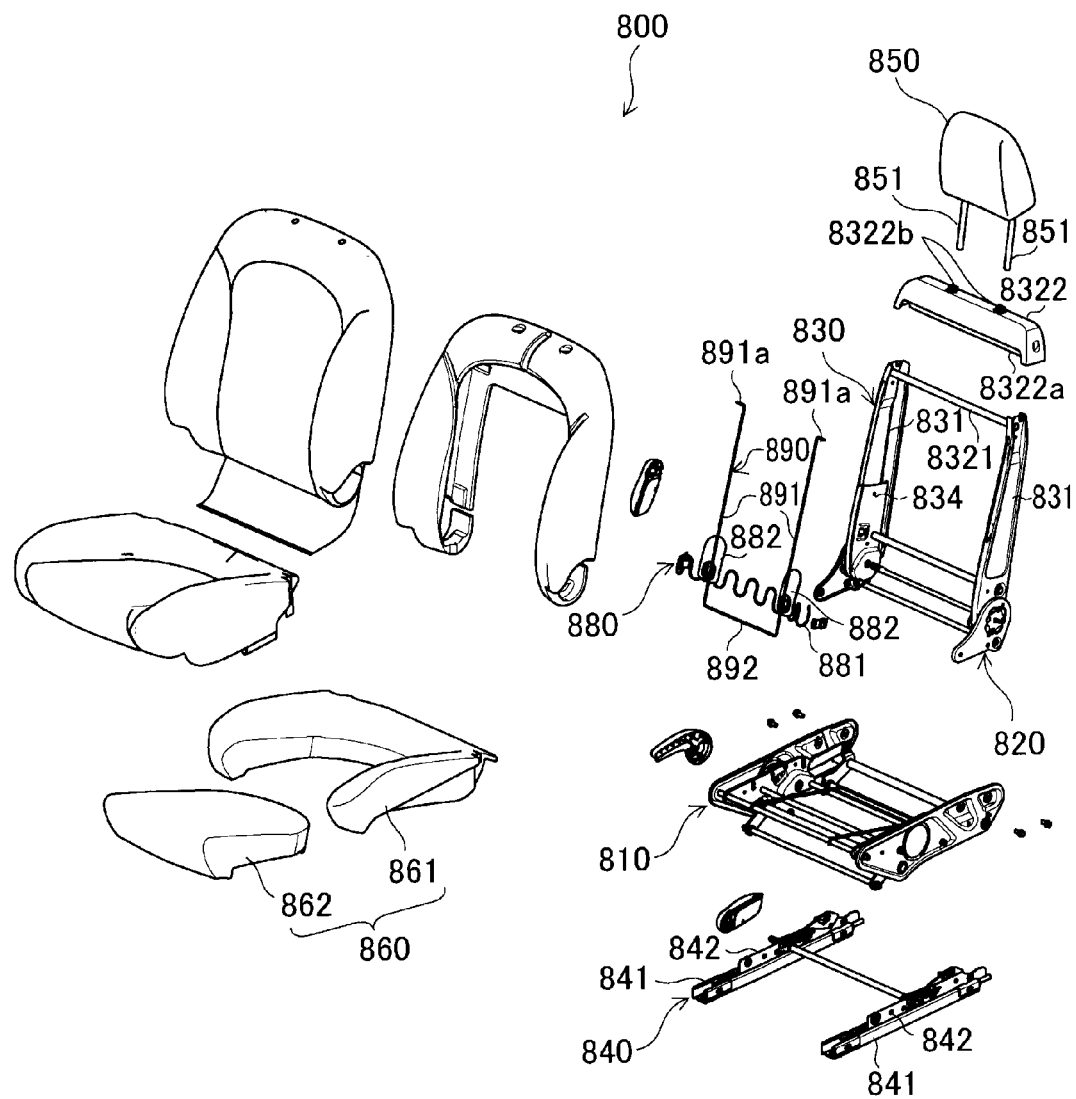
[FIG. 45]
Figure 46:
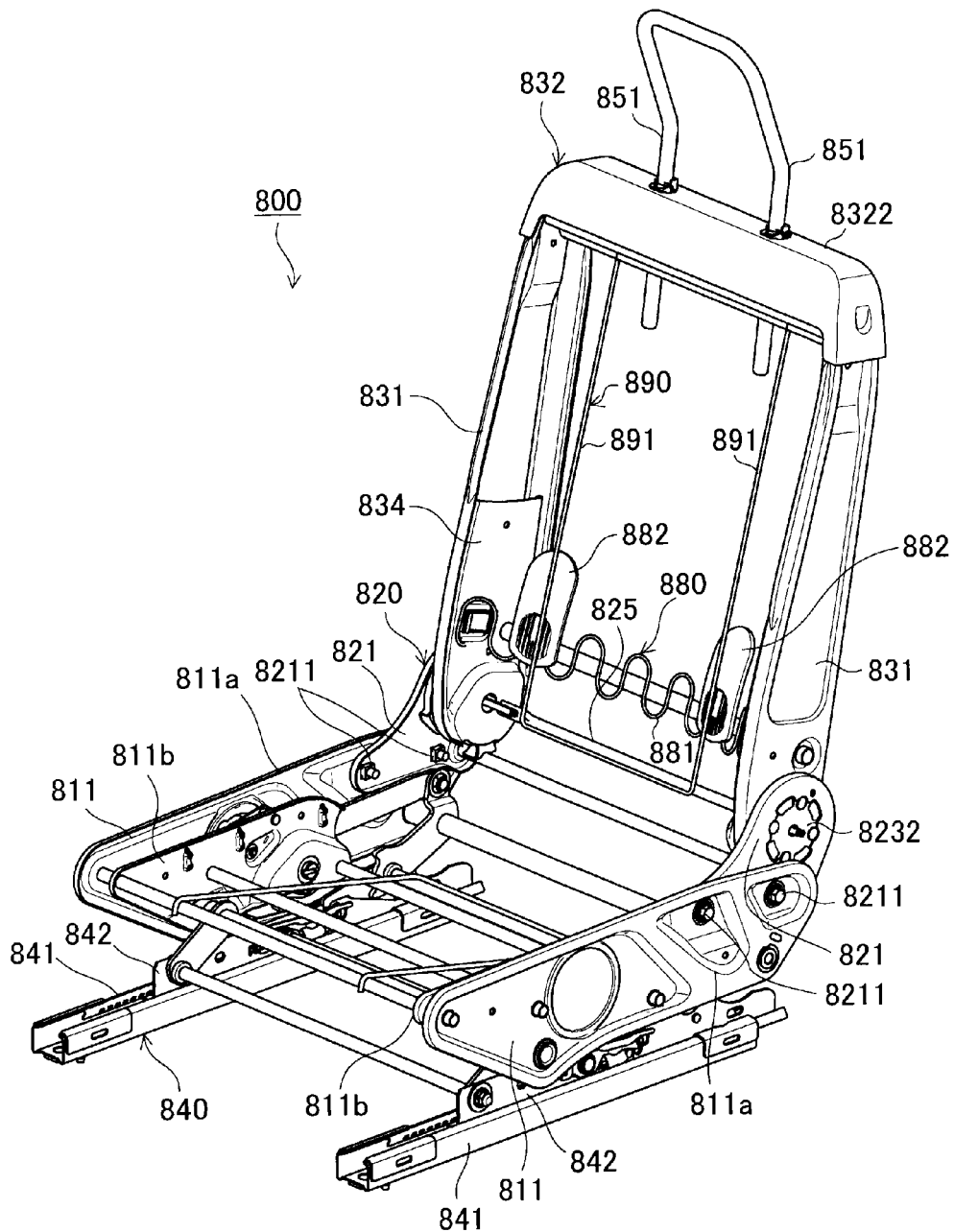
[FIG. 46]
Figure 47:
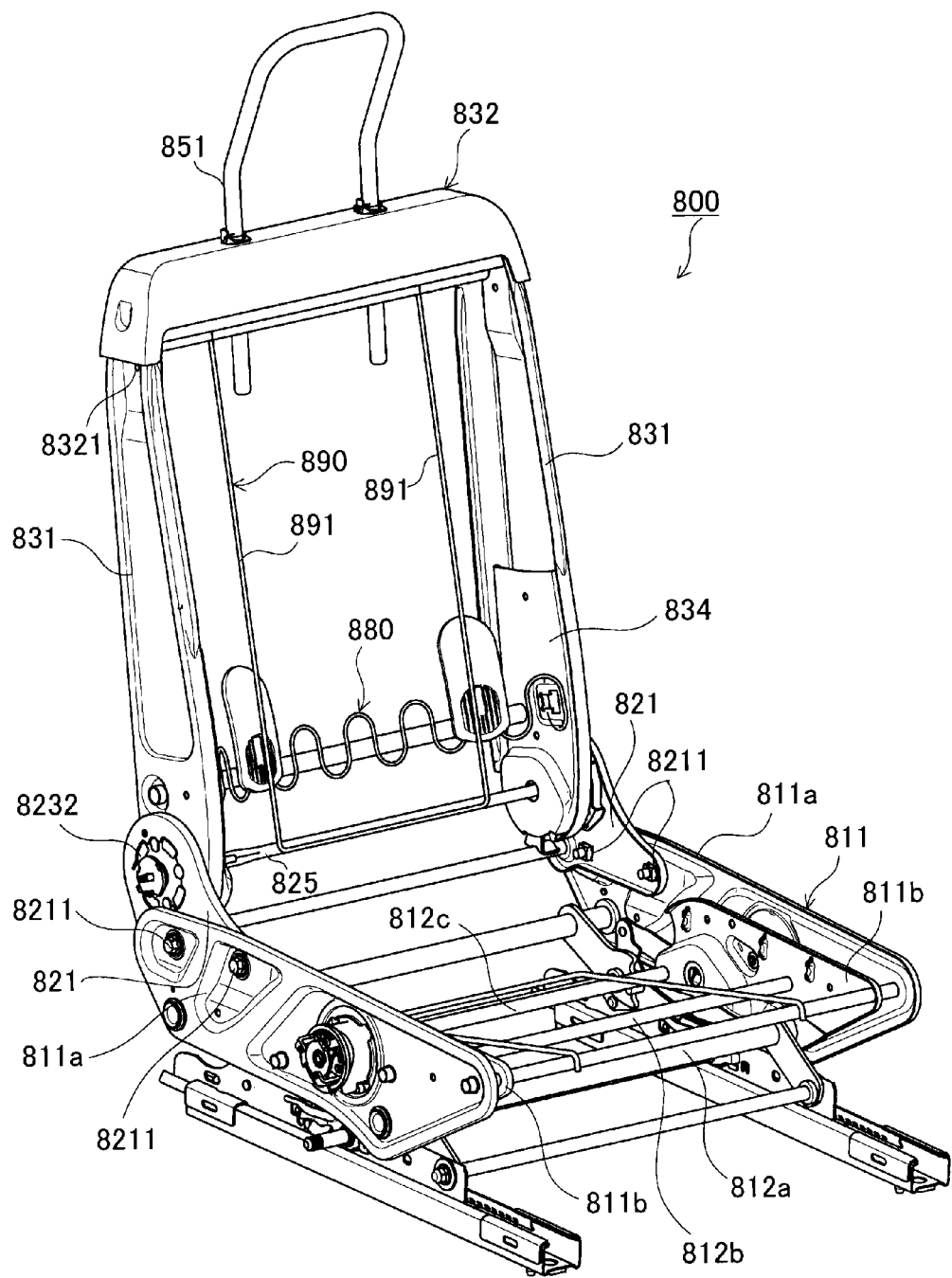
[FIG. 47]
Figure 48:
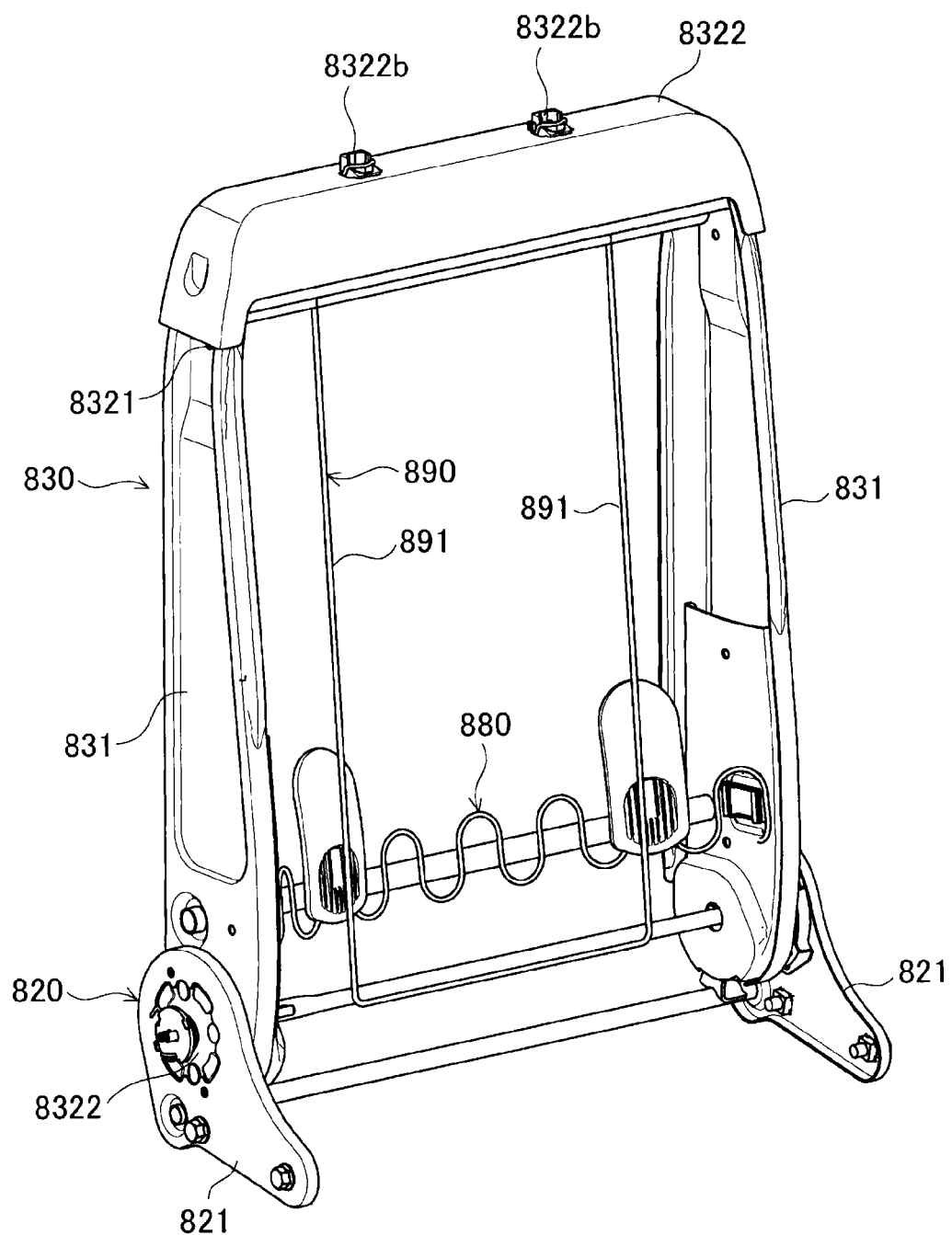
[FIG. 48]
Figure 49:
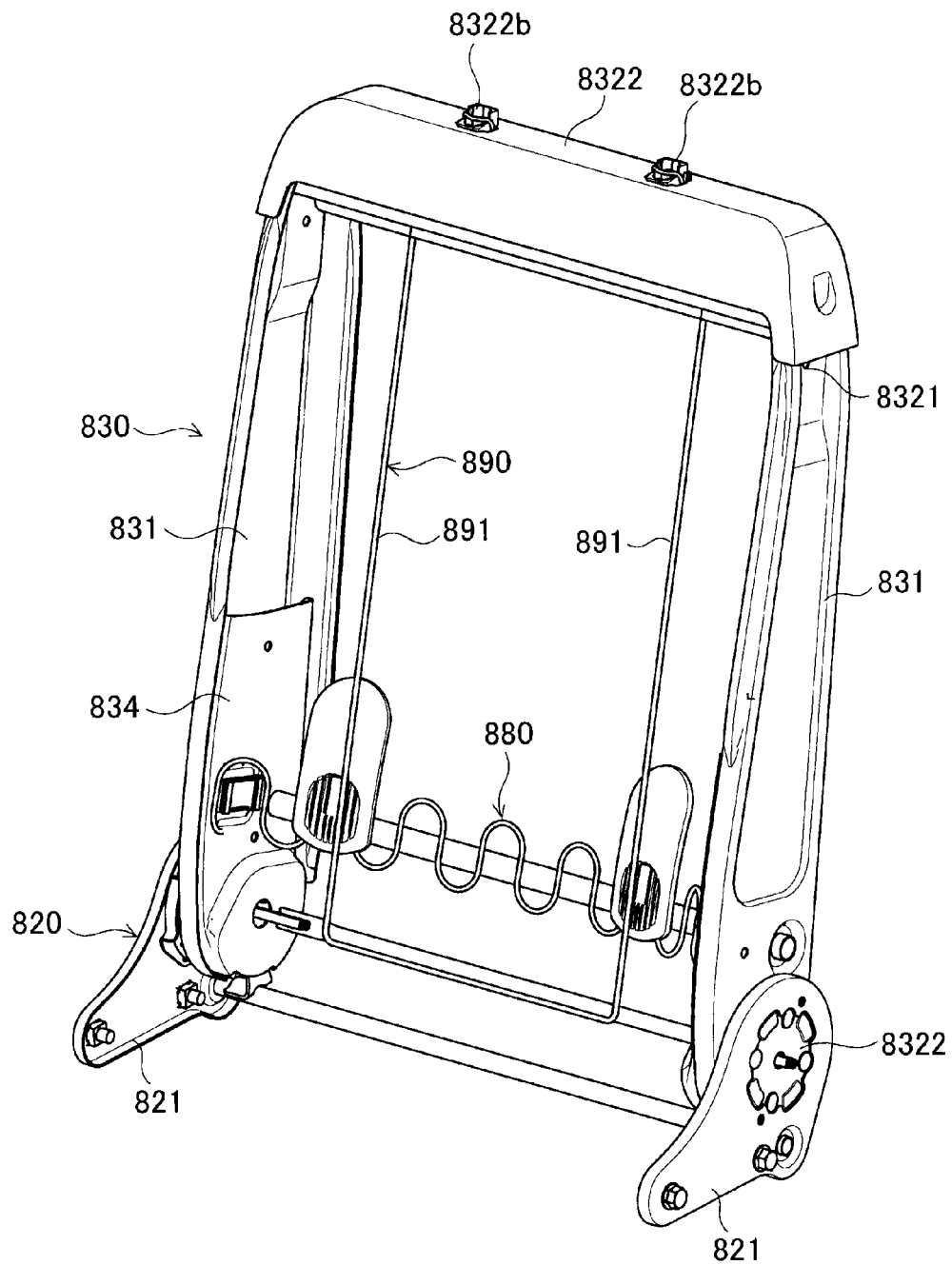
[FIG. 49]
Figure 50:
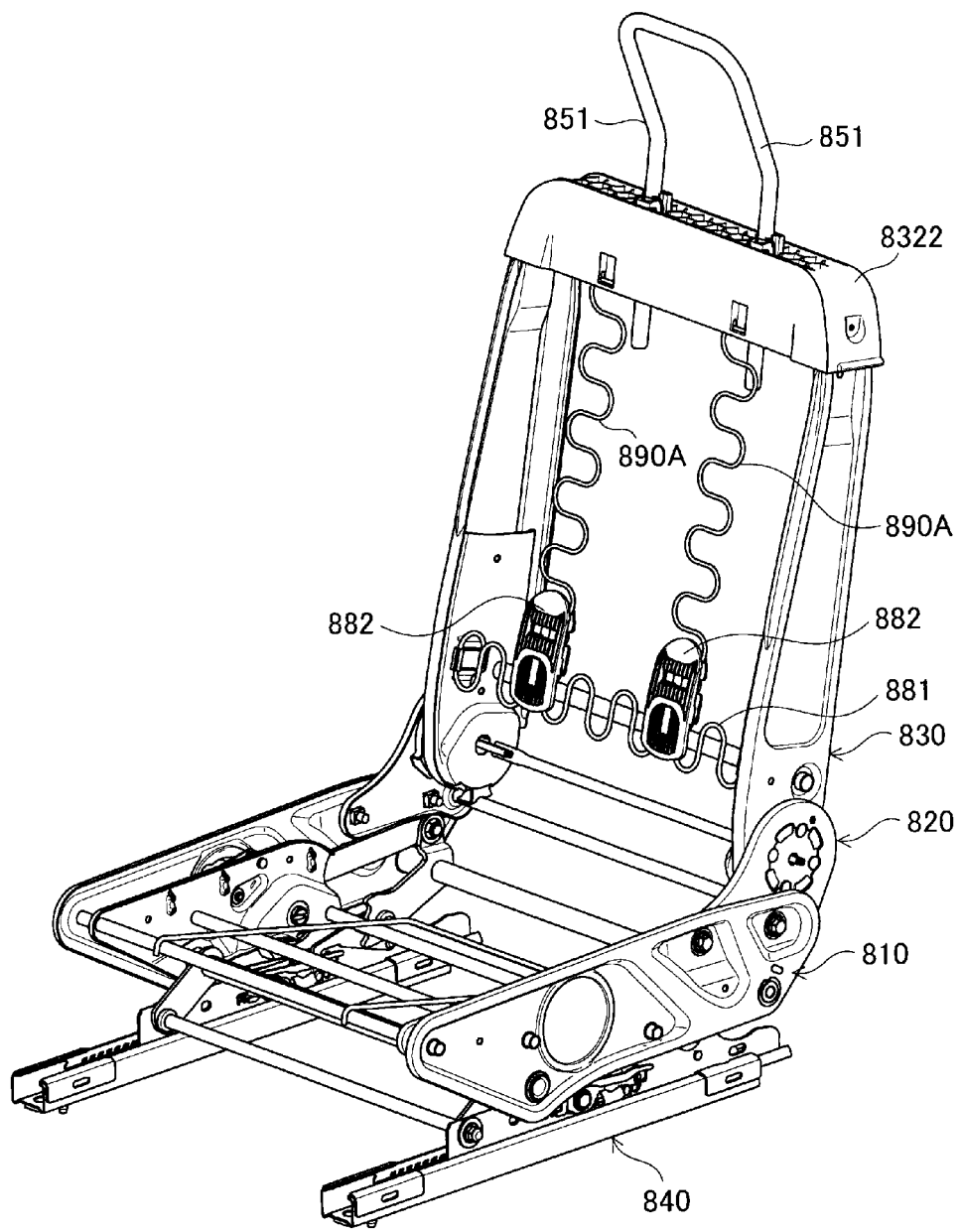
[FIG. 50]
Figure 51:
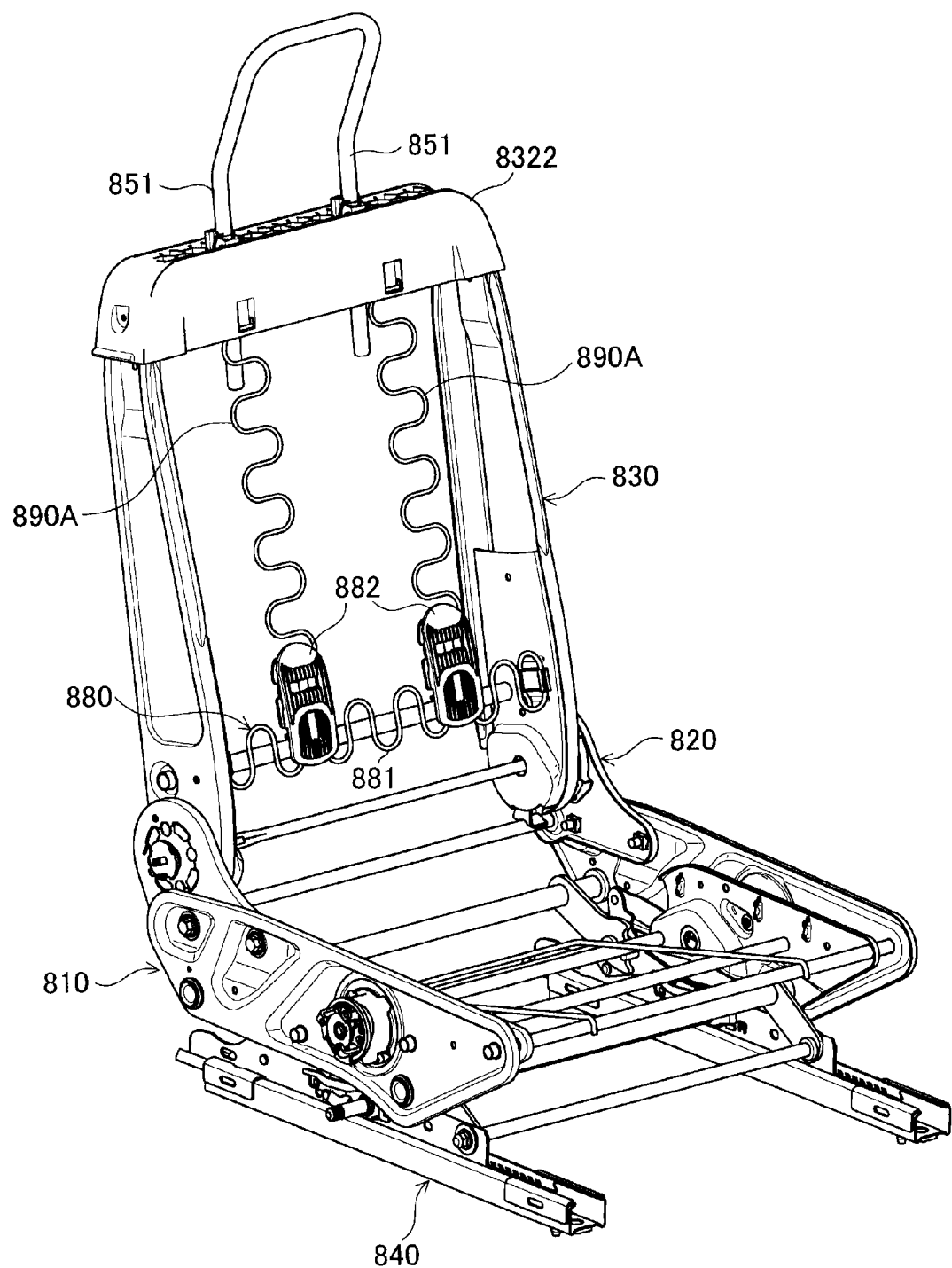
[FIG. 51]
Figure 52:
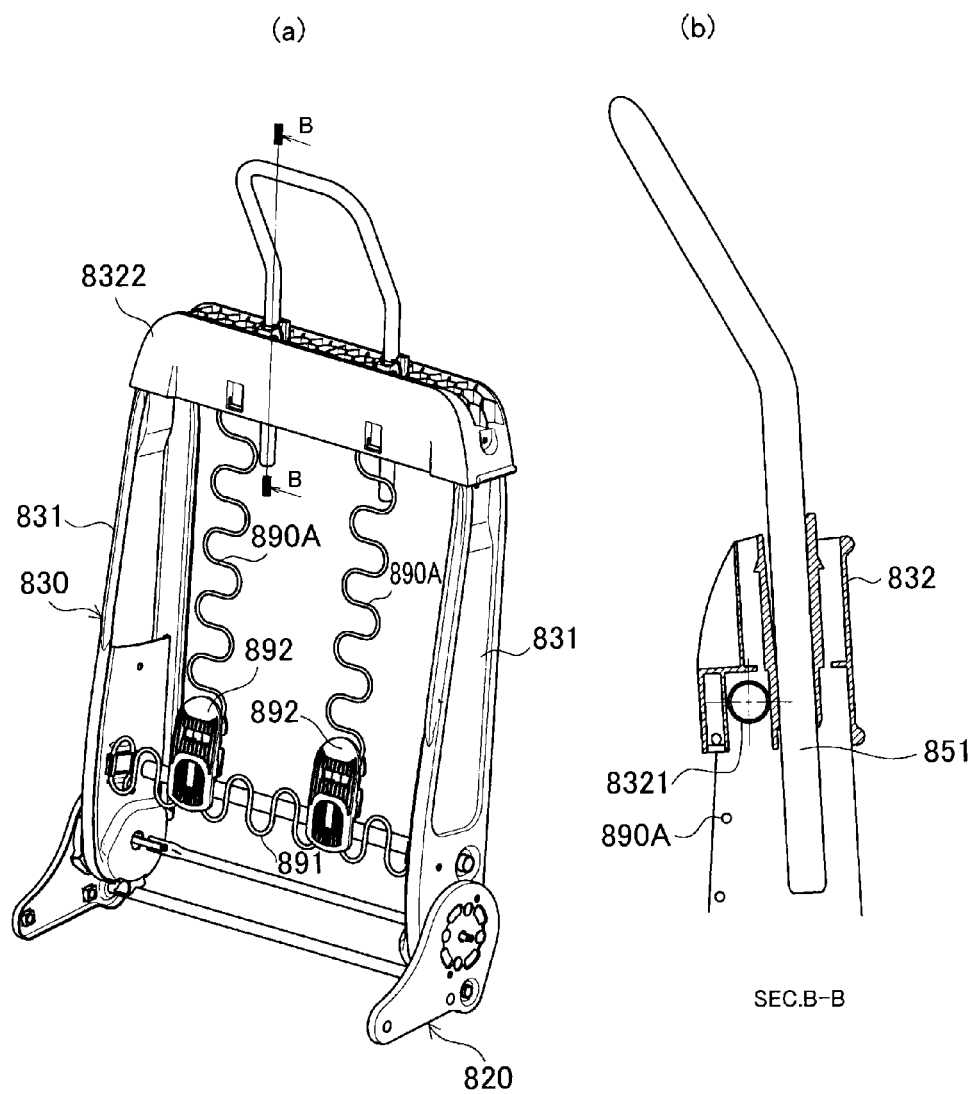
[FIG. 52] FIG. 52($a$) is a perspective view seeing the back frame unit of FIG. 50 from an oblique right front side, and FIG. 52($b$) is a B-B cross-sectional view of FIG. 52($a$).

The cushion member 60 disposed on the seat cushion part 1A has an external cushion member 61 and an internal cushion member 62, as illustrated in FIG. 42 to FIG. 44. The external cushion member 61 has a pair of side support parts 611, 611 and a rear support part 612 and is formed in a substantially U shape when seen in a plan view. Then, the pair of side support parts 611, 611 is supported in contact with the inner surfaces and upper edges of the respective side frames 11, 11 of the cushion frame unit 10, and the rear support part 612 is disposed to cover the fifth beam 125 coupled between the opposing rear portions of the outer plate-shaped frames 111, 111 and the sixth beam 211 bridged across the corners 21a, 21a of the reclining unit 20 (see FIG. 5 and FIG. 6).

The internal cushion member 62 is disposed to cover the first to third beams 121 to 123. Thus, forces from the buttocks to the thighs on the internal cushion member 62 are transmitted to the inner plate-shaped frames 112, 112 via the first beam 121 to the third beam 123. Note that as illustrated in FIG. 5, preferably, a two-dimensional or three-dimensional woven fabric member 63 is bridged across the first beam 121 and the third beam 123, and the internal cushion member 62 is disposed thereon.

Figure 5:
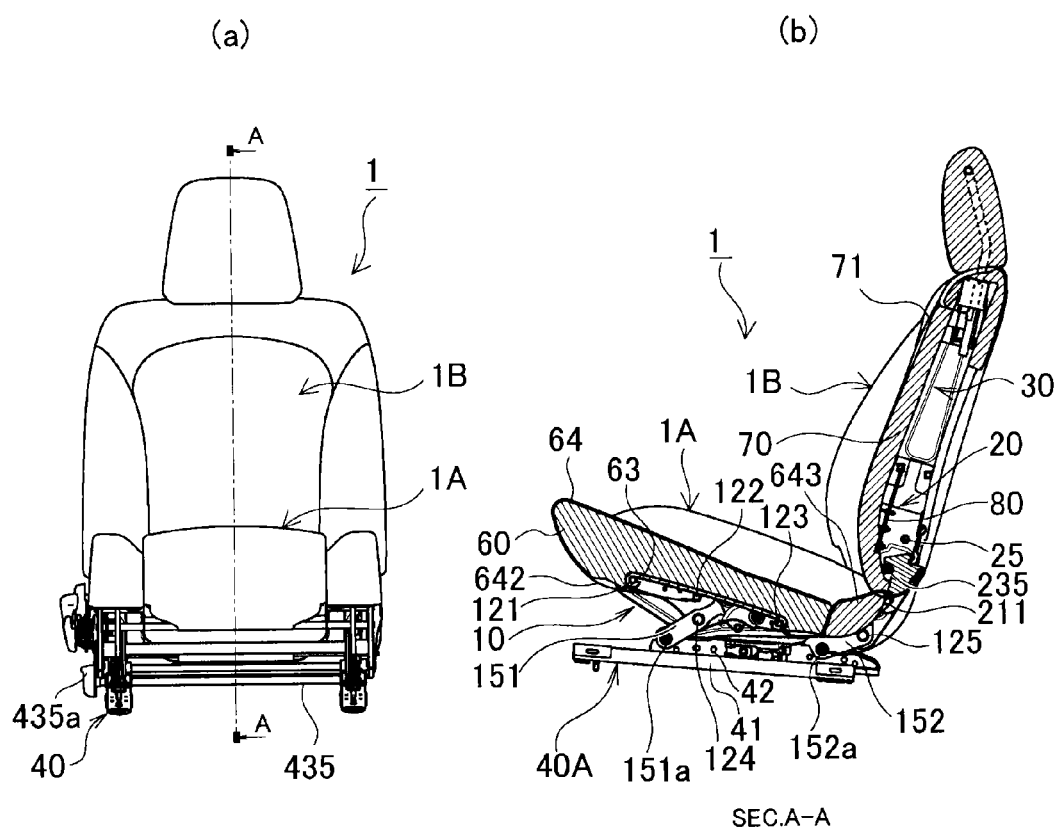
[FIG. 5] FIG. 5($a$) is a front view of the vehicle seat according to the embodiment and FIG. 5($b$) is an A-A cross-sectional view of (a).
Figure 6:
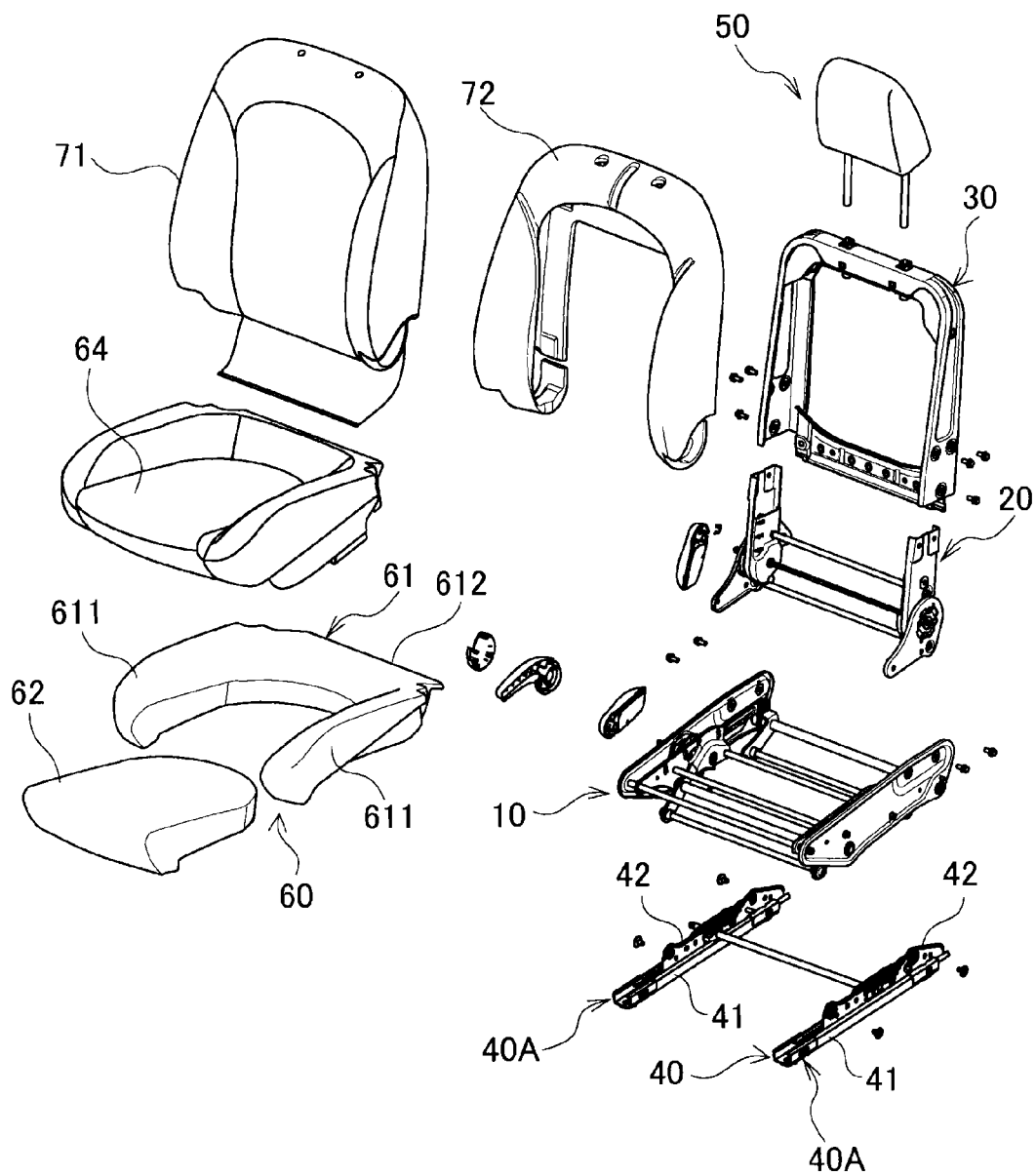
[FIG. 6]
Figure 7:
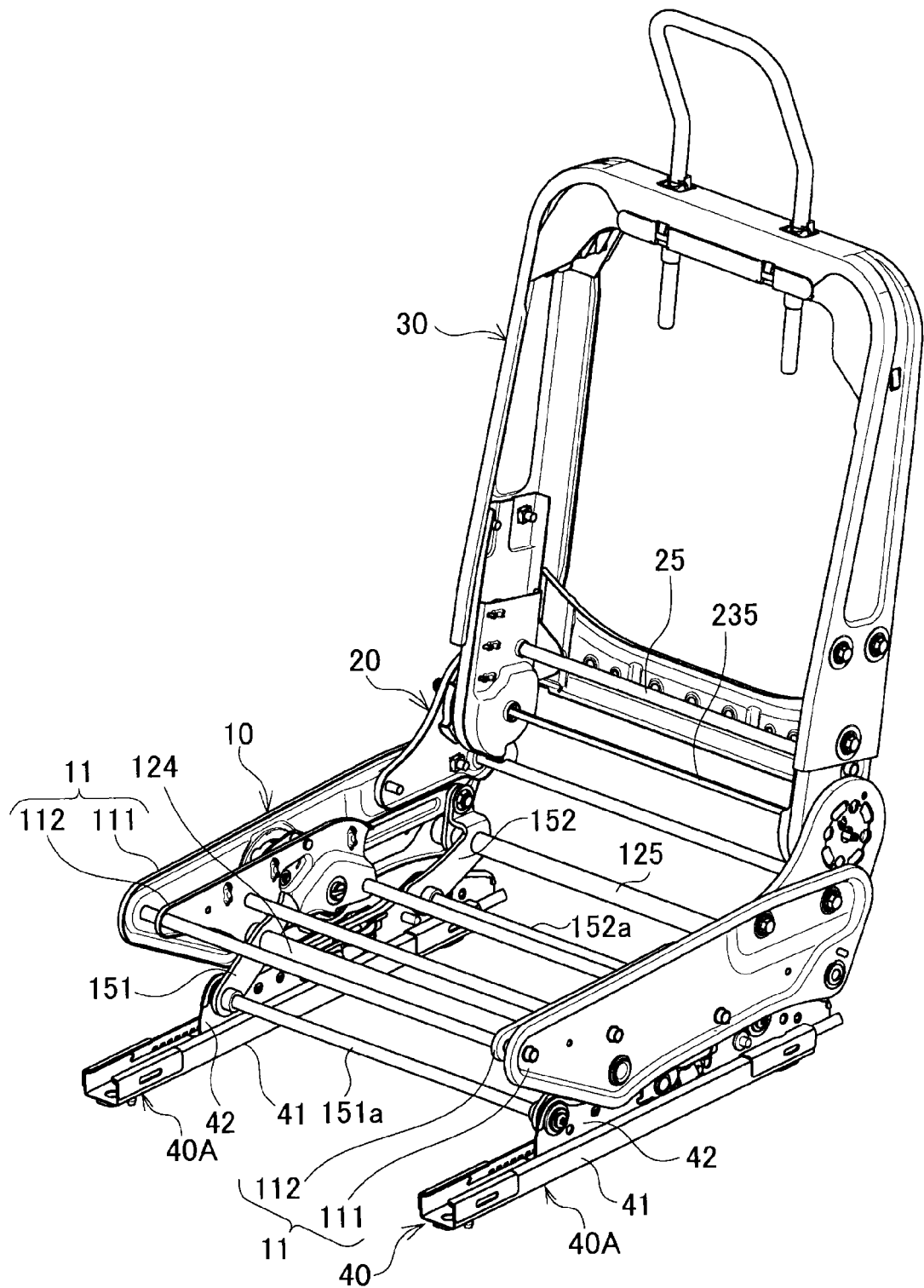
[FIG. 7]
Figure 8:
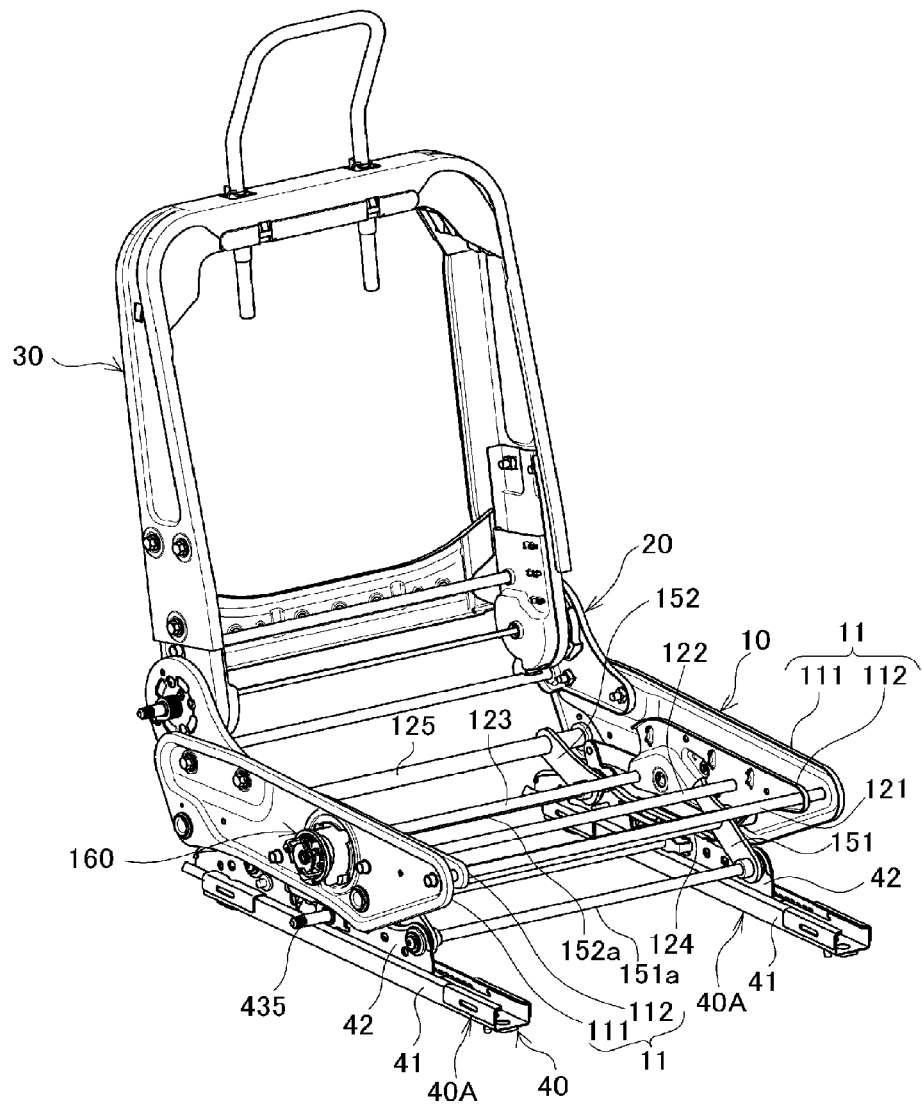
[FIG. 8]
Figure 9:
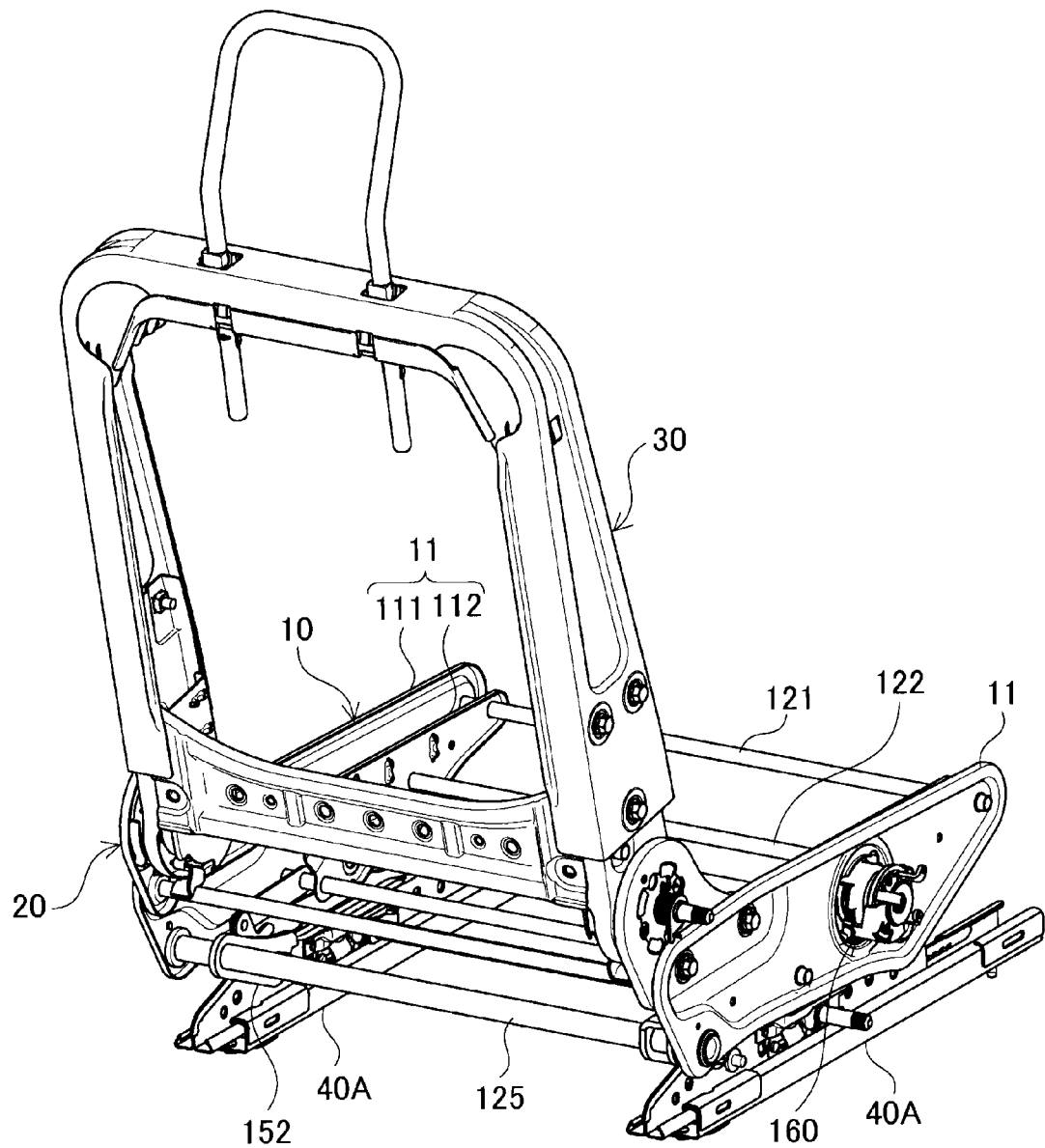
[FIG. 9]
Figure 10:
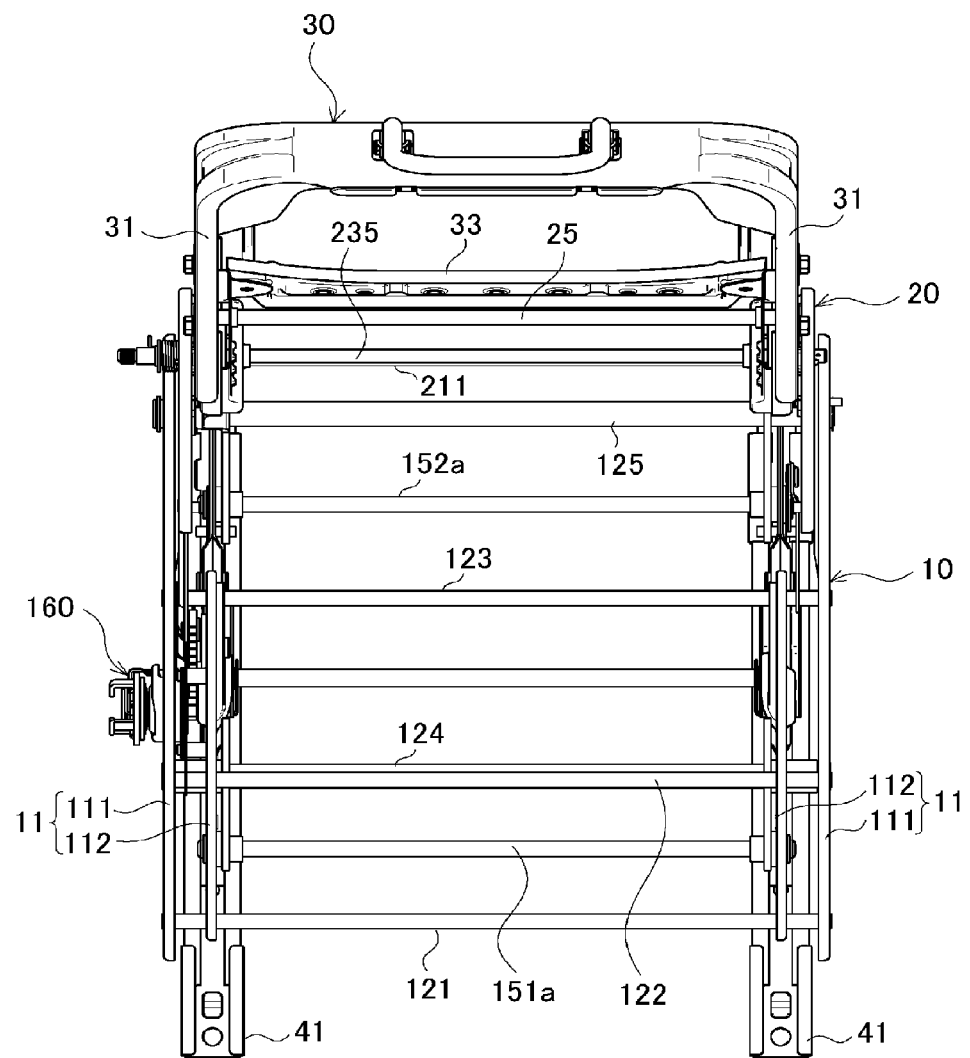
[FIG. 10]
Figure 11:
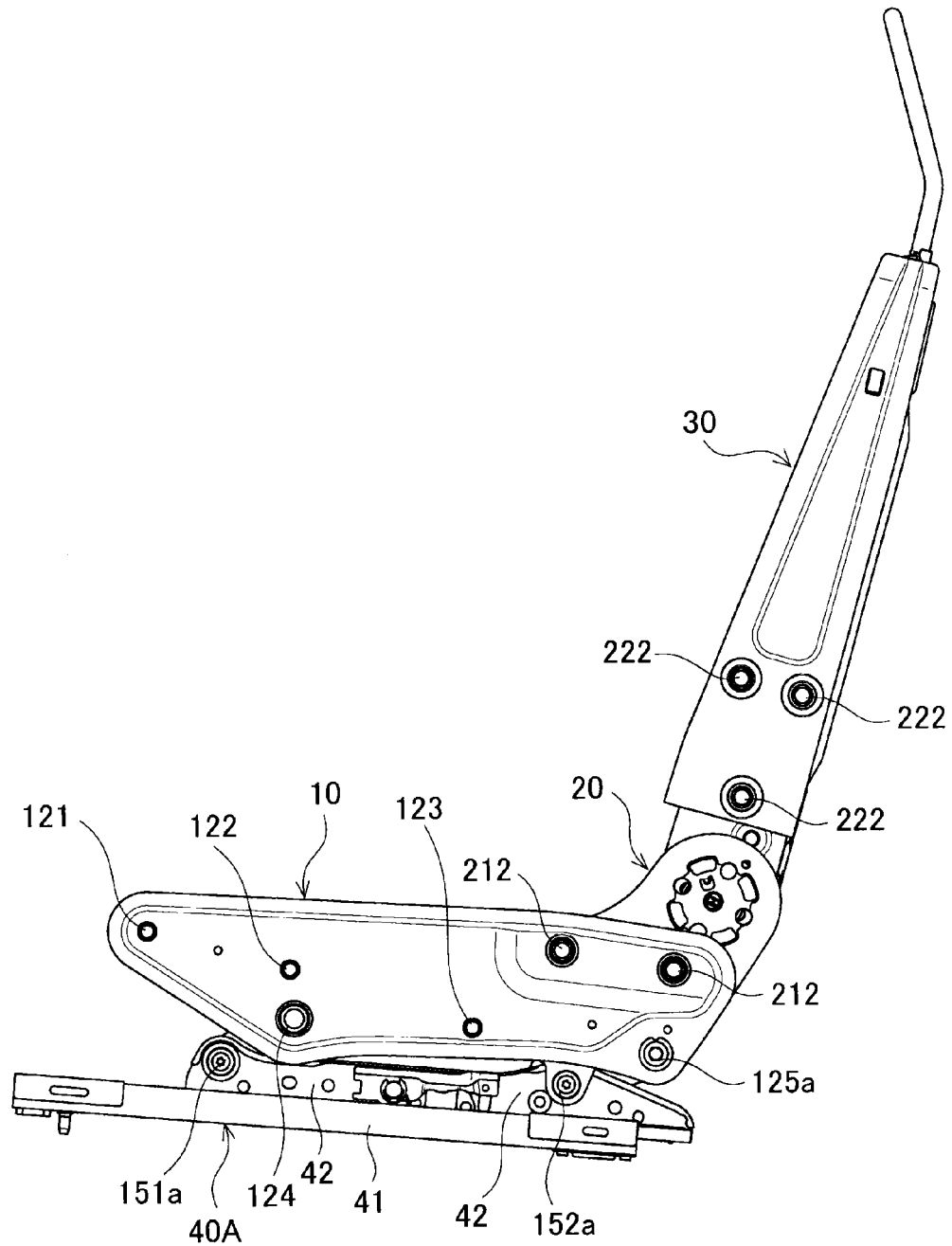
[FIG. 11]
Figure 12:
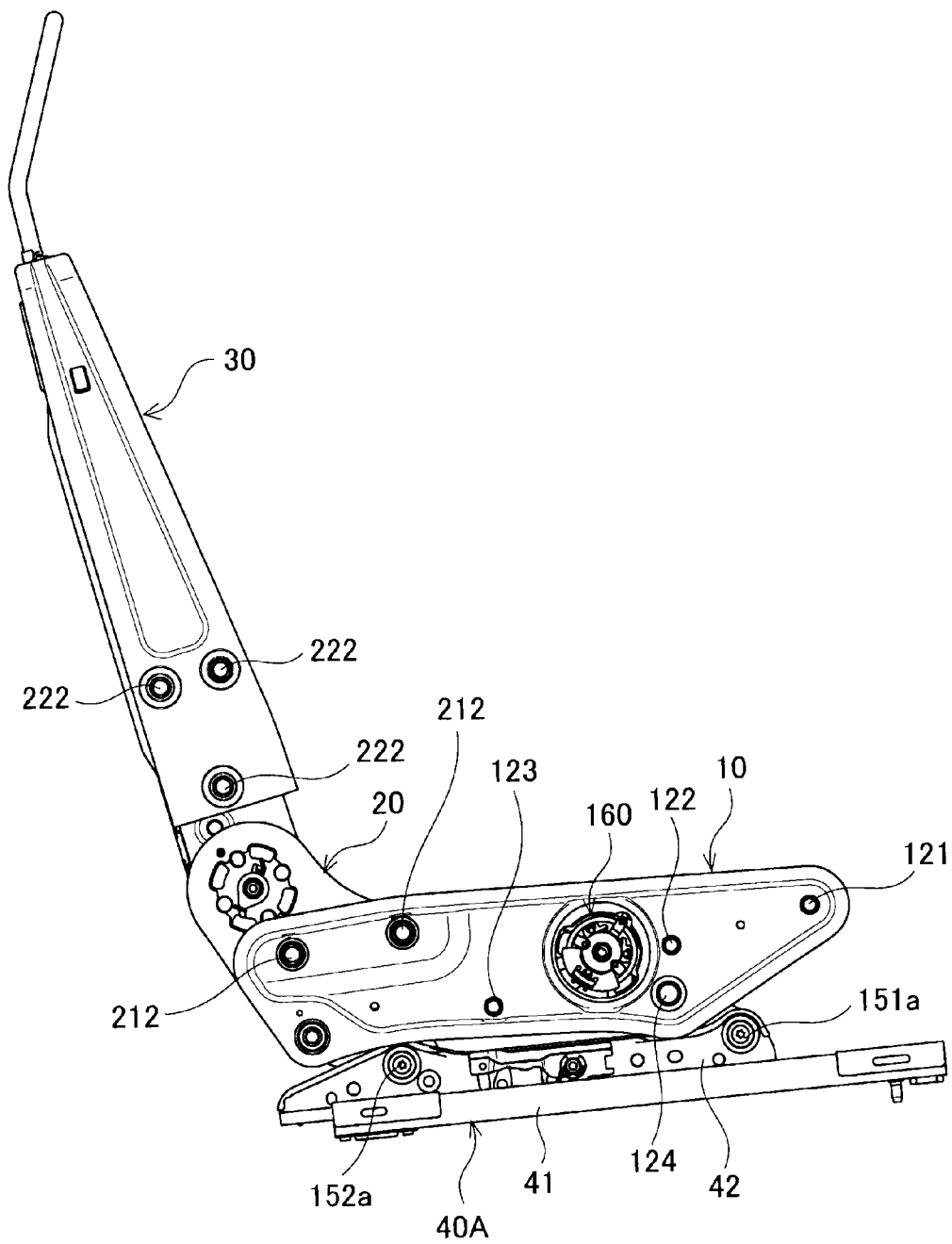
[FIG. 12]
Figure 13:
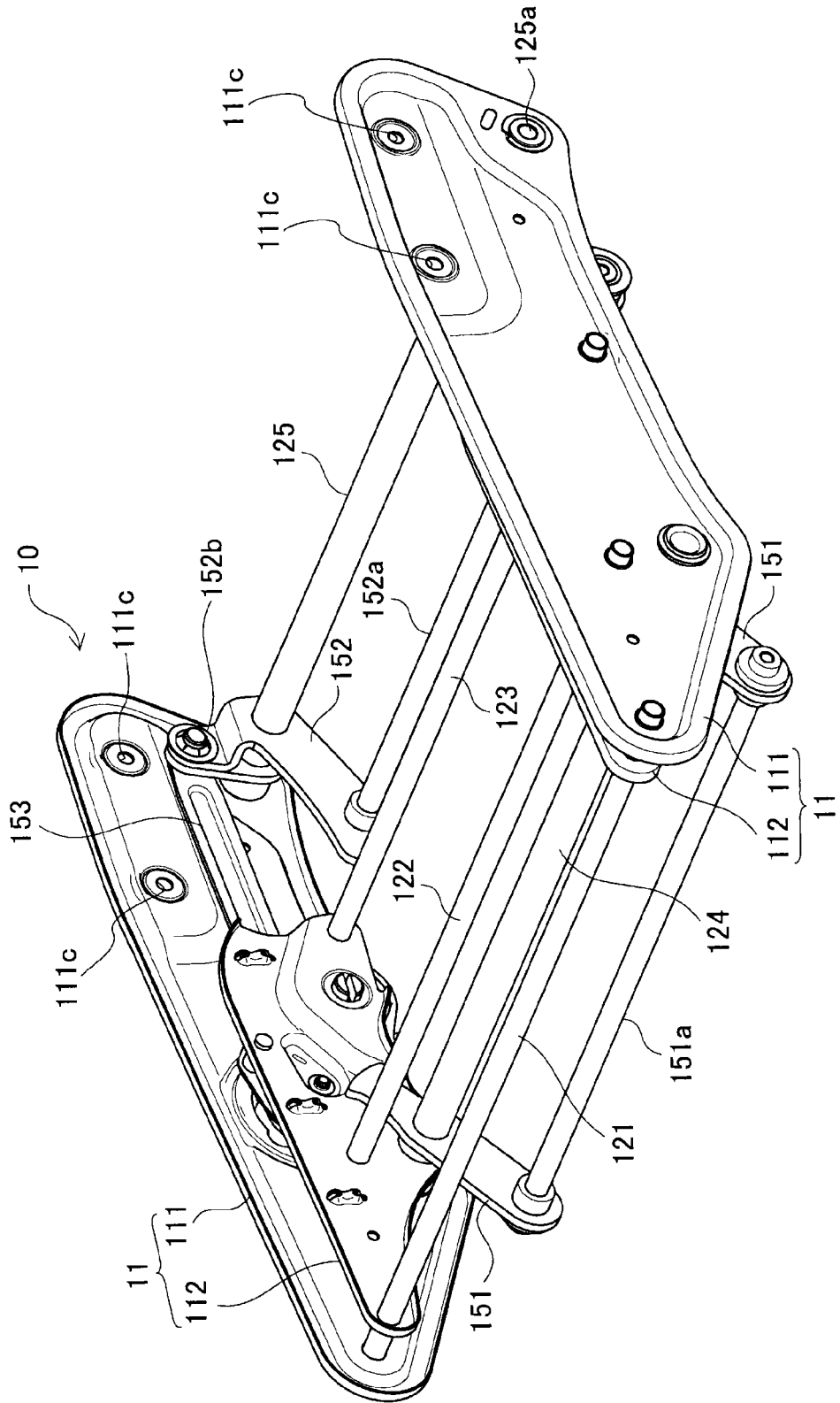
[FIG. 13]
Figure 14:
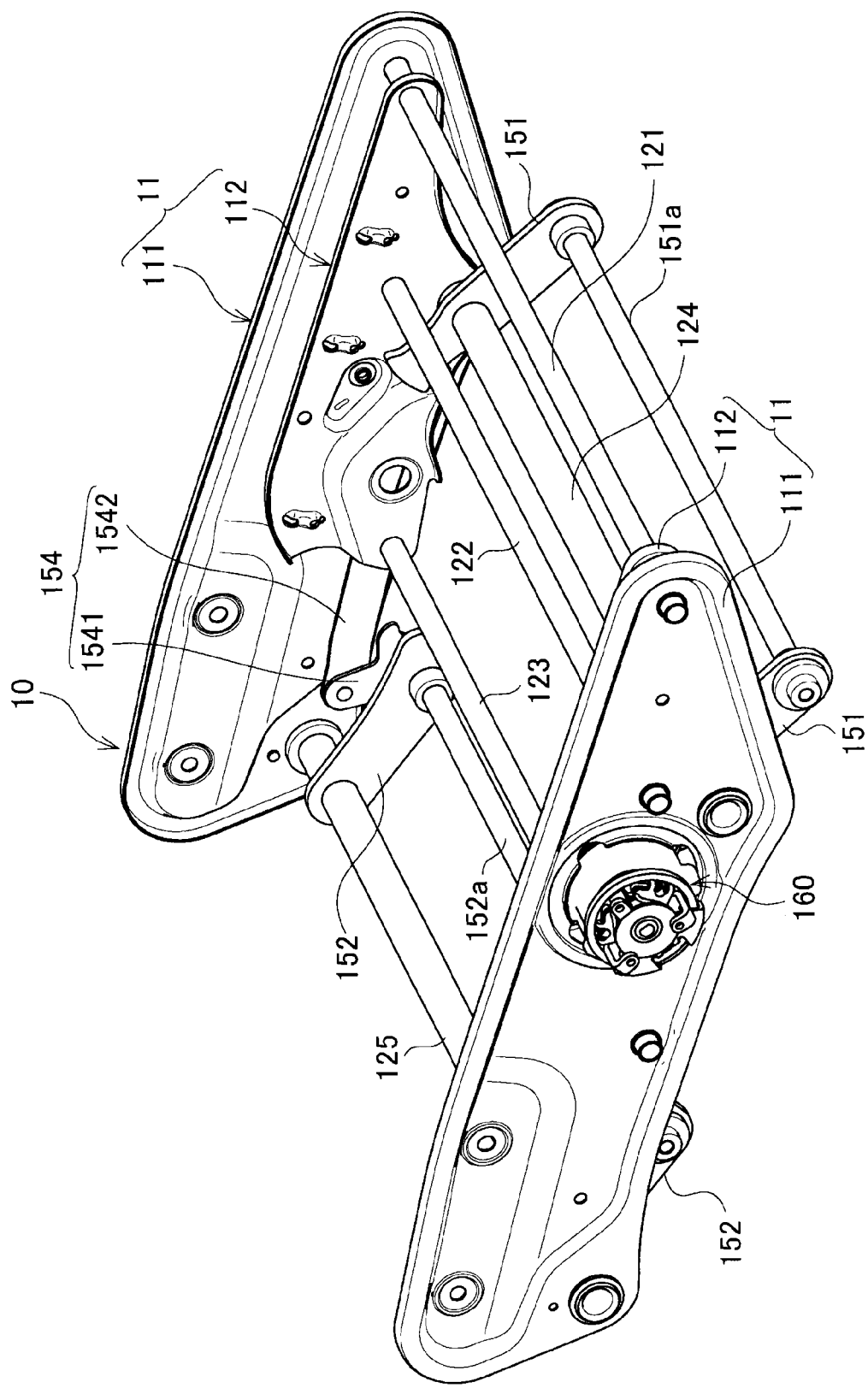
[FIG. 14]

The surface of the external cushion member 61 and the internal cushion member 62 is covered with an outer layer member 64, a side edge 641 in a peripheral edge of the outer layer member 64 is pulled under lower edges of the side frames 11, 11 to be fixed therein (see FIG. 1), and a front edge 642 passes front edges of the external cushion member 61 and the internal cushion member 62 and pulled into a lower side, and engaged and fixed to the second beam 122 (see FIG. 5). A rear edge 643 is attached around the coupling shaft 235 of the reclining unit 20 and fixed at an appropriate position. The outer layer member 64 is disposed in this manner, and the cushion member in this embodiment is constituted of the two cushion members, the external cushion member 61 and the internal cushion member 62. Thus, it is preferably structured such that the surface layer material 64 and the woven fabric member 63 are coupled by sewing or by using a hook-and-loop fastener at a boundary position between them, and then the external cushion member 61 and the internal cushion member 62 are filled adjacent to a coupling surface. Thus, the outer layer member 64 is relatively pulled into a gap between the external cushion member 61 and the internal cushion member 62, the pulled portion is consequently coupled to the woven fabric member 63, and hence the shape of a pulling line of the seat cushion part can be formed without using a metal fitting such as an ohm clip. Further, preferably, the surface layer material 64 and the woven fabric member 63 are coupled by sewing or by using a hook-and-loop fastener, a closed cross-sectional space for inserting the external cushion member 61 and a closed cross-sectional space for inserting the internal cushion member 62 are formed in advance, and the cushion members 61, 62 are inserted into these formed closed cross-sectional spaces. Since a tensile force is added by the inserted cushion members 61, 62, wrinkles are difficult to occur on a surface of the outer layer member when nobody is seated thereon.

The cushion member 60 of this embodiment is thus covered with the outer layer member 64 in a state that they are separated into the external cushion member 61 and the internal cushion member 62, and thus the both can move relatively easily. Accordingly, it becomes easy to absorb particularly forward and backward vibrations. Preferably, the cushion member 60 is constituted of a urethane material, and also preferably, the internal cushion member 62 uses a urethane foam with higher density than that of the external cushion member 61. Thus, the internal cushion member 62 can move easily by allowing the external cushion member 61 to deform, improving the vibration absorbing characteristic. Further, when a person sits down, the outer layer member 64 becomes loose. When the outer layer member 64 becomes loose, characteristics of the external cushion member 61 and the internal cushion member 62 substantially affect the contact with the person's body surface. Specifically, a contact area (contact area via the outer layer member 64) between the external cushion member 61 and the internal cushion member 62 constituted of urethane foam or the like and the person's body surface consequently increases, and thus a high body pressure dispersion characteristic can be exhibited.

As illustrated in FIG. 5 and FIG. 6, the cushion member 70 of the seat back part 1B is attached to the back frame unit 30, and is disposed by being covered with an outer layer member 71. Note that symbol 72 of FIG. 6 denotes a trunk side support member attached to stably support the vicinity of sides of the trunk. In the vicinity of the waist on the back frame unit 30, as illustrated in FIG. 5, it is of course possible to provide a lumbar support 80 as necessary.

According to this embodiment, the side frames 11, 11 of the cushion frame unit 10 have the outer plate-shaped frames 111, 111 and the inner plate-shaped frames 112, 112. Moreover, the left side frame 11 is supported by the truss support part formed of the nodes of the shaft member 152a, the fifth beam 125, and the third beam 123, the rear link 152 and the sub-link 154 which are inter-node connecting parts for them, and the inter-node connecting part (particularly, the reinforcing link 155) between the third beam 123 and the fifth beam 125, and the right side frame 11 is supported by the quadric crank chain mechanism formed of the front link 151, the rear link 152, the upper frame 42 of the slider 40A, the right side frame 11 itself, and the driving link 153. Thus, rigidity and strength which allow to sufficiently endure a force in the forward and backward direction can be exhibited by this truss support part and the quadric crank chain mechanism. Therefore, this structure is capable of transmitting in a manner dispersed to the front, back, left and right, a force until reaching the seat slide device 40, makes it possible to form the cushion frame unit 10, the reclining unit 20, the back frame unit 30, the seat slide device 40, and so on by using a thinner material than conventional ones, and is suitable for weight reduction and cost reduction. On the other hand, by the structure to join the respective units with bolts, thin materials can be overlapped with each other to enhance strength of necessary portions and solve defects of the thin materials, and moreover, the respective members have shapes substantially even in front and rear and left and right, allowing a force to be transmitted evenly to the seat slide device 40 with highest rigidity. In addition, since the easy deformation portion is set in the seat slide device 40, it excels in absorbing function of impact force.

Further, the lock mechanism 43 of the seat slide device 40 has the elastic lock member 430, and the attaching plate part 431 of the elastic lock member 430 is supported on the upper rails 42, 42. Then, the lock claws 433 formed on the operating plate part 432 of the elastic lock member 430 engage with the engaged parts of the upper rails 42, 42. Therefore, elasticity of the elastic lock member 430 operates on the upper rails 42, 42 and the lower rails 41, 41. That is, the elastic lock member 430 with high yield stress becomes an elastic fulcrum and elasticity thereof operates on the lower rails 41, 41 and the upper rails 42, 42, and thus the lower rails 41, 41 and the upper rails 42, 42 are substantially elastically deformable and able to absorb energy by vibration or impact force inputted particularly in the upward and downward direction. Further, in this embodiment, the upper rails 42, 42 and the lower rails 41, 41 are formed of the thin material with a predetermined thickness or less, and the high-rigidity parts are provide in the predetermined portions as described above. Moreover, the reinforcing plate-shaped members 415, 415 are layered on both ends of the lower rails 41, 41. Therefore, the reinforcing plate-shaped members 415, 415 on both ends and the high-rigidity parts become what are called support parts, and elasticity of particularly the elastic lock member 430 operates on other portions, including the easy deformation portion, which are easily deformable relative to the support parts. Thus, the upper rails 42, 42 and the lower rails 41, 41 consequently function as an elastic member in their entirety, and has a high effect to absorb a biased load applied to the elastic lock member 430, the upper rails 42, 42, and the lower rails 41, 41 while elastically deforming. Further, these members elastically deform corresponding to a vibration input, and thus the upper rails 42, 42 and the lower rails 41, 41 consequently exhibit a function as a vibration absorbing member, which contributes to improvement in vibration absorbing characteristic of the entire vehicle seat 1 including the seat slide device 40.

Further, by functioning like an elastic member in their entirety, when there is a manufacturing error in the both, or when partial wear as described above occurs in the lower rails 41, 41, the upper rails 42, 42 and the lower rails 41, 41 can absorb them by an elastic deformation, reduce rattling and friction loss, and realize smooth movement. Note that preferably the elastic lock member 430 is provided in a substantially center part in the longitudinal direction of the upper rails 42, 42 so as to be the above-described elastic fulcrum for the upper rails 42, 42 and the lower rails 41, 41 to efficiently exhibit elasticity. That is, the substantially center part in the longitudinal direction of the upper rails 42, 42 becomes the center of the elastic deformation, and thus operations such as absorption of a bias load, reduction of friction, absorption of vibration, absorption of impact force, and the like are performed smoothly without any bias.

Moreover, in the back frame unit 30, since the part higher than the disposition positions of the reclining mechanism parts 23, 23 of the reclining unit 20 is made to easily deform, this deformation can reduce damage to the human body by a force operating on the back frame unit 30 in the forward and backward direction in particular.

Note that the lower rails 41, 41 used in the above embodiment are elastically deformable by operation of elasticity of the elastic lock mechanism 43, but the lower rails 41, 41 themselves can be formed of a spring steel. Also in this case, vibration absorbing, absorption operation of impact force, and so on similar to above ones can function, but by forming the lower rails 41, 41 themselves from a spring steel, setting of the high-rigidity parts to be a fulcrum of elastic deformation and the reinforcing plate-shaped members can be made unnecessary, making the structure more simple. As the spring steel in this case, for weight reduction it is preferred to use a thin material with a plate thickness in the range of 1.0 mm or less, preferably in the range of 0.6 to 1.0 mm. Further, it is also possible to use a high-tensile steel of 780 MPa or more as the lower rails 41, 41. In this case, by using the thin material with a plate thickness in the range of 1.0 mm or less, preferably in the range of 0.6 to 1.0 mm, the above-described elasticity of the elastic lock member can be operated. Further, by using such a high-tensile steel, the above-described heat treatment step for the open cross section part can also be omitted.

FIG. 45 to FIG. 49 are exploded perspective views illustrating a vehicle seat 800 according to another embodiment of the present invention. This vehicle seat 800 is the same as the above embodiment in structure of a cushion frame unit 810 but does not have the independent reclining unit, and a reclining part 820 is provided on a back frame unit 830.

The reclining part 820 has cushion brackets 821, 821 similar to those of the above-described embodiment, and the cushion brackets 821, 821 are joined to outer plate-shaped frames 811a, 811a of side frames 811, 811 of a cushion frame unit 810 with bolts 8211.

Inside the cushion brackets 821, 821, reclining mechanism parts (same structure as the reclining mechanism parts denoted by symbol 23 in FIG. 25) having a gear, a returning spring and so on similar to those of the above-described embodiment are disposed, and the left and right reclining mechanism parts are coupled by a coupling shaft 825. A cushion side attaching member 8232 (of the same structure as the cushion side attaching member denoted by symbol 232 in FIG. 25) of the reclining mechanism part is coupled to the cushion brackets 821, 821. Since it does not have the back bracket as in the above-described embodiment, the back side attaching members (of the same structure as the back side attaching members denoted by symbol 231 in FIG. 25) of reclining mechanism parts 823, 823 are directly coupled to side frames 831, 831 of the back frame unit 830.

The back frame unit 830 has side frames 831, 831 formed of a thin plate-shaped member similar to that of the above-described embodiment and having a flange projecting inward on a peripheral edge, and an upper frame structural part 832 disposed across upper parts of the side frames 831, 831. However, as in the above-described embodiment, it is not a structure in which the side frames 31, 31 and the coupling frame part 321 are bent integrally in a substantially U shape from a thin steel plate. The side frames 831, 831 and the upper frame structural part 832 are formed from other members.

The side frames 831, 831 have a lower part coupled to the back side attaching members of the reclining mechanism parts 823, 823 as described above. Further, in ranges close to lower portions from the vicinities of substantially center parts in a length direction (upward and downward direction) of the side frames 831, 831, reinforcing side frames 834, 834 constituted of a thin plate-shaped member of steel or the like similar to above ones and having a flange which is a peripheral edge bent outward are disposed so that flange sides face respective inner surfaces of the side frames 831, 831. Thus, the ranges close to the lower portions from the vicinities of the substantially center parts in the length direction of the side frames 831, 831 consequently form a closed cross-sectional shape, and rigidity of these ranges becomes high. Therefore, when a predetermined impact force is applied, in the side frames 831, 831, ranges of upper parts from boundaries with the reinforcing side frames 834, 834 become easily deformable, exhibiting a function to absorb energy accompanying an impact force.

The upper frame structural part 832 is constituted of a thin material similar to the above one, and has an upper pipe member 8321 bridged across upper portions of the side frames 831, 831 and an upper fitting frame 8322 made of synthetic resin having in a lower portion a fitting part 8322a fitted to this upper pipe member 8321.

The upper fitting frame 8322 is formed of a pair of guide holes 8322b, 8322b penetrating in the upward and downward direction, and a pair of head rest poles 851, 851 of a head rest 850 are inserted through the guide holes 8322b, 8322b. Note that a structure of a height adjusting mechanism of the head rest poles 851, 851 is the same as that of the first embodiment illustrated in FIG. 28 to FIG. 30.

Further, the back frame unit 830 is provided with a lumbar support 880. This lumbar support 880 has an S-shaped spring member 881 bridged across the side frames 831, 831 and support plate-shaped frames 882, 882 provided bilaterally symmetrically with a center of this spring member 881 being a boundary. Note that the structure of the lumbar support 880 is not limited to this, and ones of various types can be used. Further, in this embodiment, a wire-shaped spring member 890 as a back support member supporting a back cushion member 70 is provided to be located between the side frames 831, 831, the wire-shaped spring member being formed in a substantially U shape, in which both ends 891a, 891a on an open side of opposing side portions 891, 891 are engaged in front of fitting positions of the upper pipe member 8321 in the upper fitting frame 8322, and a coupling side 892 is disposed so that it is located on a lower portion of the back frame unit 830 across the lumbar support 880.

Also in this embodiment, although not provided with the independent reclining unit, the cushion brackets 821, 821 of the reclining part 820 provided on the back frame unit 830 are structured to be coupled to the outer plate-shaped frames 811a, 811a in the side frames 811, 811 of the cushion frame unit 810 with the bolts 8211. Further, it is also the same that the cushion frame unit 810 is supported by the combination of the truss support part and the quadric crank chain mechanism. Therefore, a load of the back applied to the back frame unit 830 is mainly transmitted to upper rails 842, 842 and lower rails 841, 841 of a seat slide device 840 through the outer plate-shaped frames 811a, 811a via the cushion brackets 821, 821, and a load from the buttocks to the thighs applied via an internal cushion member 862 of a cushion member 860 of the seat cushion part is mainly transmitted to the upper rails 842, 842 and the lower rails 841, 841 of the seat slide device 840 via a first beam 812a to a third beam 812c, inner plate-shaped frames 812b, 812b and the outer plate-shaped frames 811a, 811a. That is, it is a structure able to disperse an applied force in front and rear and left and right, and thus can be constituted of the thin material. Other operations and effects are the same as those of the above embodiment.

Note that in this embodiment, the ends 891a, 891a of the wire-shaped spring member 890 are engaged on a front side of fitting positions of the upper pipe member 8321 in the upper fitting frame 8322. Therefore, when the back of the seated person is pressed against the seat back part 1B by an impact force, the back cushion member 70 presses the opposing side portions 891, 891 of the wire-shaped spring member 890 to curve them backward. Thus, acceleration occurring in the head and upper body of the seated person is reduced, and the impact is alleviated. Further, by the curve of the opposing side portions 891, 891, the ends 891a, 891a are relatively pushed out forward, and thus in the upper fitting frame 8322, an upper edge thereof pivots forward and a lower edge pivots backward about the upper pipe member 8321. Accompanying this, in the head rest poles 851, 851 supported by the upper fitting frame 8322, a higher portion is consequently pushed out more forward, and thereby a displacement of the head of the seated person can be followed and an impact to the head can be alleviated (see FIG. 53).

Further, since this embodiment is structured such that the upper frame structural part 832 is disposed by fitting the upper fitting frame 8322 to the upper pipe member 8321, there are advantages that an assembly step can be simplified and manufacturing costs can be reduced as compared to the upper frame structure part 32 of the above embodiment, in which the resin member 322 for reinforcement is fitted inside the coupling frame part 321 and between the pair of flanges projecting inward separately in the width direction in boundary portions between the pair of side frames 31, 31 and the coupling frame part 321, which are adjacent to the coupling frame part 321.

FIG. 50 to FIG. 53 are views illustrating still another embodiment of the present invention. This embodiment has substantially the same structure as the embodiment illustrated in FIG. 45 to FIG. 49, but differs in that instead of the wire-shaped spring member 890 as the back support member, S-shaped spring members (hereinafter "vertical direction S springs") 890A, 890A as a back support member are provided in the upward and downward direction between a front side of engaging positions of the upper pipe member 8321 in the upper fitting frame 8322 and the support plate-shaped frames 881, 881 of the lumbar support 880 (see FIG. 52(b) and FIG. 53).

Figure 53:
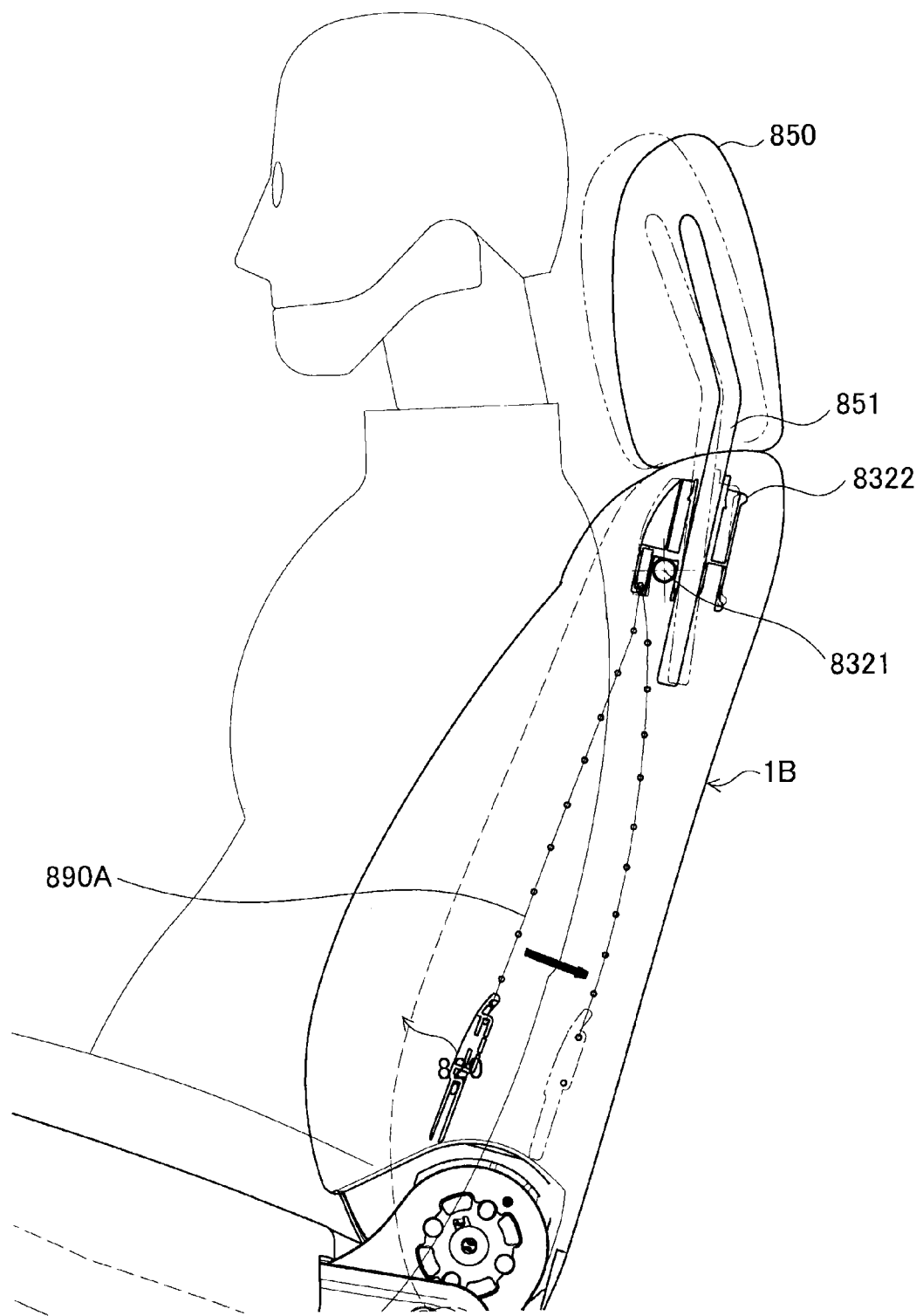
[FIG. 53]

By having the vertical direction S springs 890A, 890A, a contact area with the back cushion member 70 increases and moreover an elasticity operating area increases than in the case where the wire-shaped spring member 890 is used, and thus effects of acceleration reduction of the head and the upper body of the seated person and reduction of impact energy are high. Further, as illustrated in FIG. 53, when the back of the seated person is pushed in by impact, the vertical direction S springs 890A, 890A displace backward together with the lumbar support 880, and the upper fitting frame 8322 with which upper ends of the vertical direction S springs 890A, 890A are engaged on the front side is displaced about the upper pipe member 8321 in a direction to rotate forward and downward. Thus, in the head rest poles 851 and the head rest 850 supported on the upper fitting frame 8322, a higher portion is displaced more forward, that is, in a direction to be close to the head of the seated person, and thus an impact to the head at a time of impact can be alleviated. This point is the same when the wire-shaped spring member 890 is used, but the elasticity operating area is larger and thus such a function can be exhibited more significantly when the vertical direction S springs 890A, 890A are used.

FIG. 54 to FIG. 58 are views illustrating still another embodiment of the present invention. This embodiment has substantially the same structure as the embodiment illustrated in FIG. 50 to FIG. 53, but differs in the structure of the upper frame structural part 832. Specifically, two pipes, a first upper pipe 8323 and a second upper pipe 8324 are bridged vertically across upper portions of the side frames 831, 831 of the back frame unit 830, and an upper fitting frame 8325 made of synthetic resin is attached from a front side of the first upper pipe 8323 and the second upper pipe 8324. The upper fitting frame 8325 is formed with an open rear face, and has a fitting part 8325a in an upper portion in which the first upper pipe 8323 is fitted, and has an insertion hole 8325b through which the second upper pipe 8324 is inserted. An actual assembly is performed such that, for example, the first upper pipe 8323 is bridged across the side frames 831, 831 in advance, then the upper fitting frame 8325 is disposed by fitting the first upper pipe 8323 in the fitting part 8325a, and then the second upper pipe 8324 is inserted through the insertion hole 8325*b* from one side frame 831 side. Thereafter, a first leaf spring 8326 formed in a shape having an annular part 8326*a* which can hold the first upper pipe 8323 inside is inserted toward the front side from the rear side to hold the first upper pipe 8323 by the annular part 8326*a*, and projections 8326*b*, 8326*b* formed to project on a front end of the annular part 8326*a* and biased in a direction to open from each other are engaged with the upper fitting frame 8325 (see FIG. 57(*a*), (*b*)).

Figure 57:
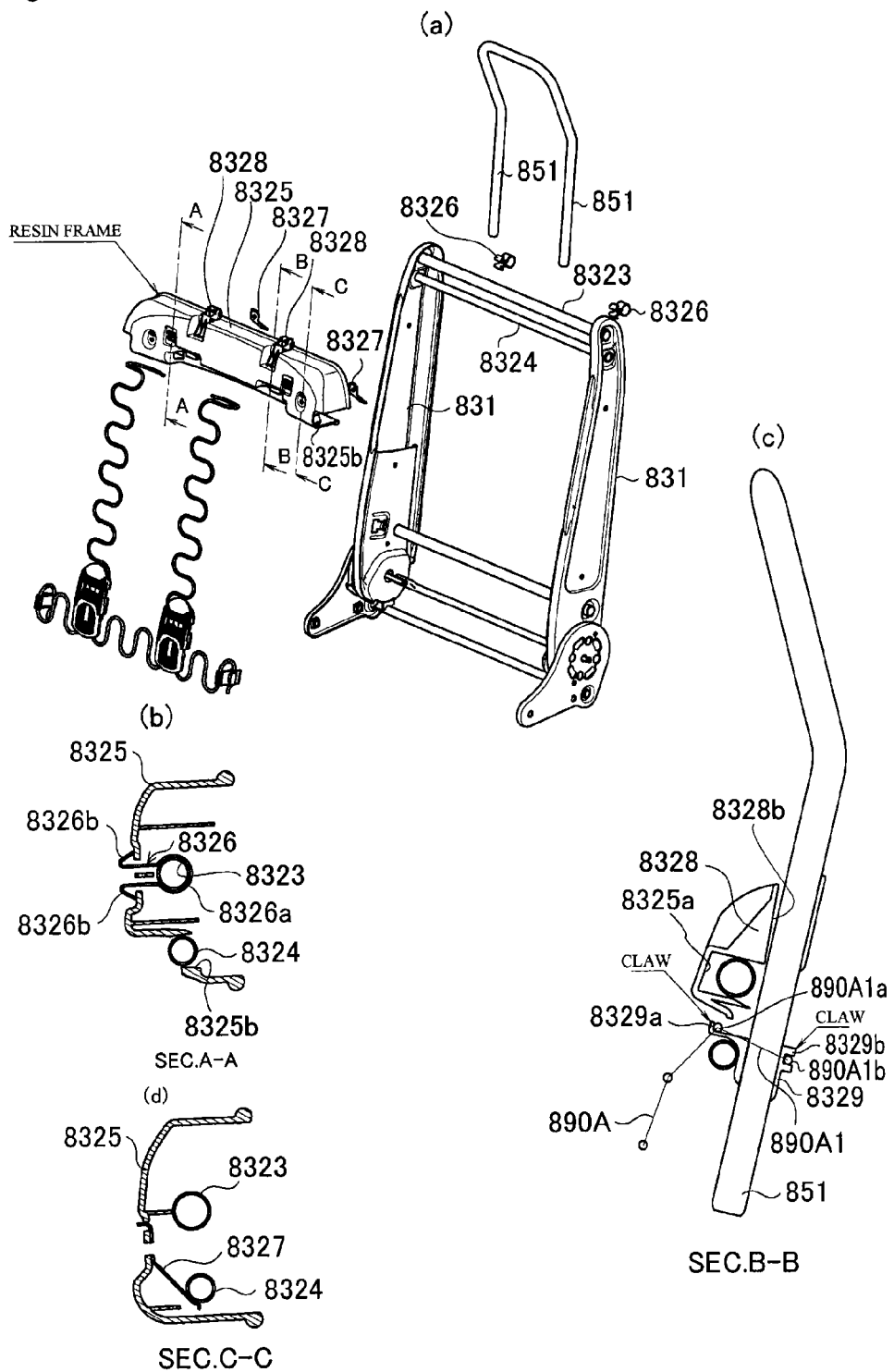
[FIG. 57]
Figure 58:
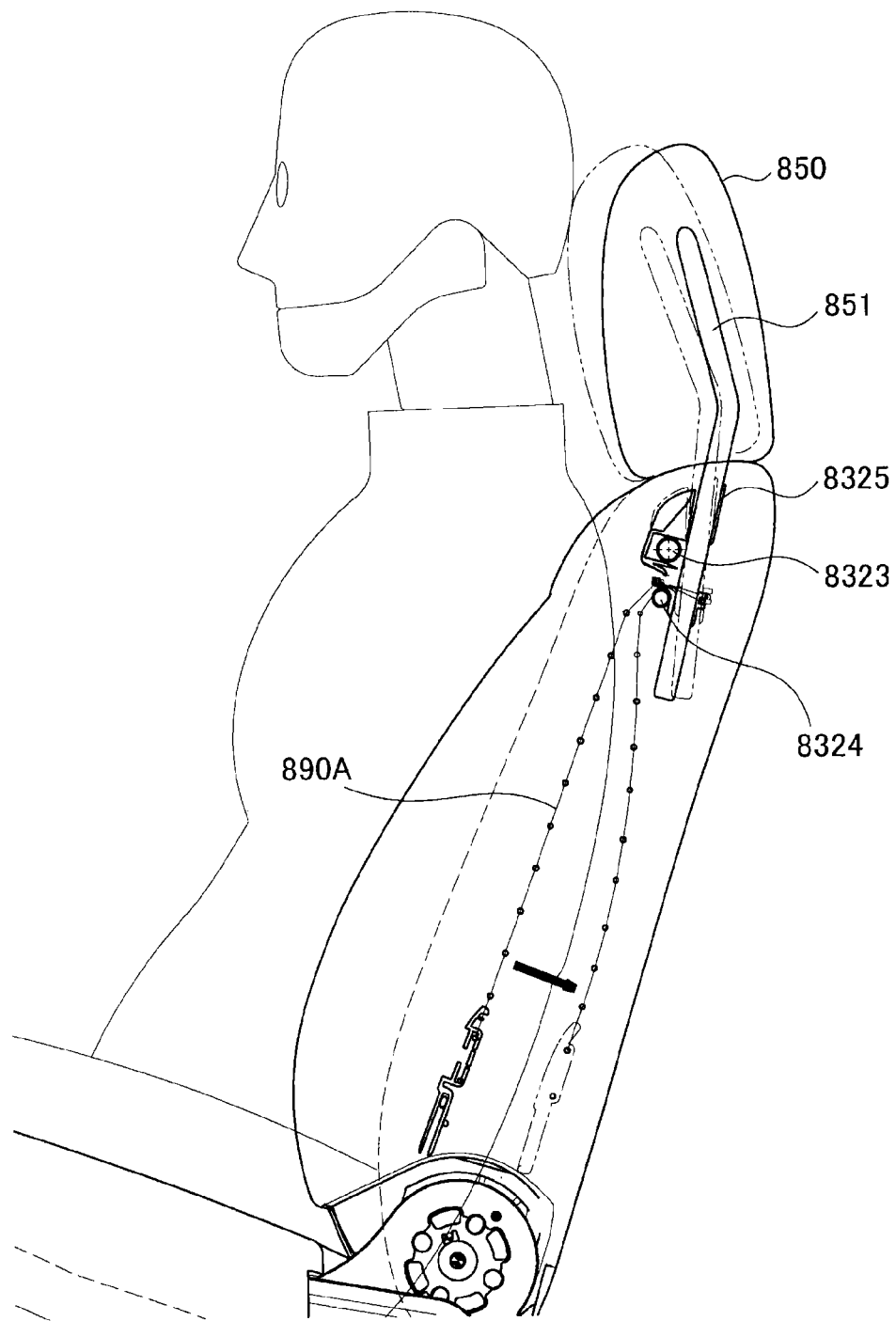
[FIG. 58]

Further, a second leaf spring 8327 is disposed to stride across the upper fitting frame 8325 and the second upper pipe 8324 (see FIGS. 57(*a*), (*d*)). The second leaf spring 8327 is a returning spring which deforms and applies a rotational force to return the upper fitting frame 8325 to its original state when an upper edge of the upper fitting frame 8325 pivots forward and a lower edge pivots backward about the first upper pipe 8323, as illustrated in FIG. 58.

Figure 56:
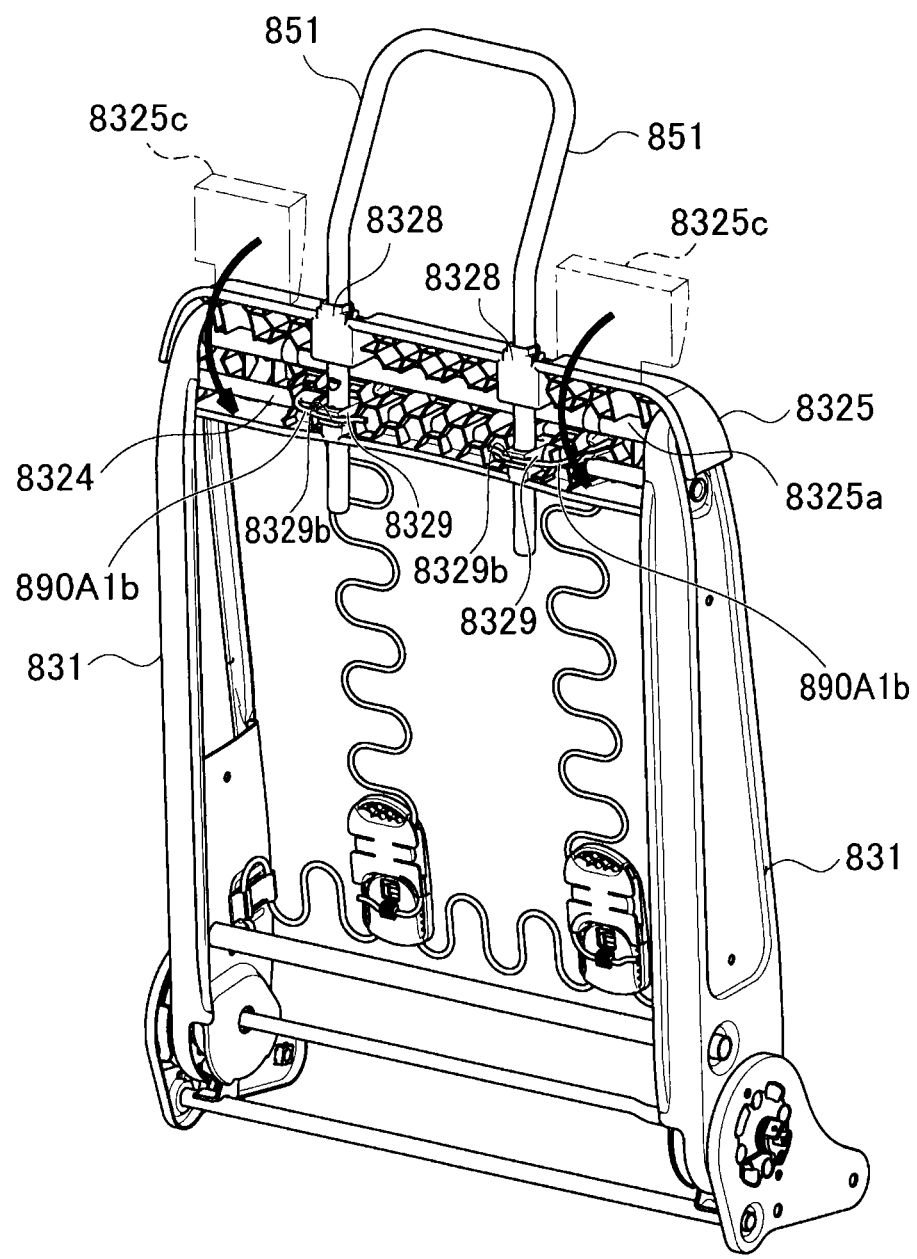
[FIG. 56]

The upper fitting frame 8325 is provided integrally with upper side guide parts 8328, 8328 on an upper side having guide holes 8328*b*, 8328*b* through which the head rest poles 851, 851 are inserted (see FIG. 56, FIG. 57(*c*)).

Further, similarly to the embodiment of FIG. 50 to FIG. 53, the vertical direction S springs 890A, 890A are disposed as spring members which are the back support member in this embodiment. However, upper parts 890A1, 890A1 of the vertical direction S springs 890A, 890A are bent backward, and these bent upper parts 890A1, 890A1 are engaged with outer peripheries of lower side guide parts 8329, 8329, which are formed below the upper side guide parts 8328, 8328 for the head rest poles 851, 851 and have guide holes communicating with the guide holes 8328*b*, 8328*b* of the upper side guide parts 8328. The lower sides of the head rest poles 851, 851 are inserted in the lower side guide parts 8329, which have a front claw 8329*a* and a rear claw 8329*b* on an outer peripheral part, where a bent front side portion 890A1*a* of the upper part 890A1 of the vertical direction S spring 890A is disposed to engage with the front claw 8329*a*, and a rear side portion 890A1*b* is disposed to engage with the rear claw 8329*b* (see FIG. 55(*b*), FIG. 56, FIG. 57(*c*)).

According to this embodiment, when a force in a direction to push the back of the person into the seat back part is applied, the vertical direction S springs 890A, 890A are pushed in. Thus, the vertical direction S springs 890A, 890A displace the lower edge of the upper fitting frame 8325 backward, and thus the upper edge attempts to relatively displace forward and pivots about the first upper pipe 8323, and the head rest 850 displaces in a direction to get close to the person's head (displaces from a state of solid line to a state of two-dot chain line of FIG. 58). As a result, the head rest 850 gets close to the head, and thus injury suffered by the person when an impact force is received can be reduced. This point is the same as in the above embodiments, but in the case of this embodiment, the upper parts 890A1 of the vertical direction S springs 890A are disposed to turn around from the front side to the rear side on the lower sides of the head rest poles 851, 851. Thus, in movement when the head rest 850 displaces forward, while deformation of the lower side guide parts 8329, 8329 is restricted by the rear side portion 890A1*b* of the upper parts 890A1, 890A1 located on the rear side of the head rest poles 851, 851, the lower sides of the head rest poles 851, 851 are consequently buffered by elasticity of the upper parts 890A1, and thus the effect of alleviating impact force is high. Further, when a force to directly press the head rest 850 forward from the rear side is applied, similarly, an impact is alleviated by elasticity of the upper parts 890A1, 890A1 of the vertical direction S springs 890A, 890A turning around to the rear side. Moreover, when the force to displace the head rest poles 851, 851 and the head rest 850 forward is unloaded, as described above, the upper fitting frame 8325 pivots in a direction to return to its original position by elasticity of the second leaf spring 8327.

Figure 55:
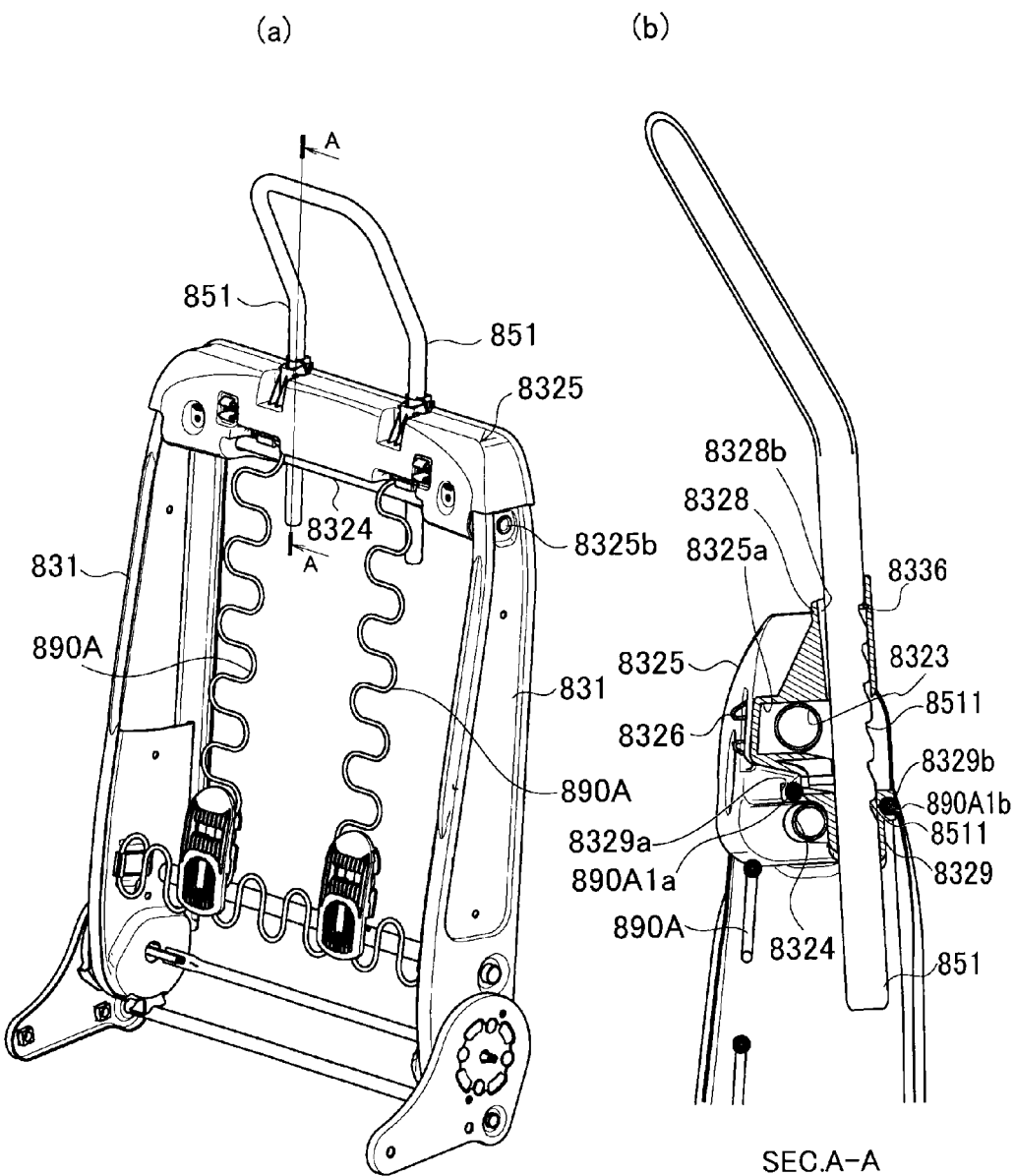
[FIG. 55] FIG. 55($a$) is a perspective view of the back frame unit of FIG. 54, and FIG. 55($b$) is an A-A cross-sectional view of FIG. 55($a$).

Here, the upper side guide parts 8328, 8328 and the lower side guide parts 8329, 8329 through which the head rest poles 851, 851 are inserted are integrally formed of synthetic resin as parts of the upper fitting frame 8325. Further, as illustrated in FIG. 55(*b*), in the head rest poles 851, 851, engaging trenches 8511, 8511 are engraved similarly to the above embodiments, with which lock plates 8336 of the height adjusting mechanism engage to be set at a predetermined height. Note that although not illustrated in the drawings, elastic members similar to that denoted by symbol 37 in FIG. 26 are disposed, and applies a bias in a direction in which the engaging trenches 8511 engage with the lock plate 8336. On the other hand, with the rear claw 83296 of the lower side guide parts 8329, as described above, the rear side portion 890A1*b* in the upper part 890A1 of the vertical direction S spring 890A is engaged. In this state, when the head rest 850 displaces relatively forward by that the vertical direction S spring 890A1*b* is pushed backward or the head rest 850 is pressed forward directly from the rear side, elasticity of the rear side portion 890A1*b* in the upper part 890A1 of the vertical direction S spring 890A operates on the head rest poles 851, 851 via the lower side guide parts 8329 made of synthetic resin, and buffers forward movement of the head rest 850 (backward movement of the lower sides of the head rest poles 851, 851). This point is the same as described above, but when forward movement of the head rest 850 by any cause occurs more largely, the lower sides of the head rest poles 851, 851 pivot more largely backward about the first upper pipe 8323. At this time, while the head rest poles 851, 851 and the vertical direction S springs 890A are both made of metal, the lower side guide parts 8329 located between the both are made of synthetic resin, and thus the rear side portions 890A1*b* of the vertical direction S springs 890A penetrate through the lower side guide parts 8329 and engage with one of the engaging trenches 8511 engraved in the head rest poles 851, 851. Therefore, if a force to displace the head rest 850 forward (force to pivot the lower sides of the head rest poles 851, 851 backward) is a predetermined force or more and is so large as to destroy the lower side guide parts 8329, according to this embodiment, elasticity of the upper parts 890A1 of the vertical direction S springs 890A can operate on the lower sides of the head rest poles 851, 851, to thereby buffer the movement thereof.

Note that although the upper parts 890A1 of the vertical direction S springs 890A are wound around from the front side to the rear side of the head rest poles 851, 851 in this embodiment, it will suffice that part of the vertical direction S springs 890A is located on the front side and the rear side sandwiching the head rest poles 851, 851, and of course the way of disposing them is not limited at all.

Further, in this embodiment, since the second upper pipe 8324 is disposed, rigidity and strength of the entire back frame unit 830 become higher than in the case where the pipe of the above-described embodiments is one, and thus it can endure a higher impact force.

The other structure is the same as the above embodiments, but as illustrated in

Figure 54:
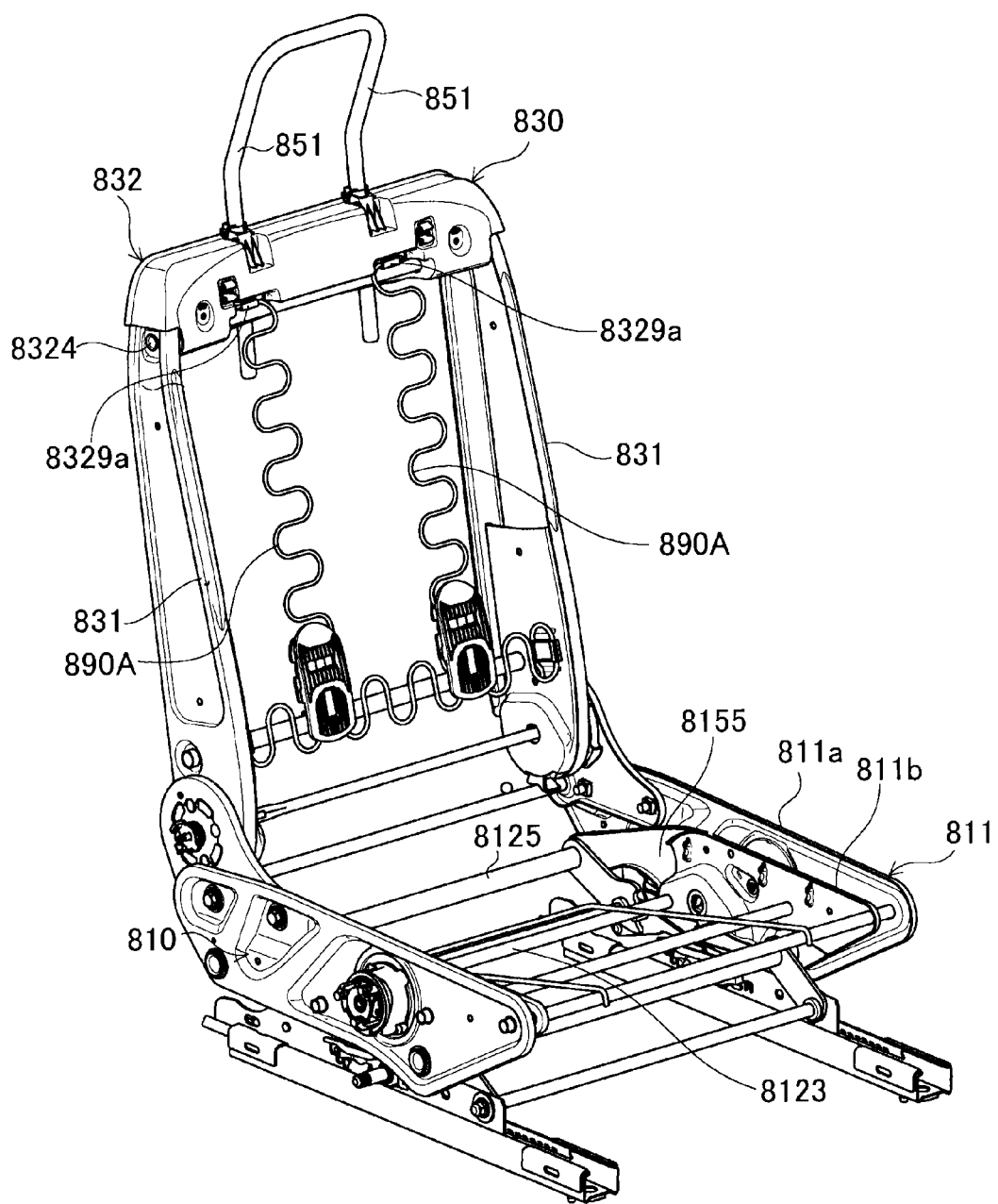
[FIG. 54]

FIG. 54, as a disposition example of the reinforcing link 8155 constituting the truss support part supporting the side frame 811 on one side of the cushion frame unit 810, there is illustrated a mode of bridging across a fifth beam 8125 to which another end of a rear link 8152 is bridged and a third beam 8123 located between an outer plate-shaped frame

8111a and an inner plate-shaped frame 811b. This reinforcing link 8155 functions as an inter-node connecting part between two beams similar to the reinforcing link 155 layered on the outer surface of the outer plate-shaped frame 111 illustrated in FIG. 19 and so on.

Note that as indicated by two-dot chain lines in FIG. 56, in a rear surface opened in the upper fitting frame 8325, after it is assembled, preferably, a cover part 8325c covering the rear surface is integrally shaped.

Figure 59:
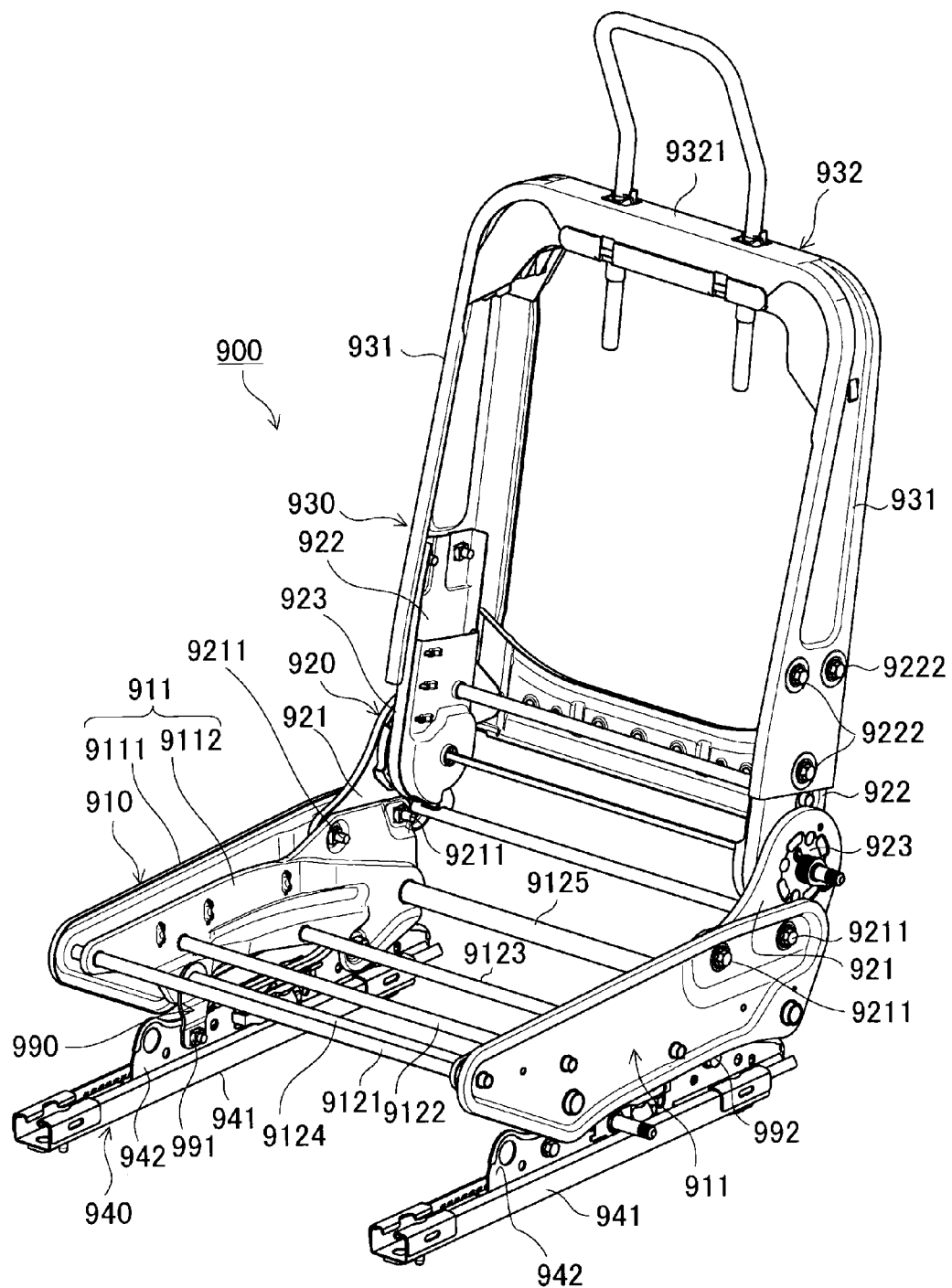
[FIG. 59]
Figure 60:
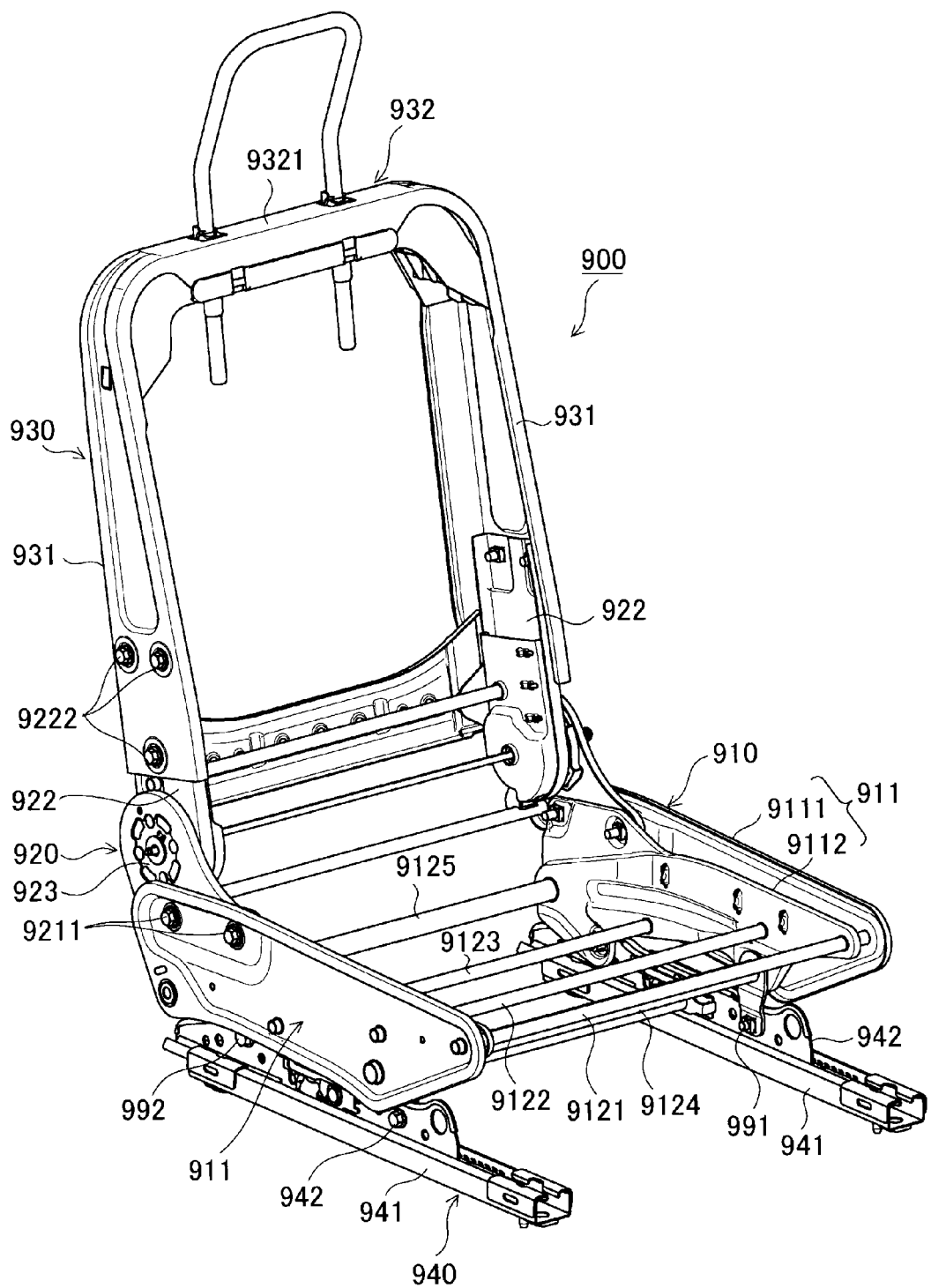
[FIG. 60]
Figure 61:
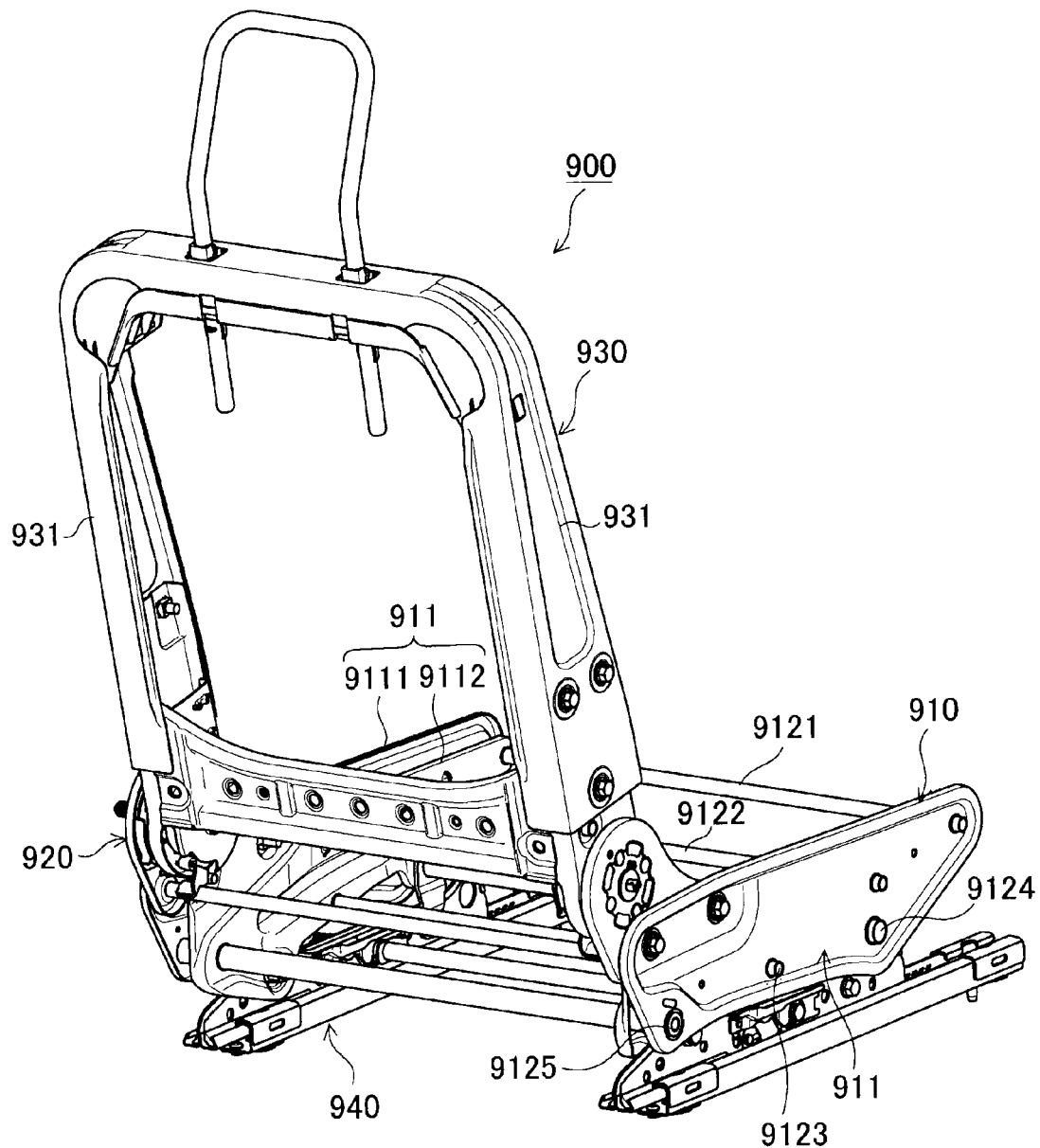
[FIG. 61]

FIG. 59 to FIG. 61 are views illustrating yet another embodiment of the present invention. A vehicle seat 900 according to this embodiment is the same as the embodiment illustrated in above FIG. 1 to FIG. 44 in that it has a cushion frame unit 910, a reclining unit 920, a back frame unit 930, a seat slide device 940, and so on, but differs from the embodiment in that the cushion frame unit 910 does not have the lifter mechanism part. The vehicle seat can be used for either of the driver's seat and the front passenger's seat, but since it does not have the lifter mechanism part, it is normally used for the front passenger's seat.

In the cushion frame unit 910, side frames 911, 911 are constituted of an outer plate-shaped frame 9111 and an inner plate-shaped frame 9112 which are thin plate-shaped members made of the same material as above, that is, metal, and in order to give high rigidity to them by using the outer plate-shaped frame 9111 and the inner plate-shaped frame 9112 constituted of this thin plate-shaped member made of metal as stringers, in the range where the outer plate-shaped frame 9111 and the inner plate-shaped frame 9112 overlap when seen from a side, plural beams 9121 to 9125 are disposed in the form to penetrate the two plate-shaped frames 9111, 9112 to give them the both end support on either side of left and right. This point is also the same as the above embodiments.

However, since the outer plate-shaped frame 9111 and the inner plate-shaped frame 9112 does not have the lifter mechanism part, unlike the above-described embodiments, they are overlapped in a wide range from the vicinity of a front edge to the vicinity of a rear edge, and not only first to fourth beams 9121 to 9124 but also the fifth beam 9125 penetrates the inner plate-shaped frame 9112 on the rear edge side and is bridged over to the outer plate-shaped frame 9111. Thus, rigidity of the cushion frame unit 910 becomes high.

The cushion frame unit 910 is such that, on a front edge side of upper rails 942, 942 of the seat slide device 940, coupling plates 990, 990 are bridged across the vicinities of front edges of the upper rails 942, 942 and a high-rigidity part of the fourth beam 9124 located immediately inside the inner plate-shaped frames 9112, 9112, and the both are fixed with bolts 991, 991. On rear edge sides of the upper rails 942, 942, lower portions of the rear edge sides of the inner plate-shaped frames 9112, 9112 are fixed via bolts 992, 992. These bolts 991, 991, 992, 992 become a coupling support part with respect to the upper rails 942. Therefore, on the rear side, a truss support part by the bolt 992, the third beam 9123 and the fifth beam 9125 is formed on the side frames 911, 911 on both sides, and on the front side, a truss support part by the bolt 911, the first beam 9121 and the second beam 9122 is consequently formed likewise on the side frames 911, 911 on both sides. That is, in this embodiment, the cushion frame unit 910 is consequently supported by plural truss support parts formed on both the left and right.

The reclining unit 920 has cushion brackets 921, 921 extending on a front side via reclining mechanism parts 923, 923 and back brackets 922 extending on an upper side or rear side. The cushion brackets 921, 921 are coupled to the side frames 911, 911 of the cushion frame unit 910 with bolts 9211. However, in this embodiment, the outer plate-shaped frame 9111 and the inner plate-shaped frame 9112 overlap with each other even where close to the vicinities of rear edges, the cushion brackets 921, 921 are inserted between the outer plate-shaped frame 9111 and the inner plate-shaped frame 9112, and the bolts 9211 are disposed to penetrate the three thin plate shaped members made of metal and coupled. Therefore, the reclining unit 920 is integrated securely with the cushion frame unit.

Further, the back brackets 922, 922 are coupled to respective side frames 931, 931 of the back frame unit 930 with bolts 9222, similarly to the embodiment illustrated in FIG. 9 to FIG. 25 and the like. Note that the structures of the reclining mechanism parts 923 of the reclining unit 920 and so on are the same as in the above-described embodiments. Further, it is also possible to structure such that, instead of the independent reclining unit 920, a reclining part as in the embodiment of FIG. 45 to FIG. 53 is provided on the back frame unit 930.

The back frame unit 930 is the same as in the above embodiments in that it has side frames 931, 931 formed of a thin plate-shaped member made of metal similar to that of the above embodiments and having a flange projecting inward on a peripheral edge, and an upper frame structure part 932 disposed across upper parts of the side frames 931, 931. Note that in FIG. 59 to FIG. 61, as in the embodiment illustrated in FIG. 26 to FIG. 28, the side frames 931, 931 and a coupling frame part 9321 are structured such that they are bent integrally in a substantially U shape from a thin steel plate, but it is of course possible to form the side frames 931, 931 and the upper frame structure part 932 from separate members as in the embodiment illustrated in FIG. 45 to FIG. 53.

Although the vehicle seat 900 of this embodiment does not have the lifter mechanism part, the side frames 911, 911 of the cushion frame unit 910 are constituted of two pieces of the outer plate-shaped frame 9111 and the inner plate-shaped frame 9112, and the plural beams 9121 to 9125 penetrating the plate shaped frames 9111, 9112 and giving the both end support by respective left and right ends are disposed. Therefore, similarly to the above embodiments, also when the thin plate shaped members made of metal are used, rigidity of the cushion frame unit 910 can be increased, and it is suitable for weight reduction.

Further, regarding a load applied to the back frame unit 930, the back brackets 921, 921 of the reclining unit 920 are coupled with bolts to both the outer plate-shaped frame 9111 and the inner plate-shaped frame 9112 and the load is transmitted to the both, and the point that the load applied to this back frame unit 930 and a load applied to the cushion frame unit 910 are both transmitted in a dispersed manner to the outer plate-shaped frame 9111 and the inner plate-shaped frame 9112 via the beams 9121 to 9125 and are consequently supported by the seat slide device 940 is the same as the above-described embodiments. Specifically, since it is a structure such that a force inputted in the forward and backward direction and a force inputted in the upward and downward direction are dispersed in front and rear and left and right by the plural truss support parts, the thin material can be used as the back frame unit 910, the reclining unit 920, and the back frame unit 930, which is suitable for weight reduction.

Note that the other operations such that, for example, an impact load to the head or the upper body can be reduced by a deformation of the back frame unit 930 and a movement of the upper frame structure part 932, or an impact force can be absorbed by a deformation of lower frames 941 of the seat slide device 940, and the like are the same as in the above embodiments.

Note that in the above-described structures, particularly the structure to allow adjusting height by tilting the head rest poles slightly forward and moving them up and down in this state and the structure to absorb an impact force by the upper frame structure part pivoting forward to displace the head rest forward both have necessary functions such as height adjustment and further help to alleviate an impact force despite their simple structures. Thus, of course, they are preferably employed in the vehicle seat of the present invention aiming at weight reduction, but can also be employed as a head rest and/or an upper frame structure part of other vehicle seats. Further, also the structure to use the cushion members divided outside and inside as a cushion member for a seat cushion part, dispose them on the woven fabric member, and cover them in a divided manner with the outer layer member to make the both relatively movable easily to thereby absorb vibrations easily, is of course preferred for the vehicle seat of the present invention aiming at weight reduction, but can also be employed in other vehicle seats.

Further, as described above, the lower rails 41, 41 are preferred to be structured such that the bottom wall parts 411, 411 have, rather than a flat surface, a part having an R-shaped cross-section formed in the vicinity of a corner on both ends in the width direction to have the stepped parts 411*a*, 411*a* projecting upward on both sides in the width direction, because even when they are formed of the thin material, when a load is applied via the rollers 416, 416 it is consequently supported by portions inclined in an obliquely upward and downward direction (vertically long cross-sectional portions) of the stepped parts 411*a*, 411*a*, and thus wear is difficult to occur. Further, the rollers 416, 416 are preferably formed to be substantially the same as the width (length in a direction along an axial center of the rollers 416 themselves) corresponding to the interval between the stepped parts 411*a*, 411*a*, or slightly wider than that. On the other hand, in addition to the stepped parts 411*a*, 411*a* and the parts 411*b*, 411*b* having an R-shaped cross-section in the vicinity of a corner on both ends in the width direction, as described in FIG. 62(*a*), the lower rails 41, 41 are preferred to be press formed into a shape in which a tensile force operates to make substantially center parts 411*c*, 411*c* in the width direction of the bottom wall parts 411, 411 of the lower rails 41, 41 have a shape expanding upward.

Figure 62:
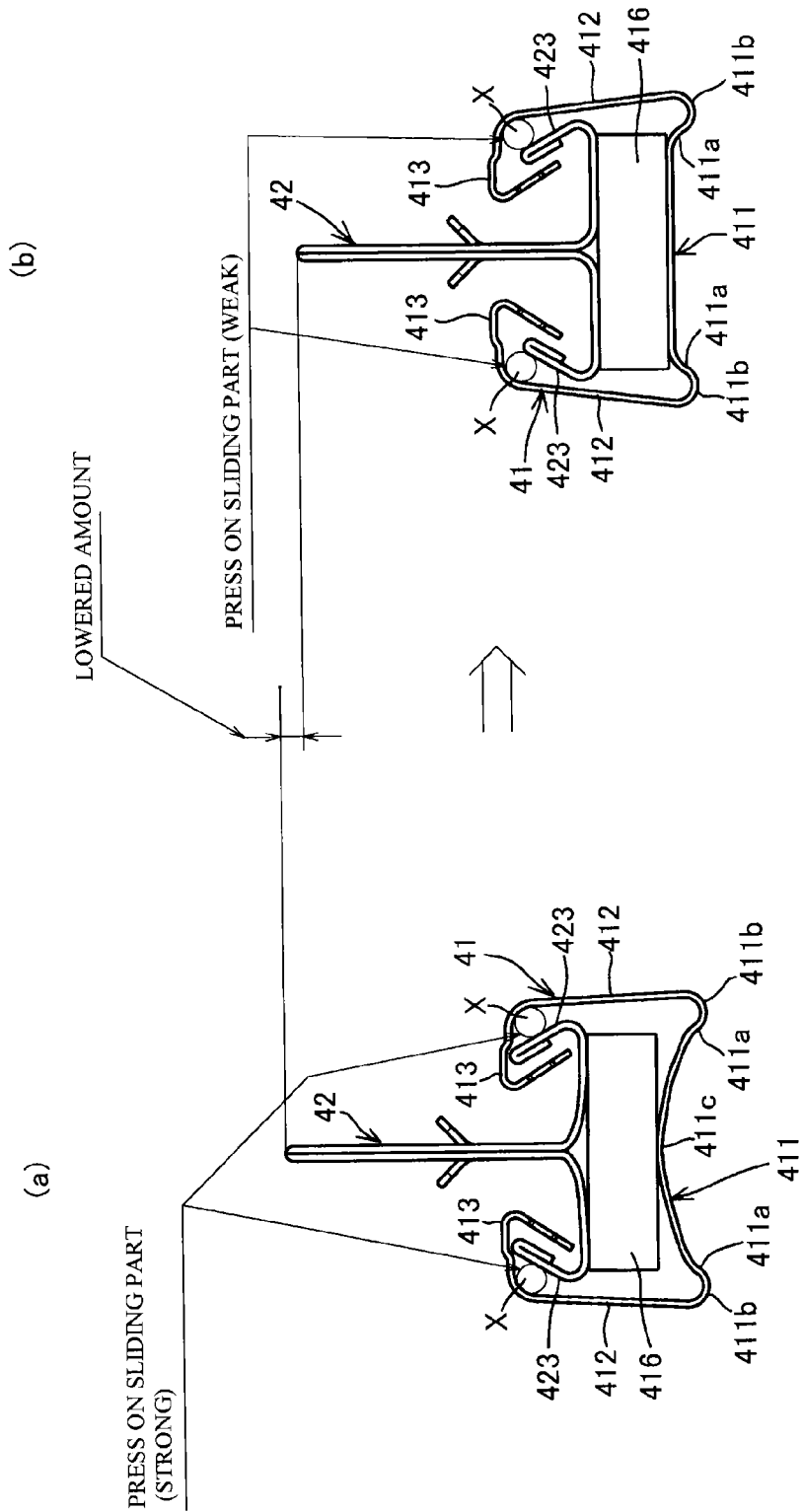
[FIG. 62] FIG. 62($a$) is a view illustrating a mode of giving a bottom wall part of a lower rail a tensional force which makes a substantially center part in a width direction expand, and FIG. 62($b$) is a view illustrating a state that a predetermined load is applied.

Thus, when a load is applied downward by the weight of the occupant, as illustrated in FIG. 62(*b*), a deformation occurs in a direction to lower positions of the substantially center parts 411*c*, 411*c* via the upper rails 42, 42 and the rollers 416, 416 and make the bottom wall parts 411, 411 flat. When this deformation occurs, since rigidity of the parts 411*b*, 411*b* having an R-shaped cross-section and the stepped parts 411*a*, 411*a* is relatively high, the side wall parts 412, 412 deform in a direction in which the upper wall parts 413, 413 of the lower rails 41, 41 close. Since the positions of the upper rails 42, 42 lower slightly, the balls X consequently contact with portions closer to upper portions of the upward oblique wall parts 423, 423 of the upper rails 42, 42 in the state of FIG. 62(*b*) than in the state of FIG. 62(*a*). Accordingly, since the upward oblique wall parts 423, 423 are inclined inward, a pressing force to the balls X becomes slightly weak, the balls X become easy to roll, friction is reduced, and sliding of the upper rails 42, 42 becomes more smooth. Therefore, with this structure, when sliding forward or backward is performed in a state that the occupant is riding, accompanying an elastic deformation of the cross-sectional shape of the lower rails 41, 41, friction with the balls X becomes rolling friction and thus they are easily movable in a sliding direction. When a force is further inputted in the upward and downward direction, the cross-sectional shapes of the lower rails 41, 41 move as if breathing, a concentrated load to one point becomes a dispersed load to multiple points, and thus it becomes a structure in which a surface pressure is dispersed and wear does not occur easily. Specifically, normally a Coulomb force increases accompanying increase in load mass, but this structure has a characteristic such that, since rolling friction occurs as described above by input of a load, the Coulomb force becomes small by the increase in load mass. Note that by this structure there is an advantage that friction during sliding can be made small by using a slider made of synthetic resin instead of the balls X.

On the other hand, when a load applied to the upper rails 42, 42 becomes small, the bottom wall parts 411, 411 of the lower rails 41, 41 attempt to restore to the shape in which the substantially center parts 411*c*, 411*c* expand. Therefore, by the structure applying such a tensile force to the bottom wall parts 411, 411 of the lower rails 41, 41, this restoring force can operate with respect to inputs of a large load and repetitive loads to prevent rattling and wear, and thereby high durability can be exhibited even with the thin material.

Figure 63:
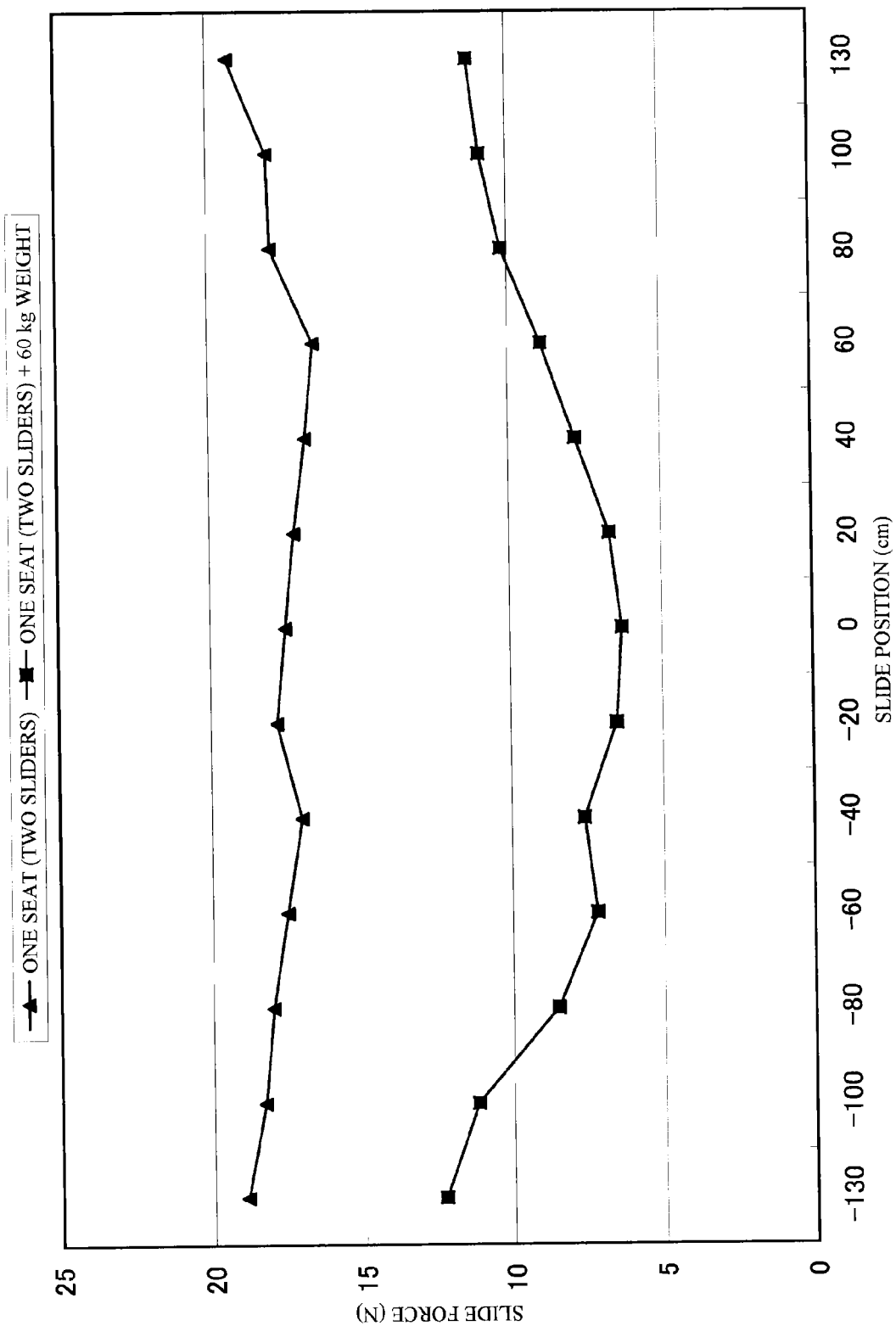
[FIG. 63]

Therefore, with this structure, as described above, when sliding forward or backward is performed in a state that the occupant is riding, an elastic deformation of the cross-sectional shape of the lower rails 41, 41 causes a change in clearance between the lower rails 41, 41 and the upper rails 42, 42, friction with the balls X thereby becomes rolling friction and thus they are easily movable, and resistance in a sliding direction can be suppressed very low. In FIG. 63, sliding forward and backward was performed and a sliding force thereof was studied in a state that the cushion frame unit is supported on the two sliders with respect to the case where the relation between the lower rails 41 and the upper rails 42 of the slider are in a state of FIG. 62(*a*) (state that the substantially center parts 411*c* in the width direction of the bottom wall part 411 of the lower rail 41 expands upward), and the case where a weight of 60 kg is mounted on the cushion frame unit and the relation between the lower rails 41 and the upper rails 42 of the slider is in a state of FIG. 62(*b*) (state that the bottom wall part 411 of the lower rails 41 is flat). Note that the lower rails 41 and the upper rails 42 used here are both steel materials with a thickness of approximately 1.0 mm and tensile strength of 590 MPa. Further, the elastic lock member 430 of the lock mechanism 43 uses a spring steel with a thickness of 0.8 mm. In FIG. 63, a slide position in the horizontal axis indicates a separation distance of sliding forward and backward from an intermediate position (0 mm) of a slidable length of the upper rails 42 with respect to the lower rails 41, and a slide force is a force at each measuring point where it is applied for sliding the upper rails at a constant speed relative to the lower rails.

The slide force when the weight of 60 kg was not mounted was between approximately 16 and 19 N, but when the weight of 60 kg was mounted, the slide force was approximately 6 to 12 N, where the friction resistance while sliding was largely reduced. Therefore, as described above, while sliding is smooth when the occupant is sitting on, the substantially center parts 411*c* in the width direction restore in the expanding direction when the load becomes small, and hence it can be seen that rattling and wear can be prevented.

Figure 64:
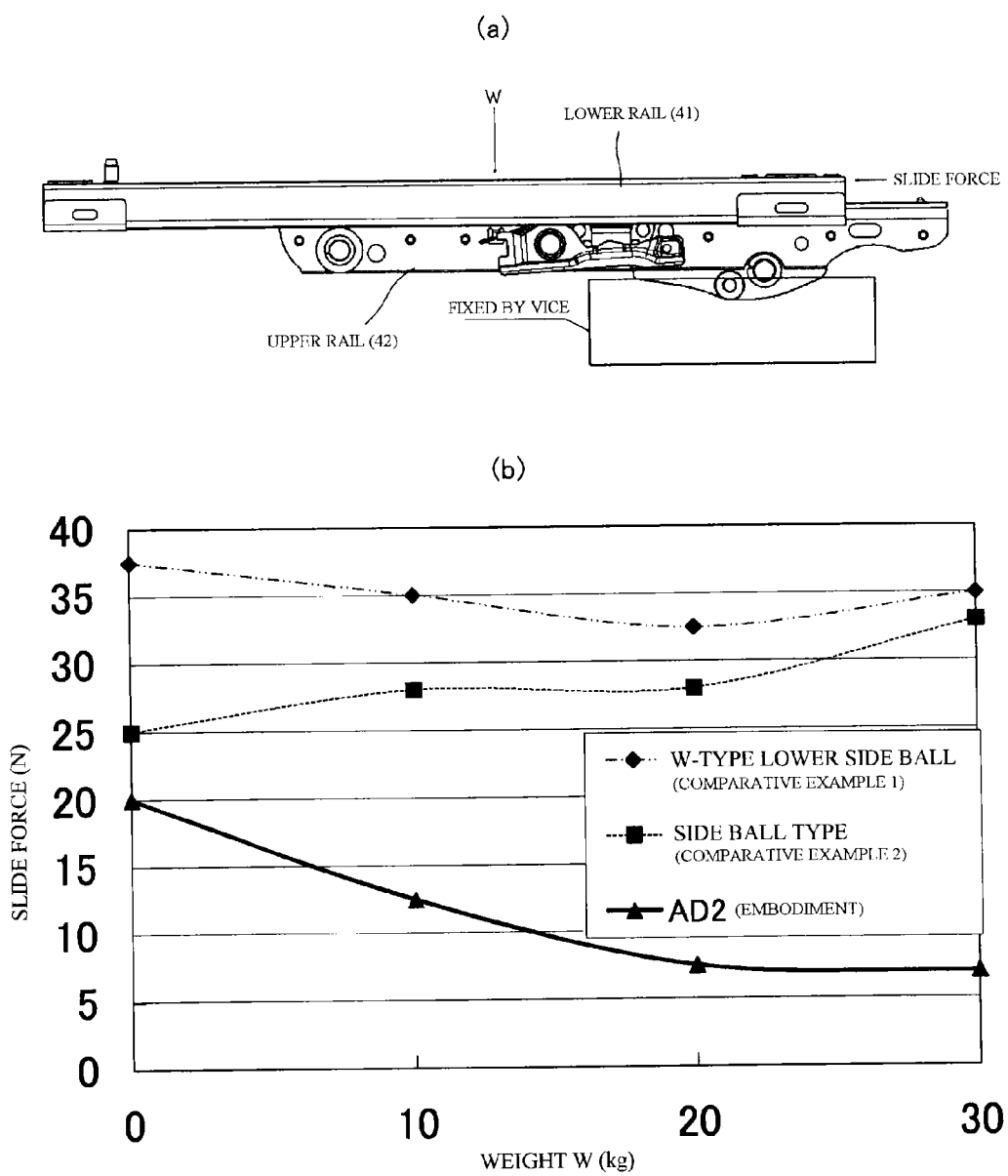
[FIG. 64] FIG. 64($a$) is a view for explaining a test method of slide forces of the seat slide device used in the embodiment and seat slide devices according to comparative examples, and FIG. 64($b$) is a diagram illustrating test results thereof.

Decrease in slide force (decrease in sliding resistance at a time of slide) was further measured as in FIG. 64. As illustrated in FIG. 64(*a*), the upper rail 42 was fixed on a vice so that the lower rail 41 is on an upper side, a weight was mounted on a rear surface of this lower rail 41, the lower rail 41 was moved relative to the upper rail 42, and a slide force when there is one slider was measured. A slide force was measured at a predetermined measuring position in each of a state that no weight is mounted on the lower rail 41 (0 kg), a state that a weight of 10 kg was mounted, a state that a weight of 20 kg was mounted and a state that a weight of 30 kg was mounted. Results are presented in FIG. 23(b). In the diagram, "embodiment" denotes data of a slider on one side of the seat slide device used in the test of FIG. 63. "Comparative example 1" and "comparative example 2" denote data of sliders on one side of seat slide devices employed in commercially available cars. Note that for the seat slide device of comparative example 1, the lower rail and the upper rail are formed of a high-tensile steel with tensile strength of 980 MPa and a plate thickness of approximately 1.4 mm, in which one formed of an ordinary steel with tensile strength of 590 MPa and a plate thickness of about 2.3 mm is used as the lock member of the lock mechanism, and for the seat slide device of comparative example 2, the lower rail and the upper rail are formed of an ordinary steel with tensile strength of 590 MPa and a plate thickness of about 1.8 mm, and one formed of an ordinary steel with tensile strength of 590 MPa and a plate thickness of about 2.3 mm is used as the lock member of the lock mechanism. Further, either of comparative example 1 and comparative example 2 does not have the parts 411*b* having an R-shaped cross-section on both sides of the bottom wall part 411 of the lower rail 41 as in this embodiment, and has a shape in which the substantially center part 411*c* in a cross section does not expand upward. Further, comparative example 1 is structured such that it has a cross-sectional shape of W in which balls for sliding are disposed on side faces of the lower rail, and comparative example 2 is structured such that it has a cross-sectional shape of W in which balls for sliding are disposed on bottom faces of the lower rail.

As illustrated in FIG. 64(b), the slider used in this embodiment decreases in slide force as the weight gets heavier such as 10 kg, 20 kg, 30 kg, whereas comparative example 2 increases in slide force as the weight gets heavier. First, in the case of comparative example 2, since the plate thickness of the lower rail and the upper rail is thick, a yield point of material is low and resistance in the slide direction changes due to a clearance with balls located between the both. Further, in either case, it is a structure such that the balls for sliding are provided to be located in trenches formed in a longitudinal direction of the lower rail or upper rail, and their positions in the cross-sectional direction do not change by relative movement of the lower rail and the upper rail. Specifically, in this embodiment, positions of the balls X in the cross-sectional direction change accompanying a load change as described above (see FIG. 62) and resistance in the slide direction is reduced, but such a thing would not occur in comparative example 2. Thus, the friction resistance increases accompanying increase in load, and resistance in the slide direction increases. On the other hand, comparative example 1 uses a high-tensile steel as the lower rail and the upper rail. The point that the positions of the balls for sliding do not change by a load is the same as in comparative example 2, but since the high-tensile steel is used, it attempts to absorb a load fluctuation by elasticity of a vertical wall part of the upper rail and side wall parts of the lower rail. Accordingly, the slide force of comparative example 1 does not have load dependency like comparative example 2 does, and is almost constant when the weight increases. However, since it is not a structure in which the cross-sectional shape of the lower rail 41 changes as in this embodiment (the bottom wall part 411 changes from an expanded shape to a flat shape as described above), a phenomenon that resistance in the slide direction decreases accompanying a load increase does not occur. Therefore, it can be seen that in this embodiment, as compared to the comparative examples, the occupant can perform a slide operation with a light force while remaining in a seated state.

(Experimental Examples)

Experiments simulating a front collision and a rear collision were carried out on a vehicle seat in which a cushion member is disposed and covered with an outer layer material on a seat frame obtained by assembling the cushion frame unit 810 and the back frame unit 830 according to the embodiment illustrated in FIG. 54 to FIG. 58.

Note that the vehicle seat is generally around 18 kg for the driver's seat, and the weight occupied by the seat frame therein is about 14 kg, but in the seat frame used in this experimental example was about 11 kg, which was about 3 kg lighter. Further, regarding the sliders, conventional products weigh about 1.3 kg per side, but one used in this experimental example was 0.9 kg.

The behavior of a human body at a time of front collision is as illustrated in the right figure of FIG. 65(*a*), and an experiment simulating the front collision was performed, in order to reproduce this behavior, by simultaneously applying a load of approximately 15 kN forward to each of a shoulder strap and a lap strap of the seat belt as in the left figure of FIG. 65(*a*), and by applying a load of about 20 times the seat weight obliquely forward and downward to the barycentric position of the seat cushion part.

The behavior of the human body at a time of rear collision is as illustrated in the right figure of FIG. 65(*b*), and an experiment simulating the rear collision was performed, in order to reproduce this behavior, by loading a moment of approximately 500 N·m or more around a seating reference point (R point) as illustrated in the left diagram of FIG. 65(*b*) by using a back pan.

Figure 66:
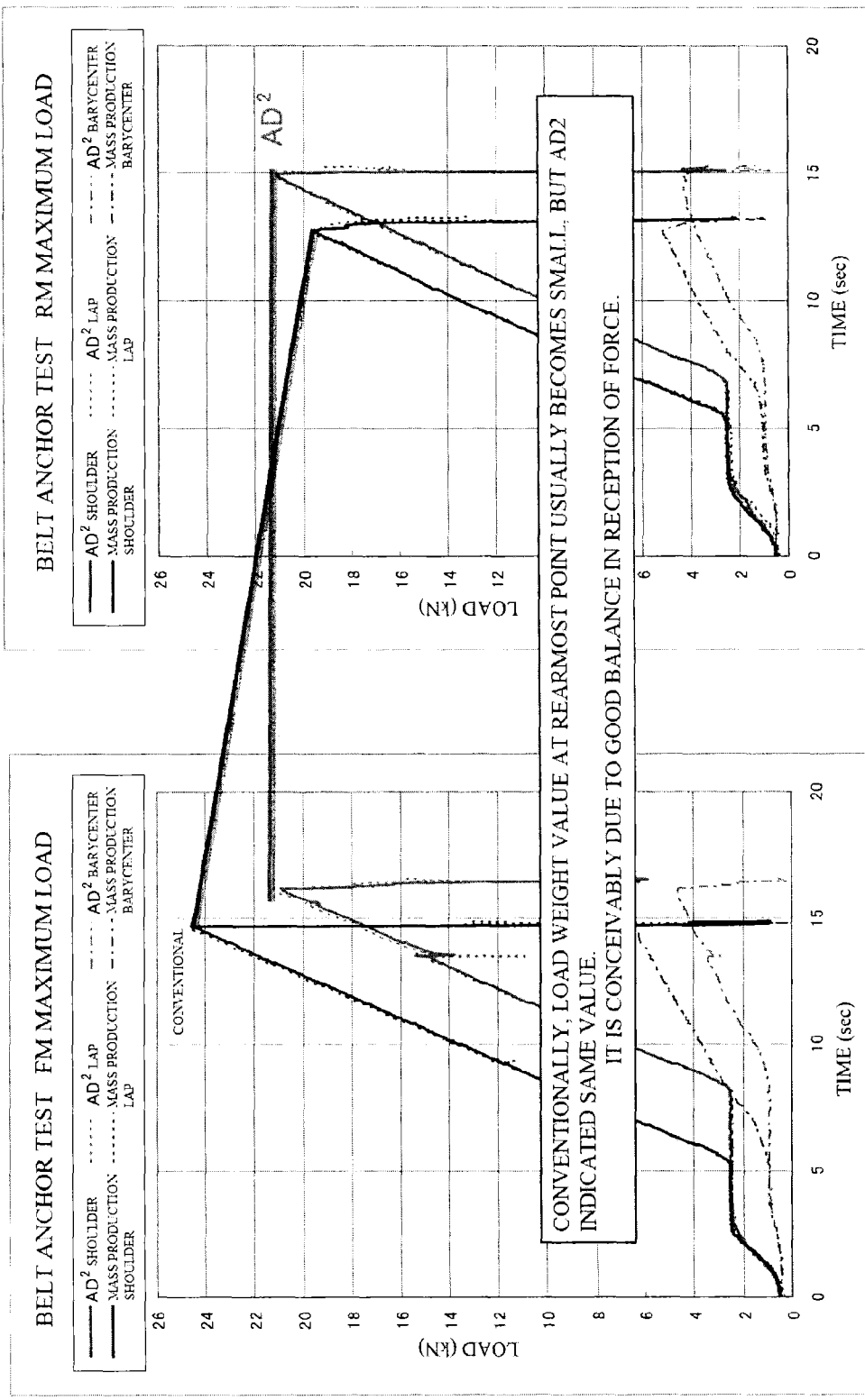
[FIG. 66]

Results of the experiment simulating the front collision are in FIG. 66, in which the left diagram is an experimental result when the seat is set to the front end position of the slider and the right diagram is an experimental result when it is set to the rear end position of the slider. In the diagram, "conventional" denotes data of a seat (seat frame weight of about 14 kg) for a driver's seat which is conventionally generally used, and "AD$^2$" denotes data of the seat (seat frame weight of about 11 kg) of the present invention. Normally, as in the seat indicated by "conventional", a withstand load value of the rear end position of the slider is smaller than at the front end position, but the both resulted in substantially the same withstand load value by "AD$^2$". This indicates that the structure of the present invention can receive a force in a good balance.

Figure 67:
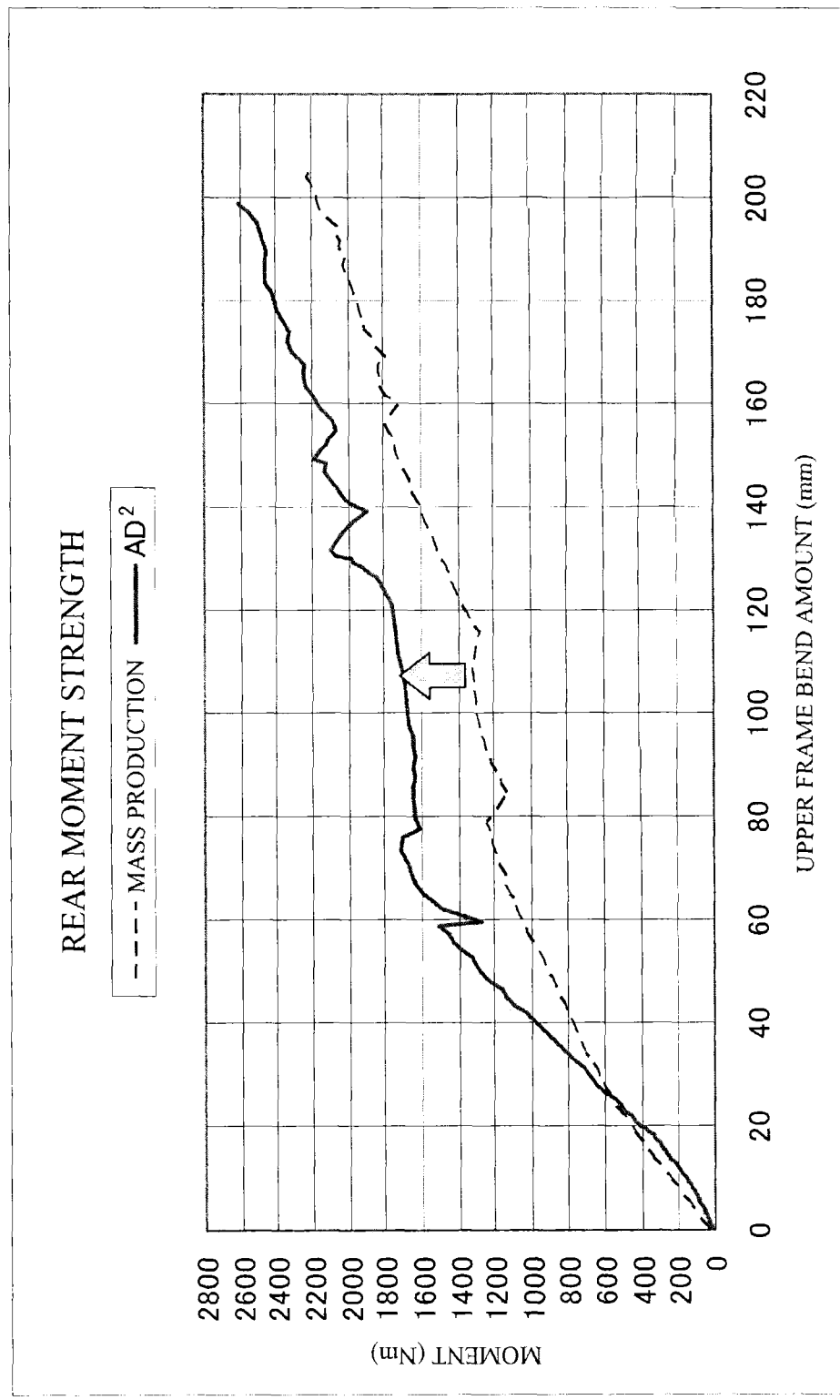
[FIG. 67]

Results of the experiment simulating the rear collision are in FIG. 67. As indicated in this diagram, in which "AD2" of the present invention, despite its lighter weight, has high rear moment strength than the "conventional" seat. This also indicates that the structure of the present invention can receive a force in a good balance.

Figure 68:
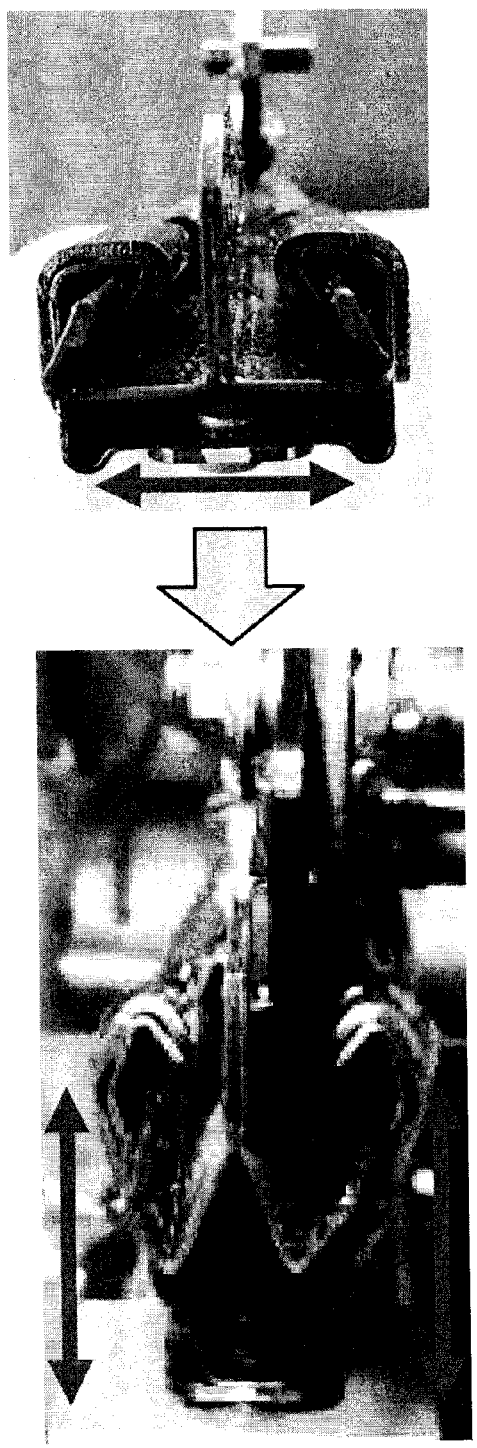
[FIG. 68]

FIG. 68 illustrates cross-sectional shapes of the slider when the experiment of simulating the front collision was performed. As compared to before the experiment, referring to symbols illustrated in FIG. 31 to FIG. 40, the lower rail 41 to which elasticity is added as described above deforms so that corners of the bottom wall part 411 and the side wall parts 412 and corners of the side wall parts 412 and the upper wall parts 413 deform to extend in a vertical direction and is closer to a flat shape. On the other hand, the upper rail 42 deforms in a direction in which the horizontal wall parts 422 become slightly vertical from horizontal, but it is not pulled out of the lower rail 41 and stays therein. That is, by such deformation of the lower rail 41 and the upper rail 42, despite its thinness and light weight, it can absorb energy by impact force.

From the above, in the structure of the present invention, transmission paths of force are apparent, the link structure which deflects a force to the paths is provided and the beam-stringer structure which receives a force in a good balance is included, individual members such as sliders receive a force by shear force on the basis of the symmetrical structure and the both-end support structure, and thus high withstand load performance can be exhibited despite its light-weight structure using a thin plate material.

Note that as described above, the seat slide device used in the present invention has the lower rail 41 formed from the thin material and has the parts 411*b* having an R-shaped cross-section on both sides of the bottom wall part 411 of the lower rail 41, preferably the substantially center part 411*c* in a cross section therebetween has a shape expanding upward, and the roller 416 is disposed on the bottom wall part 411 of the lower rail 41 in addition to the balls X disposed between the upper rail 42 and the lower rail 41. Thus, as described above, it has a characteristic of having a significantly low slide force as compared to general seat slide devices, but it additionally has characteristics as follows, which will be supplemented.

Specifically, the lock mechanism 43 has the elastic lock member 430 constituted of a thin spring steel. This elastic lock member 430 is such that the operating plate part 432 and the lock claws 433 are formed integrally on the attaching plate part 431 to the upper rail 42 as described above, and the lock claws 433 engage with engaged parts 414*a* constituted of holes or trenches formed in the lower rail 41. Specifically, the operating plate part 432 is biased in a direction to depart from the attaching plate part 431, and the lock claws 433 are constantly biased in a direction to engage with the engaged parts 414*a*. However, this biasing force of the lock claws 433 is due to that the elasticity operates on the operating plate part 432 in the direction to depart from the attaching plate part 431 formed integrally. If the operating plate part 432 having the lock claws 433 is not formed integrally with the attaching plate part 431, in order to bias the operating plate part 432 and the lock claws 433, for example, a shaft member is provided on a base end portion of the operating plate part 432, and a spring member for further biasing this shaft member by rotating is needed separately. As a result, resistance in the mechanical part for biasing the operating plate part 432 and the lock claws 433 generates structural damping. However, in the case of this embodiment in which the operating plate part 432 and the lock claws 433 are integrally formed with the attaching plate part 432, such structural damping will not be generated, and thus an engaging operation of the lock claws 433 by restoring force of the operating plate part 432 is performed quickly without any loss. Thus, when the lock claws 433 reach the positions of the corresponding engaged parts 414*a*, they are quickly biased in the engaging direction, and it is quite rare to become a pseudo-lock (or half lock) state of being stuck incompletely.

Further, since the elastic lock member 430 is thin, elasticity operates to the operating plate part 432 and the lock claws 433 in the forward and backward direction thereof, and the lock claws 433 bend easily. Thus, at a time of locking, the lock claws 433 can easily enter the engaged parts 414*a* while accompanied by bending, and this operation also helps to suppress the pseudo-lock.

Further, since the operating plate part 432 of the elastic lock member 430 attempts to open, the lock release member 434 is biased by this in a direction to pivot up and down about one end (see FIG. 39 and FIG. 40), and at a time of releasing locking it is pivoted downward to press the expanding part 432*a*, but at a time of locking it pivots upward to return to its original position when the operating hand is released. At this time, by using thin one also as the lock release member 434, inertial moment becomes small, and the rotation speed increases, helping to prevent the rotation movement from stopping at an incomplete position of the above-described pseudo-lock state. Therefore, as the member constituting the lock release member 434, preferably, one with a plate thickness of 1.8 mm or less, preferably one with a plate thickness in the range of 0.6 to 1.6 mm, more preferably one with a plate thickness in the range of 0.6 to 1.2 mm, furthermore preferably one with a plate thickness in the range of 0.6 to 1.0 mm is used.

Due to that the above-described slide force (friction resistance at a time of slide) is small, that the lock mechanism 43 is provided with the elastic lock member 430 constituted of a spring steel and engagement of the engaged parts 414*a* of the lock claws 433 is quickly performed, and further that a displacement in the forward and backward direction can be absorbed by the thin operating plate part 432 and the lock claws 433, and so on, the seat slide device (one in which a cross-sectional shape of the lower rail 41 is similar to FIG. 62) employed in the above embodiments basically has a structure which infrequently becomes the pseudo-lock (or half lock) state that the lock claws 433 could not enter the engaged parts 414*a* and become stuck incompletely, and if such a pseudo-lock state had occurred, it has a characteristic that the pseudo-lock state is quickly eliminated by vibrations from the floor or a slight forward or backward movement of the occupant, or the like. To clarify this point, while the lock claws 433 are brought in advance into a state of not engaging with the engaged parts 414*a* constituted of holes or trenches of the lower rail 41, that is, the lock claws 433 are located between adjacent engaged parts 414*a*, 414*a*, a test was carried out on whether or not the lock claws 433 engage with the engaged parts 414*a* and be locked when vibrations are applied or when a person sits down.

A car seat was supported on the seat slide device 1 and then it was set on a surface plate of a vibrator as illustrated in FIG. 69(*a*), so as to carry out the test. Results thereof are in FIG. 69(*b*) to (*e*), and among them, FIGS. 69(*b*) to (*d*) give test results of three seat slide devices constituted similarly to that used in the tests of FIG. 63 and FIGS. 64, and FIG. 24(*e*) gives test results of comparative example 1 of FIG. 64. "Vertical vibration application" describes data when vibrations are inputted in the upward and downward direction by 3 to 17 Hz. "Slide angle" describes an inclination angle (set to 0°, 3°, 6°) of the lower rail 41. "G" describes input acceleration (set to 0.1, 0.3, 0.5), and weight describes the weight (20 kg, 40 kg, 60 kg) mounted on the seat cushion. "Normal seating" describes test results when a person sits on the seat cushion, "under buttocks=50" describes results of the case of sitting on quietly from the position at a distance of 50 mm from the buttocks to the seat surface, "under buttocks=100" describes results of the case of sitting on quietly from the position at a distance of 100 mm from the buttocks to the seat surface, and "under buttocks=150" describes results of the case of sitting on quietly from the position at a distance of 150 mm from the buttocks to the seat surface. Further, FIG. 70 illustrates by summarizing the case where the pseudo-lock state was eliminated and a normal lock state was achieved, and the case where the pseudo-lock state was not eliminated and a normal lock state was not achieved in the test of vertical vibration.

First, in the results of "vertical vibration", in the case of the embodiments, as illustrated in FIGS. 69(*b*) to (*d*) and FIG. 70, when G=0.3 and G=0.5, the lock claws 433 normally locked in the engaged parts 414*a* and the pseudo-lock was eliminated in all the cases when a weight of 20 to 60 kg was applied at any of the slide angles. Further, as illustrated in FIGS. 69(*b*) to (*d*), when G=0.1, the pseudo-lock was mostly eliminated at the slide angle of 3° or more. Also, by calculation of resonance frequency f0=1/(2π√(m/k), the frequency at a time the pseudo-lock is eliminated was a value less than a resonance point for all of them.

In the case of comparative example 1, as illustrated in FIG. 69(*e*) and FIG. 70, the pseudo-lock was eliminated only in the cases of 40 kg weight and 60 kg weight and in four examples under the conditions of acceleration G=0.3 and G=0.5, and slide angle of 6°. In FIG. 69(*e*), frequency described under the conditions of G=0.1, weight of 40 kg and 60 kg, and slide angle of 3° and 6°, frequency described under the conditions of G=0.3, weight of 40 kg and 60 kg, and slide angle of 3°, frequency described under the conditions of G=0.5, weight of 40 kg, and slide angle of 3°, and frequency described under the conditions of G=0.5, weight of 60 kg, and slide angles of 0° and 3° are values all equal to or more than a resonance frequency. That is, FIG. 69(*e*) indicates that the pseudo-lock is eliminated at a predetermined frequency under these conditions, but all the frequencies at the time of elimination are equal to or more than the resonance frequency, and the pseudo-lock was eliminated because the weight was largely displaced up and down by resonance, that is, an external force equal to or more than the vibrations inputted from the floor was applied. Thus, in FIG. 70, these conditions are presented as the case where the pseudo-lock is not eliminated.

In the test of "normal seating", the seat slide device employed in the embodiment of FIG. 69(*b*) to (*d*) became the lock state under all the conditions, but in comparative example 2 of FIG. 69(*e*), there are cases where it was not locked when the distance from the buttocks to the seat surface is 50 mm (under buttocks=50) and 100 mm (under buttocks=100) and the slide angle is 0°.

From these, it was recognized that the seat slide device employed in the above embodiments is quickly locked when there is a slight vibration input from the floor or a slight change of force at a time of seating or the like, and hence has a characteristic of being difficult to become the pseudo-lock state. That is, in a state that the lock claws 433 are located between adjacent engaged parts 414*a*, 414*a* constituted of holes or trenches of the lower rail 41, since the lock claws 433 are quite thin as compared to conventional ones, the contact area between the both is small and hence friction resistance between the both is small, and since the operating plate part 432 and the lock claws 433 are formed integrally with the attaching plate part 431 constituted of a spring steel, elasticity in a direction to engage the lock claws 433 with the engaged parts 414*a* operates without loss by structural damping, and the upper rail 42 displaces in a direction to quickly eliminate this pseudo-lock state when there is a slight change in force, thereby achieving a normal lock state.

INDUSTRIAL AVAILABILITY

A vehicle seat of the present invention is preferred to be used in an automobile as described in the above embodiments, but can also be applied to various types of vehicle seats such as aircrafts, trains, boats and ships, buses, and the like.

EXPLANATION OF REFERENCE SYMBOLS

1, 800, 900 vehicle seat
1A seat cushion part
1B seat back part
10, 810, 910 cushion frame unit
11 side frame
111 outer plate-shaped frame
112 inner plate-shaped frame
121 first beam
122 second beam
123 third beam
124 fourth beam
125 fifth beam
151 front link
151*a* shaft member
152 rear link
152*a* shaft member
153 sub-link
154 fourth link
160 lifter mechanism part
20, 920 reclining unit
21 cushion bracket
211 sixth beam
212 bolt
22 back bracket
222 bolt
23 reclining mechanism part
25 seventh beam
30, 830, 930 back frame unit
31 side frame
32 upper frame structure part
321 coupling frame part
322 resin member for reinforcement
40, 840, 940 seat slide device
41, 841, 941 lower rail
42, 842, 9421 upper rail
43 lock mechanism
50, 850 head rest
51, 851 head rest poles
60, 860 cushion member for seat cushion part
61 external cushion member
62 internal cushion member
64 outer layer member
70 cushion member for seat back
71 outer layer member
820 reclining part
8211 bolt
890 wire-shaped spring member
890A vertical direction S spring

The invention claimed is:

1. A vehicle seat comprising:
a seat cushion part and a seat back part, wherein
the seat cushion part has a cushion frame unit supporting a cushion member for the seat cushion part and the seat back part has a back frame unit supporting a cushion member for the seat back part,
a left and right side frames constituting the cushion frame unit are coupled to and supported by a left and right sliders, respectively, constituting a seat slide device, and are each constituted of one or a plurality of plate-shaped frames long in a forward and backward direction and formed of a thin material made of metal with a predetermined thickness or less,
a plurality of beams are bridged across the left and right side frames of the cushion frame unit,
at least one of the left and right side frames is supported on the seat slide device via a truss support part receiving a force in the forward and backward direction, the truss support part being formed of a coupling support part with respect to the slider, the beams bridged across the left and right side frames, and an inter-node connecting part coupling the coupling support part and the beams in a direction substantially orthogonal to a disposition direction of the beams, coupling support parts for the left and right side frames and the left and right sliders are provided between a substantially center part and a rear edge in the forward and backward direction of the side frames, and the left and right coupling support parts are coupled by a first shaft member, and the truss support part is formed of the first shaft member, two beams out of a plurality of beams disposed between the substantially center part and the rear edge in the forward and backward direction of the side frames, and inter-node connecting parts respectively connecting vicinities of respective ends of the two beams, and vicinities of ends of the first shaft member and the vicinities of respective ends of the two beams.

2. The vehicle seat according to claim 1, wherein the left and right side frames constituting the cushion frame unit are each constituted of a combination of the plurality of plate-shaped frames disposed in parallel on an outside and an inside, and the beams bridged across a range in which the inner and outer plate-shaped frames are overlapped with each other when seen from a side are provided so that vicinities of their ends penetrate inner and outer plate-shaped frames, so as to support the inner and outer plate-shaped frames by the both ends.

3. The vehicle seat according to claim 1, wherein the inter-node connecting parts constituting the truss support part are formed so that rigidity in the forward and backward direction is high compared to a material state of the plurality of plate-shaped frames constituting the one of the side frames.

4. The vehicle seat according to claim 3, wherein in the inter-node connecting parts between the two beams, a reinforcing link is layered on one of the plate-shaped frames constituting the one of the side frames, forming the inter-node connecting parts with relatively high rigidity by the reinforcing link.

5. The vehicle seat according to claim 1, comprising rear links having one end pivotally supported on the first shaft member disposed to be close to a rear side of the left and right sliders, and comprising left and right front links having one end pivotally supported on a second shaft member disposed to be closer to a front side than the first shaft member, wherein respective other ends of the left and right front links are pivotally supported on a front beam out of the beams, the front beam being bridged to be close to the front side across the left and right side frames of the cushion frame unit, respective other ends of the left and right rear links are pivotally supported on a rear beam out of the two beams, the rear beam disposed to be closer to the rear side, a sub-link is provided on a side of at least one of the side frames, the sub-link having one end pivotally supported on the first shaft member on which one end of the rear beam is pivotally supported, and another end pivotally supported on the other beam out of the two beams, the other beam being located closer to the front side than the rear beam, and the rear link and the sub-link are the inter-node connecting parts respectively connecting the vicinities of ends of the first shaft member and the vicinities of respective ends of the two beams, thereby forming the truss support part.

6. The vehicle seat according to claim 5, wherein a side of one side frame out of the left and right side frames is supported on the seat slide device by the truss support part, and a side of the other side frame is supported by a quadric crank chain mechanism constituted of the front link and the rear link, the slider on which respective one ends thereof are pivotally supported, and the other side frame on which respective other ends thereof which are rotating free ends thereof are pivotally supported.

7. The vehicle seat according to claim 1, wherein on a side of one of the left and right side frames, a belt anchor part of a seat belt is supported on an end of a rear beam out of the two beams, the rear beam disposed closer to the rear side.

8. The vehicle seat according to claim 7, wherein on a side of the other side frame facing the one of the side frames on which the belt anchor part is attached, a clutch part of a lifter mechanism part to transmit an operating force of an operating unit to the links is disposed, and a driving link with high rigidity compared to a material state of the plate-shaped frames constituting the side frames is disposed between the rear link and the clutch part which are disposed on the side of the other side frame.

9. The vehicle seat according to claim 1, wherein the back frame unit is coupled via a reclining mechanism part to the respective pluralities of plate-shaped frames constituting the left and right side frames of the cushion frame unit.

10. The vehicle seat according to claim 9, wherein the back frame unit is coupled via the reclining mechanism part to one of the respective pluralities of plate-shaped frames constituting the side frames of the cushion frame unit, and the vehicle seat is structured such that a force applied to the seat cushion part and the seat back part is dispersed to a transmission path through which the force passes one of the respective pluralities of plate-shaped frames constituting the side frames of the cushion frame unit from the back frame unit via the reclining mechanism part to thereby reach the seat slide device, and to a transmission path through which the force passes the other of the respective pluralities of plate-shaped frames constituting the side frames of the cushion frame unit to thereby reach the seat slide device.

11. The vehicle seat according to claim 9, comprising a reclining unit having a cushion bracket retaining the reclining mechanism part and coupled to the plate-shaped frames constituting the side frames of the cushion frame unit and a back bracket coupled to side frames of the back frame unit.

12. The vehicle seat according to claim 11, wherein at least a portion of the side frames of the cushion frame unit, the side frames of the back frame unit, the cushion bracket of the reclining unit, and the back bracket of the reclining unit is formed to have a closed cross-sectional shape.

13. The vehicle seat according to claim 11, wherein the plate-shaped frames constituting each of the side frames of the cushion frame unit and the cushion bracket are partially overlapped and coupled by joining with bolts, and the side frames of the back frame unit and the back bracket are partially overlapped and coupled by joining with bolts.

14. The vehicle seat according to claim 9, wherein in the side frames of the back frame unit, a portion higher than the reclining mechanism part is an easy deformation portion which deforms relatively easily compared with a portion close to a lower side of each of the side frames.

15. The vehicle seat according to claim 1, wherein
in an upper frame structure part located between upper parts of the side frames of the back frame unit, guide holes penetrating in an upward and downward direction are formed, and an adjusting mechanism to adjust a height of head rest poles of a head rest inserted through the guide holes is provided,
the adjusting mechanism has a lock plate which is provided to project forward on a rear surface in an inner surface of the guide holes and engages with plural engaging trenches formed at predetermined intervals in a longitudinal direction in the head rest poles, and
an elastic member biasing the head rest poles in a direction to engage with the lock plate,
the guide holes are formed to have an inner diameter larger than a diameter of the head rest poles, and
the adjusting mechanism is structure such that when the head rest poles are displaced forward from a lock state in which the head rest poles are biased by the elastic member in a direction to the lock plate and the engaging trench is engaged with the lock plate, engagement of the lock plate and the engaging trench is released against elasticity of the elastic member, making it possible to perform a height adjustment.

16. The vehicle seat according to claim 1, wherein
the upper frame structure part located between upper portions of the side frames of the back frame unit has an upper pipe and an upper fitting frame to be engaged with the upper pipe,
the back frame unit has a back support member coupled to the upper fitting frame and located between the pair of side frames, and
when the back support member is pressed backward by pressing of the cushion member of the seat back part by a pressure of a predetermined value or more, the upper fitting frame has a structure to pivot forward about the upper pipe, displacing a head rest supported by the upper frame structure forward.

17. The vehicle seat according to claim 1, wherein
each of the sliders constituting the seat slide device is structured to have a lower rail, an upper rail which slides relative to the lower rail and to which the cushion frame unit is coupled, and a lock mechanism which locks the upper rail at an appropriate slide position with respect to the lower rail, and
the lock mechanism is structured such that it has an elastic lock member formed of an elastic member which is supported on each of the upper rails and has lock claws engaging with engaged parts formed in the lower rails, and the elastic lock member becomes an elastic fulcrum and elasticity of the elastic lock member operates on the lower rails and the upper rails.

18. The vehicle seat according to claim 1, wherein
each of the sliders constituting the seat slide device is structured to have a lower rail, an upper rail which slides relative to the lower rail and to which the cushion frame unit is coupled and a lock mechanism which locks the upper rail at an appropriate slide position with respect to the lower rail,
the lower rails and the upper rails are formed to be substantially symmetrical bilaterally with respect to a center in a cross-sectional shape orthogonal to a longitudinal direction, and
the lock mechanism is provided on both sides of the upper rails and structured to be capable of engaging with and locking the lower rails, respectively.

19. The vehicle seat according to claim 1, wherein
the cushion member disposed in the seat cushion part is structured to have
an external cushion member having a pair of side support parts and a rear support part, and
an internal cushion member which is supported by a beam bridged across the side frames of the cushion frame unit, has a shape which is disposable in a range surrounded by the external cushion member, has a shape such that a front edge projects more forward than a beam disposed on a most front side, and is relatively movable with respect to the external cushion member.

* * * * *